(12) United States Patent
Nixon et al.

(10) Patent No.: US 10,324,423 B2
(45) Date of Patent: Jun. 18, 2019

(54) METHOD AND APPARATUS FOR CONTROLLING A PROCESS PLANT WITH LOCATION AWARE MOBILE CONTROL DEVICES

(71) Applicant: FISHER-ROSEMOUNT SYSTEMS, INC., Round Rock, TX (US)

(72) Inventors: Mark J. Nixon, Round Rock, TX (US); Ken J. Beoughter, Round Rock, TX (US); Daniel D. Christensen, Austin, TX (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 0 days.

(21) Appl. No.: 14/028,785

(22) Filed: Sep. 17, 2013

(65) Prior Publication Data

US 2014/0280497 A1 Sep. 18, 2014

Related U.S. Application Data

(60) Provisional application No. 61/792,109, filed on Mar. 15, 2013.

(51) Int. Cl.
*G05B 11/01* (2006.01)
*G05B 15/02* (2006.01)
(Continued)

(52) U.S. Cl.
CPC .............. *G05B 11/01* (2013.01); *G05B 13/02* (2013.01); *G05B 15/02* (2013.01); *G06F 3/048* (2013.01);
(Continued)

(58) Field of Classification Search
CPC ........... H04B 7/00; H04L 12/28; H04L 29/08; G08B 21/00; G06F 7/10; G05B 11/01
See application file for complete search history.

(56) References Cited

U.S. PATENT DOCUMENTS 4,593,367 A 6/1986 Slack et al.
4,901,221 A 2/1990 Kodosky et al.
(Continued)

FOREIGN PATENT DOCUMENTS

AU 2010257310 A1 7/2012
CN 1409179 A 4/2003
(Continued)

OTHER PUBLICATIONS

Woo, "Intel Drops a Big Data Shocker", downloaded from the Internet at: http://forbes.com/sites/bwoo/2013/02/27/intel-drops-a-big-data-shocker/?partner=ya dated Feb. 27, 2013.
(Continued)

*Primary Examiner* — Jerry B Dennison
(74) *Attorney, Agent, or Firm* — Marshall, Gerstein & Borun LLP

(57) ABSTRACT

A computer-readable storage medium for controlling a process plant includes instructions operable to determine the location of a device in the process plant and to display data related to proximate devices. The instructions cause a processor to transmit to a server a first request for first data from a data storage area and to receive from the server, in response to the first request, first data from the storage area. The instructions cause the processor to cause the display to display the first data received from the server and to receive an indication that the mobile user interface device is in proximity to an external device. The instructions cause the processor to transmit to the server a second request for second data according to the received indication and to receive second data from the server.

20 Claims, 23 Drawing Sheets

(51) Int. Cl.
  *G05B 13/02* (2006.01)
  *H04L 29/06* (2006.01)
  *G06F 3/048* (2013.01)
  *G06F 3/0481* (2013.01)
  *G06F 3/0484* (2013.01)
  *H04W 4/02* (2018.01)
  *H04L 29/08* (2006.01)

(52) U.S. Cl.
  CPC ...... *G06F 3/04817* (2013.01); *G06F 3/04842* (2013.01); *H04L 67/12* (2013.01); *H04L 67/18* (2013.01); *H04L 67/42* (2013.01); *H04W 4/023* (2013.01); *H04W 4/02* (2013.01)

(56) References Cited

U.S. PATENT DOCUMENTS

| | | |
|---|---|---|
| 4,914,568 A | 4/1990 | Kodosky et al. |
| 5,111,531 A | 5/1992 | Grayson et al. |
| 5,164,897 A | 11/1992 | Clark et al. |
| 5,291,587 A | 3/1994 | Kodosky et al. |
| 5,301,301 A | 4/1994 | Kodosky et al. |
| 5,301,336 A | 4/1994 | Kodosky et al. |
| 5,475,851 A | 12/1995 | Kodosky et al. |
| 5,481,740 A | 1/1996 | Kodosky |
| 5,481,741 A | 1/1996 | McKaskle et al. |
| 5,497,500 A | 3/1996 | Rogers et al. |
| 5,544,320 A | 8/1996 | Konrad |
| 5,568,491 A | 10/1996 | Beal et al. |
| 5,598,572 A | 1/1997 | Tanikoshi et al. |
| 5,610,828 A | 3/1997 | Kodosky et al. |
| 5,652,909 A | 7/1997 | Kodosky |
| D384,050 S | 9/1997 | Kodosky |
| D384,051 S | 9/1997 | Kodosky |
| D384,052 S | 9/1997 | Kodosky |
| D387,750 S | 12/1997 | Kodosky |
| 5,732,277 A | 3/1998 | Kodosky et al. |
| 5,734,863 A | 3/1998 | Kodosky et al. |
| 5,737,622 A | 4/1998 | Rogers et al. |
| 5,801,942 A | 9/1998 | Nixon et al. |
| 5,801,946 A | 9/1998 | Nissen et al. |
| 5,821,934 A | 10/1998 | Kodosky et al. |
| 5,828,851 A | 10/1998 | Nixon et al. |
| 5,838,563 A | 11/1998 | Dove et al. |
| 5,862,052 A | 1/1999 | Nixon et al. |
| 5,862,054 A | 1/1999 | Li |
| 5,909,368 A | 6/1999 | Nixon et al. |
| 5,917,489 A | 6/1999 | Thurlow et al. |
| 5,940,294 A | 8/1999 | Dove |
| 5,980,078 A | 11/1999 | Krivoshein et al. |
| 5,987,246 A | 11/1999 | Thomsen et al. |
| 5,988,847 A | 11/1999 | McLaughlin et al. |
| 5,990,906 A | 11/1999 | Hudson et al. |
| 5,995,916 A | 11/1999 | Nixon et al. |
| 6,009,422 A | 12/1999 | Ciccarelli |
| 6,032,208 A | 2/2000 | Nixon et al. |
| 6,064,409 A | 5/2000 | Thomsen et al. |
| 6,078,320 A | 6/2000 | Dove et al. |
| 6,098,116 A | 8/2000 | Nixon et al. |
| 6,167,464 A | 12/2000 | Kretschmann |
| 6,173,438 B1 | 1/2001 | Kodosky et al. |
| 6,178,504 B1 | 1/2001 | Fieres et al. |
| 6,195,591 B1 | 2/2001 | Nixon et al. |
| 6,219,628 B1 | 4/2001 | Kodosky et al. |
| 6,266,726 B1 | 7/2001 | Nixon et al. |
| 6,278,374 B1 | 8/2001 | Ganeshan |
| 6,285,966 B1 | 9/2001 | Brown et al. |
| 6,295,513 B1 | 9/2001 | Thackston |
| 6,324,877 B2 | 12/2001 | Neeley |
| 6,347,253 B1 | 2/2002 | Fujita et al. |
| 6,421,570 B1 | 7/2002 | McLaughlin et al. |
| 6,442,515 B1 | 8/2002 | Varma et al. |
| 6,463,352 B1 | 10/2002 | Tadokoro et al. |
| 6,529,780 B1 | 3/2003 | Soergel et al. |
| 6,535,883 B1 | 3/2003 | Lee et al. |
| 6,563,430 B1 | 5/2003 | Kemink et al. |
| 6,584,601 B1 | 6/2003 | Kodosky et al. |
| 6,608,638 B1 | 8/2003 | Kodosky et al. |
| 6,609,036 B1 | 8/2003 | Bickford |
| 6,658,114 B1 | 12/2003 | Farn et al. |
| 6,701,285 B2 | 3/2004 | Salonen |
| 6,715,078 B1 | 3/2004 | Chasko et al. |
| 6,715,139 B1 | 3/2004 | Kodosky et al. |
| 6,763,515 B1 | 7/2004 | Vazquez et al. |
| 6,768,116 B1 | 7/2004 | Berman et al. |
| 6,784,903 B2 | 8/2004 | Kodosky et al. |
| 6,847,850 B2 | 1/2005 | Grumelart |
| 6,868,538 B1 | 3/2005 | Nixon et al. |
| 6,917,839 B2 | 7/2005 | Bickford |
| 6,934,667 B2 | 8/2005 | Kodosky et al. |
| 6,934,668 B2 | 8/2005 | Kodosky et al. |
| 6,954,724 B2 | 10/2005 | Kodosky et al. |
| 6,961,686 B2 | 11/2005 | Kodosky et al. |
| 6,965,886 B2 | 11/2005 | Govrin et al. |
| 6,970,758 B1 | 11/2005 | Shi et al. |
| 6,971,066 B2 | 11/2005 | Schultz et al. |
| 6,983,228 B2 | 1/2006 | Kodosky et al. |
| 6,993,466 B2 | 1/2006 | Kodosky et al. |
| 7,000,190 B2 | 2/2006 | Kudukoli et al. |
| 7,006,881 B1 | 2/2006 | Hoffberg et al. |
| 7,010,470 B2 | 3/2006 | Kodosky et al. |
| 7,062,718 B2 | 6/2006 | Kodosky et al. |
| 7,072,722 B1 | 7/2006 | Colonna et al. |
| 7,123,974 B1 | 10/2006 | Hamilton |
| 7,134,086 B2 | 11/2006 | Kodosky |
| 7,134,090 B2 | 11/2006 | Kodosky et al. |
| 7,143,149 B2 | 11/2006 | Oberg et al. |
| 7,143,289 B2 | 11/2006 | Denning et al. |
| 7,177,786 B2 | 2/2007 | Kodosky et al. |
| 7,185,287 B2 | 2/2007 | Ghercioiu et al. |
| 7,200,838 B2 | 4/2007 | Kodosky et al. |
| 7,210,117 B2 | 4/2007 | Kudukoli et al. |
| 7,213,057 B2 | 5/2007 | Trethewey et al. |
| 7,216,334 B2 | 5/2007 | Kodosky et al. |
| 7,219,306 B2 | 5/2007 | Kodosky et al. |
| 7,222,131 B1 | 5/2007 | Grewal et al. |
| 7,283,914 B2 | 10/2007 | Poorman et al. |
| 7,283,971 B1 | 10/2007 | Levine et al. |
| 7,302,675 B2 | 11/2007 | Rogers et al. |
| 7,314,169 B1 | 1/2008 | Jasper et al. |
| 7,340,737 B2 | 3/2008 | Ghercioiu et al. |
| 7,343,605 B2 | 3/2008 | Langkafel et al. |
| 7,346,404 B2 | 3/2008 | Eryurek et al. |
| 7,367,028 B2 | 4/2008 | Kodosky et al. |
| 7,478,337 B2 | 1/2009 | Kodosky et al. |
| 7,506,304 B2 | 3/2009 | Morrow et al. |
| 7,530,052 B2 | 5/2009 | Morrow et al. |
| 7,530,113 B2 | 5/2009 | Braun |
| 7,536,548 B1 | 5/2009 | Batke et al. |
| RE40,817 E | 6/2009 | Krivoshein et al. |
| 7,541,920 B2 | 6/2009 | Tambascio et al. |
| 7,548,873 B2 | 6/2009 | Veeningen et al. |
| 7,558,711 B2 | 7/2009 | Kodosky et al. |
| 7,565,306 B2 | 7/2009 | Apostolides |
| 7,574,690 B2 | 8/2009 | Shah et al. |
| 7,594,220 B2 | 9/2009 | Kodosky et al. |
| 7,598,856 B1 | 10/2009 | Nick et al. |
| 7,606,681 B2 | 10/2009 | Esmaili et al. |
| 7,616,095 B2 | 11/2009 | Jones et al. |
| 7,617,542 B2 | 11/2009 | Vataja |
| 7,627,860 B2 | 12/2009 | Kodosky et al. |
| 7,630,914 B2 | 12/2009 | Veeningen et al. |
| 7,644,052 B1 | 1/2010 | Chang et al. |
| 7,650,264 B2 | 1/2010 | Kodosky et al. |
| 7,653,563 B2 | 1/2010 | Veeningen et al. |
| 7,668,608 B2 | 2/2010 | Nixon et al. |
| 7,676,281 B2 | 3/2010 | Hood et al. |
| 7,680,546 B2 | 3/2010 | Gilbert et al. |
| 7,684,877 B2 | 3/2010 | Weatherhead et al. |
| RE41,228 E | 4/2010 | Kodosky et al. |
| 7,694,273 B2 | 4/2010 | Kodosky et al. |
| 7,707,014 B2 | 4/2010 | Kodosky et al. |
| 7,715,929 B2 | 5/2010 | Skourup et al. |
| 7,716,489 B1 | 5/2010 | Brandt et al. |

(56) References Cited

U.S. PATENT DOCUMENTS

| | | |
|---|---|---|
| 7,720,727 B2 | 5/2010 | Keyes et al. |
| 7,818,715 B2 | 10/2010 | Kodosky et al. |
| 7,818,716 B2 | 10/2010 | Kodosky et al. |
| 7,827,122 B1 | 11/2010 | Campbell, Jr. et al. |
| 7,831,914 B2 | 11/2010 | Kodosky et al. |
| 7,844,908 B2 | 11/2010 | Kodosky et al. |
| 7,853,431 B2 | 12/2010 | Samardzija et al. |
| 7,865,349 B2 | 1/2011 | Kodosky et al. |
| 7,882,490 B2 | 2/2011 | Kodosky et al. |
| 7,882,491 B2 | 2/2011 | Kodosky et al. |
| 7,925,979 B2 | 4/2011 | Forney et al. |
| 7,930,639 B2 | 4/2011 | Baier et al. |
| 7,934,095 B2 | 4/2011 | Laberteaux et al. |
| 7,937,665 B1 | 5/2011 | Vazquez et al. |
| 7,962,440 B2 | 6/2011 | Baier et al. |
| 7,978,059 B2 * | 7/2011 | Petite .................... G01D 4/004 340/521 |
| 7,979,843 B2 | 7/2011 | Kodosky et al. |
| 7,984,423 B2 | 7/2011 | Kodosky et al. |
| 7,987,448 B2 | 7/2011 | Kodosky et al. |
| 8,014,722 B2 | 9/2011 | Abel et al. |
| 8,028,241 B2 | 9/2011 | Kodosky et al. |
| 8,028,242 B2 | 9/2011 | Kodosky et al. |
| 8,055,787 B2 | 11/2011 | Victor et al. |
| 8,060,834 B2 | 11/2011 | Lucas et al. |
| 8,073,967 B2 | 12/2011 | Peterson et al. |
| 8,074,201 B2 | 12/2011 | Ghercioiu et al. |
| 8,099,712 B2 | 1/2012 | Kodosky et al. |
| 8,102,400 B1 | 1/2012 | Cook et al. |
| 8,126,964 B2 | 2/2012 | Pretlove et al. |
| 8,132,225 B2 | 3/2012 | Chand et al. |
| 8,146,053 B2 | 3/2012 | Morrow et al. |
| 8,166,296 B2 | 4/2012 | Buer et al. |
| 8,171,137 B1 | 5/2012 | Parks et al. |
| 8,185,217 B2 | 5/2012 | Thiele |
| 8,185,495 B2 | 5/2012 | Clark et al. |
| 8,185,832 B2 | 5/2012 | Kodosky et al. |
| 8,185,833 B2 | 5/2012 | Kodosky et al. |
| 8,185,871 B2 | 5/2012 | Nixon et al. |
| 8,190,888 B2 | 5/2012 | Batke et al. |
| 8,191,005 B2 | 5/2012 | Baier et al. |
| 8,214,455 B2 | 7/2012 | Baier et al. |
| 8,218,651 B1 | 7/2012 | Eshet et al. |
| 8,219,669 B2 | 7/2012 | Agrusa et al. |
| 8,224,496 B2 | 7/2012 | Musti et al. |
| 8,239,848 B2 | 8/2012 | Ghercioiu et al. |
| 8,290,762 B2 | 10/2012 | Kodosky et al. |
| 8,307,330 B2 | 11/2012 | Kumar et al. |
| 8,316,313 B2 | 11/2012 | Campney et al. |
| 8,321,663 B2 | 11/2012 | Medvinsky et al. |
| 8,327,130 B2 | 12/2012 | Wilkinson, Jr. et al. |
| 8,350,666 B2 | 1/2013 | Kore |
| 8,359,567 B2 | 1/2013 | Kornerup et al. |
| 8,397,172 B2 | 3/2013 | Kodosky et al. |
| 8,397,205 B2 | 3/2013 | Kornerup et al. |
| 8,413,118 B2 | 4/2013 | Kodosky et al. |
| 8,417,360 B2 | 4/2013 | Sustaeta et al. |
| 8,417,595 B2 | 4/2013 | Keyes et al. |
| 8,418,071 B2 | 4/2013 | Kodosky et al. |
| 8,429,627 B2 | 4/2013 | Jedlicka et al. |
| 8,448,135 B2 | 5/2013 | Kodosky |
| 8,521,332 B2 | 8/2013 | Tiemann et al. |
| 8,570,922 B2 | 10/2013 | Pratt, Jr. et al. |
| 8,612,870 B2 | 12/2013 | Kodosky et al. |
| 8,624,725 B1 | 1/2014 | MacGregor |
| 8,640,112 B2 | 1/2014 | Yi et al. |
| 8,656,351 B2 | 2/2014 | Kodosky et al. |
| 8,688,780 B2 | 4/2014 | Gordon et al. |
| 8,781,776 B2 | 7/2014 | Onda et al. |
| 8,832,236 B2 | 9/2014 | Hernandez et al. |
| 8,943,469 B2 | 1/2015 | Kumar et al. |
| 9,002,973 B2 | 4/2015 | Panther |
| 9,021,021 B2 | 4/2015 | Backholm et al. |
| 9,024,972 B1 | 5/2015 | Bronder et al. |
| 9,038,043 B1 | 5/2015 | Fleetwood et al. |
| 9,047,007 B2 | 6/2015 | Kodosky et al. |
| 9,088,665 B2 | 7/2015 | Boyer et al. |
| 9,098,164 B2 | 8/2015 | Kodosky |
| 9,110,558 B2 | 8/2015 | Kodosky |
| 9,119,166 B1 | 8/2015 | Sheikh |
| 9,122,786 B2 | 9/2015 | Cammert et al. |
| 9,134,895 B2 | 9/2015 | Dove et al. |
| 9,229,871 B2 | 1/2016 | Washiro |
| 9,235,395 B2 | 1/2016 | Kodosky et al. |
| 9,361,320 B1 | 6/2016 | Vijendra et al. |
| 9,397,836 B2 | 7/2016 | Nixon et al. |
| 9,424,398 B1 | 8/2016 | McLeod et al. |
| 9,430,114 B1 | 8/2016 | Dingman et al. |
| 9,459,809 B1 | 10/2016 | Chen et al. |
| 9,541,905 B2 | 1/2017 | Nixon et al. |
| 9,558,220 B2 | 1/2017 | Nixon et al. |
| 9,652,213 B2 | 5/2017 | MacCleery et al. |
| 9,678,484 B2 | 6/2017 | Nixon et al. |
| 9,697,170 B2 | 7/2017 | Nixon et al. |
| 9,804,588 B2 | 10/2017 | Blevins et al. |
| 2002/0010694 A1 | 1/2002 | Navab et al. |
| 2002/0035495 A1 | 3/2002 | Spira et al. |
| 2002/0052715 A1 | 5/2002 | Maki |
| 2002/0054130 A1 | 5/2002 | Abbott et al. |
| 2002/0064138 A1 | 5/2002 | Saito et al. |
| 2002/0080174 A1 | 6/2002 | Kodosky et al. |
| 2002/0087419 A1 | 7/2002 | Andersson et al. |
| 2002/0094085 A1 | 7/2002 | Roberts |
| 2002/0120475 A1 | 8/2002 | Morimoto |
| 2002/0128998 A1 | 9/2002 | Kil et al. |
| 2002/0130846 A1 | 9/2002 | Nixon et al. |
| 2002/0138168 A1 | 9/2002 | Salonen |
| 2002/0138320 A1 | 9/2002 | Robertson et al. |
| 2002/0149497 A1 | 10/2002 | Jaggi |
| 2002/0159441 A1 * | 10/2002 | Travaly .................. G08C 17/02 370/352 |
| 2002/0169514 A1 | 11/2002 | Eryurek et al. |
| 2003/0020726 A1 | 1/2003 | Charpentier |
| 2003/0023795 A1 | 1/2003 | Packwood et al. |
| 2003/0028495 A1 | 2/2003 | Pallante |
| 2003/0061295 A1 | 3/2003 | Oberg et al. |
| 2003/0083756 A1 | 5/2003 | Hsiung et al. |
| 2003/0084053 A1 | 5/2003 | Govrin et al. |
| 2003/0147351 A1 | 8/2003 | Greenlee |
| 2003/0154044 A1 | 8/2003 | Lundstedt et al. |
| 2003/0195934 A1 | 10/2003 | Peterson et al. |
| 2004/0005859 A1 | 1/2004 | Ghercioiu et al. |
| 2004/0012632 A1 | 1/2004 | King et al. |
| 2004/0075689 A1 | 4/2004 | Schleiss et al. |
| 2004/0093102 A1 | 5/2004 | Liiri et al. |
| 2004/0117233 A1 | 6/2004 | Rapp |
| 2004/0133457 A1 | 7/2004 | Sadiq et al. |
| 2004/0153437 A1 | 8/2004 | Buchan |
| 2004/0153804 A1 | 8/2004 | Blevins et al. |
| 2004/0203874 A1 | 10/2004 | Brandt et al. |
| 2004/0204775 A1 | 10/2004 | Keyes et al. |
| 2004/0210330 A1 | 10/2004 | Birkle |
| 2004/0230328 A1 | 11/2004 | Armstrong et al. |
| 2004/0233930 A1 | 11/2004 | Colby |
| 2005/0005259 A1 | 1/2005 | Avery et al. |
| 2005/0060111 A1 | 3/2005 | Ramillon et al. |
| 2005/0062677 A1 | 3/2005 | Nixon et al. |
| 2005/0080799 A1 | 4/2005 | Harnden et al. |
| 2005/0096872 A1 | 5/2005 | Blevins et al. |
| 2005/0130634 A1 * | 6/2005 | Godfrey .................... 455/414.1 |
| 2005/0164684 A1 | 7/2005 | Chen et al. |
| 2005/0182650 A1 | 8/2005 | Maddox et al. |
| 2005/0187649 A1 | 8/2005 | Funk et al. |
| 2005/0213768 A1 | 9/2005 | Durham et al. |
| 2005/0222691 A1 | 10/2005 | Glas et al. |
| 2005/0222698 A1 | 10/2005 | Eryurek et al. |
| 2005/0264527 A1 | 12/2005 | Lin |
| 2006/0031826 A1 | 2/2006 | Hiramatsu et al. |
| 2006/0064291 A1 | 3/2006 | Pattipatti et al. |
| 2006/0064472 A1 | 3/2006 | Mirho |
| 2006/0069717 A1 | 3/2006 | Mamou et al. |
| 2006/0087402 A1 | 4/2006 | Manning et al. |
| 2006/0168396 A1 | 7/2006 | LaMothe et al. |
| 2006/0200260 A1 | 9/2006 | Hoffberg et al. |

(56) References Cited

U.S. PATENT DOCUMENTS

| | | |
|---|---|---|
| 2006/0200771 A1 | 9/2006 | Nielsen et al. |
| 2006/0218107 A1 | 9/2006 | Young |
| 2006/0241792 A1 | 10/2006 | Pretlove et al. |
| 2006/0288091 A1* | 12/2006 | Oh et al. .................. 709/219 |
| 2006/0291481 A1 | 12/2006 | Kumar |
| 2006/0294087 A1 | 12/2006 | Mordvinov |
| 2007/0005266 A1 | 1/2007 | Blevins et al. |
| 2007/0014406 A1 | 1/2007 | Scheidt et al. |
| 2007/0038889 A1 | 2/2007 | Wiggins et al. |
| 2007/0067725 A1 | 3/2007 | Cahill et al. |
| 2007/0078696 A1 | 4/2007 | Hardin |
| 2007/0112574 A1 | 5/2007 | Greene |
| 2007/0118516 A1 | 5/2007 | Li et al. |
| 2007/0130310 A1 | 6/2007 | Batke et al. |
| 2007/0132779 A1 | 6/2007 | Gilbert et al. |
| 2007/0139441 A1 | 6/2007 | Lucas et al. |
| 2007/0179645 A1 | 8/2007 | Nixon et al. |
| 2007/0185754 A1 | 8/2007 | Schmidt |
| 2007/0211079 A1 | 9/2007 | Nixon et al. |
| 2007/0250292 A1 | 10/2007 | Alagappan et al. |
| 2007/0265866 A1 | 11/2007 | Fehling et al. |
| 2008/0040719 A1 | 2/2008 | Shimizu et al. |
| 2008/0046104 A1 | 2/2008 | Van Camp et al. |
| 2008/0058968 A1 | 3/2008 | Sharma et al. |
| 2008/0065243 A1 | 3/2008 | Fallman et al. |
| 2008/0065705 A1 | 3/2008 | Miller |
| 2008/0065706 A1 | 3/2008 | Miller et al. |
| 2008/0076431 A1* | 3/2008 | Fletcher et al. ............ 455/440 |
| 2008/0078189 A1 | 4/2008 | Ando |
| 2008/0079596 A1 | 4/2008 | Baier et al. |
| 2008/0082180 A1 | 4/2008 | Blevins et al. |
| 2008/0082181 A1 | 4/2008 | Miller et al. |
| 2008/0082195 A1 | 4/2008 | Samardzija |
| 2008/0097622 A1 | 4/2008 | Forney et al. |
| 2008/0103843 A1 | 5/2008 | Goeppert et al. |
| 2008/0104189 A1 | 5/2008 | Baker et al. |
| 2008/0126352 A1 | 5/2008 | Case |
| 2008/0126665 A1 | 5/2008 | Burr et al. |
| 2008/0143482 A1 | 6/2008 | Shoarinejad et al. |
| 2008/0182592 A1 | 7/2008 | Cha et al. |
| 2008/0209443 A1 | 8/2008 | Suzuki |
| 2008/0249641 A1 | 10/2008 | Enver et al. |
| 2008/0274766 A1* | 11/2008 | Pratt ...................... G01D 21/00 455/552.1 |
| 2008/0275971 A1 | 11/2008 | Pretlove et al. |
| 2008/0288321 A1 | 11/2008 | Dillon et al. |
| 2008/0297513 A1 | 12/2008 | Greenhill et al. |
| 2008/0301123 A1 | 12/2008 | Schneider et al. |
| 2009/0049073 A1 | 2/2009 | Cho |
| 2009/0065578 A1 | 3/2009 | Peterson et al. |
| 2009/0070337 A1 | 3/2009 | Romem et al. |
| 2009/0070589 A1 | 3/2009 | Nayak et al. |
| 2009/0089359 A1 | 4/2009 | Siorek et al. |
| 2009/0089709 A1 | 4/2009 | Baier et al. |
| 2009/0094531 A1 | 4/2009 | Danieli et al. |
| 2009/0097502 A1 | 4/2009 | Yamamoto |
| 2009/0112335 A1 | 4/2009 | Mehta et al. |
| 2009/0210386 A1* | 8/2009 | Cahill .................... G06F 9/4443 |
| 2009/0210802 A1 | 8/2009 | Hawkins et al. |
| 2009/0210814 A1 | 8/2009 | Agrusa et al. |
| 2009/0216341 A1 | 8/2009 | Enkerud et al. |
| 2009/0249237 A1 | 10/2009 | Jundt et al. |
| 2009/0284383 A1 | 11/2009 | Wiles et al. |
| 2009/0294174 A1 | 12/2009 | Harmer et al. |
| 2009/0300535 A1 | 12/2009 | Skourup et al. |
| 2009/0319058 A1 | 12/2009 | Rovaglio et al. |
| 2009/0325603 A1 | 12/2009 | Van Os et al. |
| 2010/0036779 A1 | 2/2010 | Sadeh-Koniecpol et al. |
| 2010/0069008 A1* | 3/2010 | Oshima .................. H04W 4/02 455/41.3 |
| 2010/0076642 A1 | 3/2010 | Hoffberg et al. |
| 2010/0082158 A1 | 4/2010 | Lakomiak et al. |
| 2010/0106282 A1 | 4/2010 | Mackelprang et al. |
| 2010/0127821 A1 | 5/2010 | Jones et al. |
| 2010/0127824 A1 | 5/2010 | Moschl et al. |
| 2010/0145476 A1 | 6/2010 | Junk et al. |
| 2010/0169785 A1 | 7/2010 | Jesudason |
| 2010/0185857 A1 | 7/2010 | Neitzel et al. |
| 2010/0190442 A1 | 7/2010 | Citrano, III et al. |
| 2010/0192122 A1 | 7/2010 | Esfahan et al. |
| 2010/0222899 A1 | 9/2010 | Blevins et al. |
| 2010/0262929 A1 | 10/2010 | Avery |
| 2010/0275135 A1 | 10/2010 | Dunton et al. |
| 2010/0286798 A1 | 11/2010 | Keyes et al. |
| 2010/0290351 A1 | 11/2010 | Toepke et al. |
| 2010/0290359 A1 | 11/2010 | Dewey et al. |
| 2010/0293019 A1 | 11/2010 | Keyes et al. |
| 2010/0293564 A1 | 11/2010 | Gould et al. |
| 2010/0305736 A1 | 12/2010 | Arduini |
| 2010/0318934 A1 | 12/2010 | Blevins et al. |
| 2011/0022193 A1 | 1/2011 | Panaitescu |
| 2011/0046754 A1 | 2/2011 | Bromley et al. |
| 2011/0071869 A1 | 3/2011 | O'Brien et al. |
| 2011/0098918 A1 | 4/2011 | Siliski et al. |
| 2011/0115816 A1 | 5/2011 | Brackney |
| 2011/0130848 A1 | 6/2011 | Tegnell et al. |
| 2011/0140864 A1 | 6/2011 | Bucci |
| 2011/0144777 A1 | 6/2011 | Firkins et al. |
| 2011/0191277 A1 | 8/2011 | Ag ndez Dominguez et al. |
| 2011/0238189 A1 | 9/2011 | Butera et al. |
| 2011/0258138 A1 | 10/2011 | Kulkarni et al. |
| 2011/0276896 A1 | 11/2011 | Zambetti et al. |
| 2011/0276908 A1 | 11/2011 | O'Riordan |
| 2011/0295722 A1 | 12/2011 | Reisman |
| 2012/0004743 A1 | 1/2012 | Anne et al. |
| 2012/0005270 A1 | 1/2012 | Harding et al. |
| 2012/0010758 A1 | 1/2012 | Francino et al. |
| 2012/0011180 A1 | 1/2012 | Kavaklioglu |
| 2012/0011511 A1 | 1/2012 | Horvitz et al. |
| 2012/0029661 A1 | 2/2012 | Jones et al. |
| 2012/0038458 A1 | 2/2012 | Toepke et al. |
| 2012/0040698 A1 | 2/2012 | Ferguson et al. |
| 2012/0078869 A1 | 3/2012 | Bellville et al. |
| 2012/0095574 A1 | 4/2012 | Greenlee |
| 2012/0147862 A1 | 6/2012 | Poojary et al. |
| 2012/0163521 A1 | 6/2012 | Kirrmann et al. |
| 2012/0176491 A1 | 7/2012 | Garin et al. |
| 2012/0203728 A1 | 8/2012 | Levine |
| 2012/0226985 A1 | 9/2012 | Chervets et al. |
| 2012/0230309 A1 | 9/2012 | Junk |
| 2012/0239164 A1 | 9/2012 | Smith et al. |
| 2012/0271962 A1 | 10/2012 | Ivanov et al. |
| 2012/0290795 A1 | 11/2012 | Dowlatkhah |
| 2012/0331541 A1 | 12/2012 | Hamilton, II et al. |
| 2013/0006696 A1 | 1/2013 | Louie et al. |
| 2013/0007223 A1 | 1/2013 | Luby et al. |
| 2013/0013523 A1 | 1/2013 | Herrera Campos |
| 2013/0029686 A1 | 1/2013 | Moshfeghi |
| 2013/0041479 A1 | 2/2013 | Zhang et al. |
| 2013/0086591 A1 | 4/2013 | Haven |
| 2013/0095849 A1 | 4/2013 | Pakzad |
| 2013/0120449 A1 | 5/2013 | Ihara et al. |
| 2013/0144404 A1 | 6/2013 | Godwin et al. |
| 2013/0144405 A1 | 6/2013 | Lo |
| 2013/0144605 A1 | 6/2013 | Brager et al. |
| 2013/0151563 A1 | 6/2013 | Addepalli et al. |
| 2013/0169526 A1 | 7/2013 | Gai et al. |
| 2013/0184847 A1 | 7/2013 | Fruh et al. |
| 2013/0197954 A1 | 8/2013 | Yankelevich et al. |
| 2013/0212129 A1 | 8/2013 | Lawson et al. |
| 2013/0214902 A1 | 8/2013 | Pineau et al. |
| 2013/0217417 A1* | 8/2013 | Mohideen ............... H04W 4/04 |
| 2013/0231947 A1 | 9/2013 | Shusterman |
| 2013/0257627 A1 | 10/2013 | Rafael |
| 2013/0265857 A1 | 10/2013 | Foulds et al. |
| 2013/0318536 A1 | 11/2013 | Fletcher et al. |
| 2014/0006338 A1 | 1/2014 | Watson et al. |
| 2014/0015672 A1 | 1/2014 | Ponce |
| 2014/0039648 A1 | 2/2014 | Boult et al. |
| 2014/0067800 A1 | 3/2014 | Sharma |
| 2014/0079297 A1 | 3/2014 | Tadayon et al. |
| 2014/0089504 A1 | 3/2014 | Scholz et al. |
| 2014/0108985 A1 | 4/2014 | Scott et al. |
| 2014/0122806 A1 | 5/2014 | Lin et al. |

(56) References Cited

U.S. PATENT DOCUMENTS

| | | | |
|---|---|---|---|
| 2014/0123276 A1 | 5/2014 | Bush et al. | |
| 2014/0136652 A1 | 5/2014 | Narayanaswami et al. | |
| 2014/0164603 A1 | 6/2014 | Castel et al. | |
| 2014/0172961 A1 | 6/2014 | Clemmer et al. | |
| 2014/0180671 A1* | 6/2014 | Osipova | G06F 9/4448 704/8 |
| 2014/0180970 A1 | 6/2014 | Hettenkofer et al. | |
| 2014/0189520 A1 | 7/2014 | Crepps et al. | |
| 2014/0201244 A1 | 7/2014 | Zhou | |
| 2014/0232843 A1* | 8/2014 | Campbell | G06K 9/2027 348/78 |
| 2014/0250153 A1 | 9/2014 | Nixon et al. | |
| 2014/0267599 A1 | 9/2014 | Drouin et al. | |
| 2014/0273847 A1 | 9/2014 | Nixon et al. | |
| 2014/0274123 A1 | 9/2014 | Nixon et al. | |
| 2014/0277593 A1 | 9/2014 | Nixon et al. | |
| 2014/0277594 A1 | 9/2014 | Nixon et al. | |
| 2014/0277595 A1 | 9/2014 | Nixon et al. | |
| 2014/0277596 A1 | 9/2014 | Nixon et al. | |
| 2014/0277604 A1 | 9/2014 | Nixon et al. | |
| 2014/0277605 A1 | 9/2014 | Nixon et al. | |
| 2014/0277607 A1 | 9/2014 | Nixon et al. | |
| 2014/0277615 A1 | 9/2014 | Nixon et al. | |
| 2014/0277616 A1 | 9/2014 | Nixon et al. | |
| 2014/0277617 A1 | 9/2014 | Nixon et al. | |
| 2014/0277618 A1 | 9/2014 | Nixon et al. | |
| 2014/0277656 A1 | 9/2014 | Nixon et al. | |
| 2014/0278312 A1 | 9/2014 | Nixon et al. | |
| 2014/0280497 A1 | 9/2014 | Nixon et al. | |
| 2014/0280678 A1 | 9/2014 | Nixon et al. | |
| 2014/0282015 A1 | 9/2014 | Nixon et al. | |
| 2014/0282227 A1 | 9/2014 | Nixon et al. | |
| 2014/0282257 A1 | 9/2014 | Nixon et al. | |
| 2014/0297225 A1 | 10/2014 | Petroski et al. | |
| 2014/0316579 A1 | 10/2014 | Taylor et al. | |
| 2014/0358256 A1 | 12/2014 | Billi et al. | |
| 2014/0359552 A1 | 12/2014 | Misra et al. | |
| 2014/0372378 A1 | 12/2014 | Long et al. | |
| 2014/0372561 A1 | 12/2014 | Hisano | |
| 2014/0379296 A1 | 12/2014 | Nathan et al. | |
| 2015/0024710 A1 | 1/2015 | Becker et al. | |
| 2015/0067163 A1* | 3/2015 | Bahnsen | H04W 4/02 709/225 |
| 2015/0106578 A1 | 4/2015 | Warfield et al. | |
| 2015/0172872 A1 | 6/2015 | Alsehly et al. | |
| 2015/0177718 A1 | 6/2015 | Vartiainen et al. | |
| 2015/0220080 A1 | 8/2015 | Nixon et al. | |
| 2015/0222731 A1 | 8/2015 | Shinohara et al. | |
| 2015/0246852 A1 | 9/2015 | Chen et al. | |
| 2015/0261215 A1 | 9/2015 | Blevins et al. | |
| 2015/0278397 A1 | 10/2015 | Hendrickson et al. | |
| 2015/0312721 A1 | 10/2015 | Singh et al. | |
| 2015/0332188 A1 | 11/2015 | Yankelevich et al. | |
| 2016/0098021 A1 | 4/2016 | Zornio et al. | |
| 2016/0098037 A1 | 4/2016 | Zornio et al. | |
| 2016/0098388 A1 | 4/2016 | Blevins et al. | |
| 2016/0098647 A1 | 4/2016 | Nixon et al. | |
| 2016/0132046 A1 | 5/2016 | Beoughter et al. | |
| 2016/0261482 A1 | 9/2016 | Mixer et al. | |
| 2016/0327942 A1 | 11/2016 | Nixon et al. | |
| 2017/0102678 A1 | 4/2017 | Nixon et al. | |
| 2017/0102693 A1 | 4/2017 | Kidd et al. | |
| 2017/0102694 A1 | 4/2017 | Enver et al. | |
| 2017/0102696 A1 | 4/2017 | Bell et al. | |
| 2017/0103103 A1 | 4/2017 | Nixon et al. | |
| 2017/0115648 A1 | 4/2017 | Nixon et al. | |
| 2017/0154395 A1 | 6/2017 | Podgurny et al. | |
| 2017/0199843 A1 | 7/2017 | Nixon et al. | |
| 2017/0235298 A1 | 8/2017 | Nixon et al. | |
| 2017/0236067 A1 | 8/2017 | Tjiong | |

FOREIGN PATENT DOCUMENTS

| | | |
|---|---|---|
| CN | 1409232 A | 4/2003 |
| CN | 1537258 A | 10/2004 |
| CN | 1589423 A | 3/2005 |
| CN | 1757002 A | 4/2006 |
| CN | 1804744 A | 7/2006 |
| CN | 1826565 A | 8/2006 |
| CN | 1980194 A | 6/2007 |
| CN | 101097136 A | 1/2008 |
| CN | 101387882 A | 3/2009 |
| CN | 101449259 A | 6/2009 |
| CN | 201374004 Y | 12/2009 |
| CN | 101788820 A | 7/2010 |
| CN | 101828195 A | 9/2010 |
| CN | 101867566 A | 10/2010 |
| CN | 102063097 A | 5/2011 |
| CN | 102169182 A | 8/2011 |
| CN | 102175174 A | 9/2011 |
| CN | 102184489 A | 9/2011 |
| CN | 102200993 A | 9/2011 |
| CN | 102213959 A | 10/2011 |
| CN | 102243315 A | 11/2011 |
| CN | 102278987 A | 12/2011 |
| CN | 202101268 U | 1/2012 |
| CN | 102349031 A | 2/2012 |
| CN | 102375453 A | 3/2012 |
| CN | 102378989 A | 3/2012 |
| CN | 102402215 A | 4/2012 |
| CN | 102436205 A | 5/2012 |
| CN | 102494630 A | 6/2012 |
| CN | 102494683 A | 6/2012 |
| CN | 102637027 A | 8/2012 |
| CN | 102640156 A | 8/2012 |
| CN | 102707689 A | 10/2012 |
| CN | 102710861 A | 10/2012 |
| CN | 102867237 A | 1/2013 |
| CN | 103106188 A | 5/2013 |
| CN | 103403686 A | 11/2013 |
| CN | 103576638 A | 2/2014 |
| CN | 104035392 A | 9/2014 |
| CN | 104049575 A | 9/2014 |
| DE | 19882113 T1 | 1/2000 |
| DE | 19882117 T1 | 1/2000 |
| EP | 0 335 957 A1 | 10/1989 |
| EP | 1 344 291 A1 | 9/2003 |
| EP | 1 414 215 A2 | 4/2004 |
| EP | 1 564 647 A2 | 8/2005 |
| EP | 1 912 376 A1 | 4/2008 |
| EP | 2 003 813 A1 | 12/2008 |
| EP | 2 112 614 A1 | 10/2009 |
| EP | 2 469 475 A1 | 6/2012 |
| EP | 1 344 291 B1 | 8/2012 |
| EP | 2 685 329 A1 | 1/2014 |
| EP | 2 746 884 A1 | 6/2014 |
| EP | 2 801 939 A1 | 11/2014 |
| FR | 2 966 625 A1 | 4/2012 |
| GB | 2 336 977 B | 11/1999 |
| GB | 2 336 923 B | 6/2002 |
| GB | 2 403 028 A | 12/2004 |
| GB | 2 453 426 A | 4/2009 |
| GB | 2 512 984 A | 10/2014 |
| GB | 2 512 997 A | 10/2014 |
| GB | 2 532 849 A | 6/2016 |
| GB | 2 534 628 A | 8/2016 |
| GB | 2 537 457 A | 10/2016 |
| JP | 64-017105 A | 1/1989 |
| JP | 01-291303 A | 11/1989 |
| JP | 08-234951 | 9/1996 |
| JP | 09-330861 A | 12/1997 |
| JP | 11-327628 A | 11/1999 |
| JP | 2000-214914 A | 8/2000 |
| JP | 2001-512593 A | 8/2001 |
| JP | 2001-265821 A | 9/2001 |
| JP | 2002-024423 A | 1/2002 |
| JP | 2002-99325 A | 4/2002 |
| JP | 2004-199624 A | 7/2004 |
| JP | 2004-227561 A | 8/2004 |
| JP | 2006-221376 A | 8/2006 |

(56) References Cited

FOREIGN PATENT DOCUMENTS

| | | | |
|---|---|---|---|
| JP | 2006-527426 | A | 11/2006 |
| JP | 2007-242000 | A | 9/2007 |
| JP | 2007-536631 | A | 12/2007 |
| JP | 2007-536648 | A | 12/2007 |
| JP | 2008-158971 | A | 7/2008 |
| JP | 2009-064451 | A | 3/2009 |
| JP | 2009-140380 | A | 6/2009 |
| JP | 2009-211522 | A | 9/2009 |
| JP | 2009-251777 | A | 10/2009 |
| JP | 2011-022920 | A | 2/2011 |
| JP | 2011-034564 | A | 2/2011 |
| JP | 2012-069118 | A | 4/2012 |
| JP | 2012-084162 | A | 4/2012 |
| JP | 4-934482 | B2 | 5/2012 |
| JP | 2012-215547 | A | 11/2012 |
| JP | 2014-116027 | A | 6/2014 |
| WO | WO-02/50971 | | 6/2002 |
| WO | WO-03/073688 | A1 | 9/2003 |
| WO | WO-2003/073688 | A1 | 9/2003 |
| WO | WO-2005/083533 | A1 | 9/2005 |
| WO | WO-2005/109123 | A1 | 11/2005 |
| WO | WO-2008/042786 | A2 | 4/2008 |
| WO | WO-2009/021900 | A1 | 2/2009 |
| WO | WO-2009/046095 | A1 | 4/2009 |
| WO | WO-2011/120625 | A1 | 10/2011 |
| WO | WO-2012/016012 | A2 | 2/2012 |
| WO | WO-2012/022381 | A1 | 2/2012 |
| WO | WO-2012/096877 | A1 | 7/2012 |
| WO | WO-2014/005073 | A1 | 1/2014 |
| WO | WO-2014/145801 | A2 | 9/2014 |
| WO | WO-2015/138706 | A1 | 9/2015 |
| WO | WO-2016/057365 | A1 | 4/2016 |

OTHER PUBLICATIONS

Search Report for Application No. GB1403408.6, dated Aug. 8, 2014.
Search Report for Application No. GB1403407.8, dated Aug. 8, 2014.
Search Report for Application No. GB1403480.5, dated Aug. 28, 2014.
Search Report for Application No. GB1403478.9, dated Aug. 21, 2014.
Search Report for Application No. GB1403477.1, dated Aug. 28, 2014.
Search Report for Application No. GB1403476.3, dated Aug. 27, 2014.
Search Report for Application No. GB1403475.5, dated Sep. 3, 2014.
Search Report for Application No. GB1403474.8, dated Aug. 26, 2014.
Search Report for Application No. GB1403472.2, dated Aug. 22, 2014.
Search Report for Application No. GB1403471.4, dated Sep. 9, 2014.
Search Report for Application No. GB1403615.6, dated Aug. 18, 2014.
Search Report for Application No. GB1403616.4, dated Sep. 1, 2014.
"ANSI/ISA-S5.4-1991 American National Standard Instrument Loop Diagrams" by Instrument Society of America, 1986, 22 pages.
"Control Loop Foundation—Batch and Continuous Processes", by Terrence Blevins and Mark Nixon, *International Society of Automation*, 2011, Chapter 7.
"IoT and Big Data Combine Forces," (2013). Retrieved from the Internet at: URL:http://wiki.advantech.com/images/7/73/iot2013_whitepaper.pdf.
Bryner, "Smart Manufacturing: The Next Revolution," Chemical Engineering Process (2012). Retrieved from the Internet at: URL:http://www.aiche.org/sites/default/files/cep/20121004a.pdf.
Building Smarter Manufacturing with the Internet of Things (IoT), (2014). Retrieved from the Internet at: URL:http://www.cisco.com/web/solutions/trends/iot/iot_in_manufacturing_january.pdf.
Examination Report for Application No. GB1017192.4, dated May 28, 2014.
Examination Report for Application No. GB1017192.4, dated Sep. 5, 2013.
First Office Action for Chinese Application No. 201010589029.X, dated Dec. 10, 2013.
International Search Report and Written Opinion for Application No. PCT/US2015/020148, dated Jun. 18, 2015.
Notice of Reasons for Rejection for Japanese Application No. 2010-229513, dated Jul. 29, 2014.
Search Report for Application No. GB1017192.4, dated Feb. 15, 2011.
Search Report for Application No. GB1402311.3, dated Aug. 6, 2014.
Search Report for Application No. GB1403251.0, dated Aug. 8, 2014.
Smalley, "GE Invests in Project to Embed Predictive Analytics in Industrial Internet," (2013). Retrieved from the Internet at: URL:http://data-informed.com/ge-invents-in-project-to-embed-predictive-analytics-in-industrial-internet/.
U.S. Appl. No. 14/212,411, filed Mar. 14, 2014, "Determining Associations and Alignments of Process Elements and Measurements in a Process".
U.S. Appl. No. 14/506,863, filed Oct. 6, 2014, "Streaming Data for Analytics in Process Control Systems".
U.S. Appl. No. 14/507,252, filed Oct. 6, 2014, "Automatic Signal Processing-Based Learning in a Process Plant".
U.S. Appl. No. 62/060,408, filed Oct. 6, 2014, "Data Pipeline for Process Control System Analytics".
U.S. Appl. No. 14/174,413, entitled "Collecting and Delivering Data to a Big Data Machine in a Process Control System", filed Feb. 6, 2014, 61 pages.
U.S. Appl. No. 14/212,493, entitled "Distributed Big Data in a Process Control System", filed Mar. 14, 2014, 61 pages.
U.S. Appl. No. 13/784,041, filed Mar. 4, 2013.
U.S. Appl. No. 14/028,897, filed Sep. 17, 2013.
U.S. Appl. No. 14/028,913, filed Sep. 17, 2013.
U.S. Appl. No. 14/028,921, filed Sep. 17, 2013.
U.S. Appl. No. 14/028,923, filed Sep. 17, 2013.
U.S. Appl. No. 14/028,964, filed Sep. 17, 2013.
Communication Relating to the Results of the Partial International Search, dated Jul. 11, 2014.
International Search Report and Written Opinion for Application No. PCT/US2014/030627, dated Sep. 11, 2014.
Bassat et al., "Workflow Management Combined with Diagnostic and Repair Expert System Tools for Maintenance Operations," IEEE, pp. 367-375 (1993).
International Search Report and Written Opinion for Application No. PCT/US2015,053931, dated Jan. 26, 2016.
Krumeich et al., "Big Data Analytics for Predictive Manufacturing Control—A Case Study from Process Industry," IEEE International Congress on Big Data, pp. 530-537 (2014).
Search Report for Application No. GB1501042.4, dated Feb. 2, 2016.
Search Report for Application No. GB1513617.9, dated Jan. 21, 2016.
Search Report for Application No. GB1517034.3, dated May 26, 2016.
Search Report for Application No. GB1517038.4, dated Mar. 22, 2016.
Hu et al., "Toward Scalable Systems for Big Data Analytics: A Technology Tutorial," IEEE, 2:652-687 (2014).
Lee et al., "Recent Advances and Trends in Predictive Manufacturing Systems in Big Data Environment," Manufacturing Letters, 1(1):38-41 (2013).
Mandavi et al., "Development of a Simulation-Based Decision Support System for Controlling Stochastic Flexible Job Shop Manufacturing Systems," Simulation Modeling Practice and Theory, 18:768-786 (2010).

(56) References Cited

OTHER PUBLICATIONS

Mezmaz et al., "A Parallel Bi-Objective Hybrid Metaheuristic for Energy-Aware Scheduling for Cloud Computing Systems," Journal of Parallel and Distributed Computing, Elsevier (2011).
Notification of First Office Action for Chinese Application No. 201480014734.3, dated Apr. 19, 2017.
Razik et al., "The Remote Surveillance Device in Monitoring and Diagnosis of Induction Motor by Using a PDA," IEEE (2007).
Search Report for Application No. GB1617019.3, dated Feb. 27, 2017.
Siltanen et al., "Augmented Reality for Plant Lifecycle Management," IEEE (2007).
Xu, "From Cloud Computing to Cloud Manufacturing," Robotics and Computer-Integrated Manufacturing 28:75-86 (2012).
Examination Report for Application No. EP 14724871.0, dated Aug. 17, 2016.
Adrian et al., "Model Predictive Control of Integrated Unit Operations Control of a Divided Wall Column," Chemical Engineering and Processing: Process Information, 43(3):347-355 (2004).
Daniel et al., "Conceptual Design of Reactive Dividing Wall Columns," Symposium Series No. 152, pp. 364-372 (2006).
Dejanovic et al., "Conceptual Design and Comparison of Four-Products Dividing Wall Columns for Separation of a Multicomponent Aromatics Mixture," Distillation Absorption, pp. 85-90 (2010).
Dongargaonkar et al., "PLC Based Ignition System," Conference Records of the 1999 IEEE Industry Application Conference, 1380-1387 (1999).
Hiller et al., "Multi Objective Optimisation for an Economical Dividing Wall Column Design," Distillation Absorption, pp. 67-72 (2010).
International Preliminary Report on Patentability for Application No. PCT/US2014/030627, dated Sep. 15, 2015.
International Preliminary Report on Patentability for Application No. PCT/US2015/020148, dated Sep. 14, 2016.
Kiss et al., "A control Perspective on Process Intensification in Dividing-Wall Columns," Chemical Engineering and Processing: Process Intensification, 50:281-292 (2011).
Pendergast et al., "Consider Dividing Wall Columns," Chemical Processing (2008). Retrieved from the Internet at: URL:http://www.chemicalprocessing.com/articles/2008/245/?show=all.
Sander et al., "Methyl Acetate Hydrolysis in a Reactive Divided Wall Column," Symposium Series No. 152, pp. 353-363 (2006).
Schultz et al., "Reduce Costs with Dividing-Wall Columns," Reactions and Separations, pp. 64-71 (2002).
Shah et al., "Multicomponent Distillation Configurations with Large Energy Savings," Distillation Absorption, pp. 61-66 (2010).
Thotla et al., "Cyclohexanol Production from Cyclohexene in a Reactive Divided Wall Column: A Feasibility Study," Distillation Absorption, pp. 319-324 (2010).
Tututi-Avila et al., "Analysis of Multi-Loop Control Structures of Dividing-Wall Distillation Columns Using a Fundamental Model," Processes, 2:180-199 (2014).
U.S. Office Action for U.S. Appl. No. 13/784,041 dated Apr. 6, 2015.
U.S. Office Action for U.S. Appl. No. 13/784,041, dated Feb. 26, 2016.
U.S. Office Action for U.S. Appl. No. 13/784,041, dated Oct. 15, 2015.
Extended European Search Report for Application No. 17157505.3, dated Jun. 30, 2017.
First Office Action for Chinese Application No. 201410080524.6, dated Sep. 13, 2017.
First Office Action for Chinese Application No. 201410088828.7, dated Aug. 1, 2017.
First Office Action for Chinese Application No. 201410097623.5, dated Sep. 26, 2017.
First Office Action for Chinese Application No. 201410097873.9, dated Aug. 9, 2017.
First Office Action for Chinese Application No. 201410097874.3, dated Aug. 18, 2017.
First Office Action for Chinese Application No. 201410097921.4, dated Oct. 10, 2017.
First Office Action for Chinese Application No. 201410097922.9, dated Aug. 18, 2017.
First Office Action for Chinese Application No. 201410097923.3, dated Aug. 28, 2017.
First Office Action for Chinese Application No. 201410098326.2, dated Jul. 27, 2017.
First Office Action for Chinese Application No. 201410098327.7, dated Jul. 26, 2017.
First Office Action for Chinese Application No. 201410098982.2, dated Aug. 9, 2017.
First Office Action for Chinese Application No. 201410099103.8, dated Aug. 9, 2017.
Notice of Reasons for Rejection for Japanese Application No. 2014-051599, dated Nov. 28, 2017.
Notification of First Office Action for Chinese Application No. 201410099068.X, dated Sep. 15, 2017.
Aouada et al., "Source Detection and Separation in Power Plant Process Monitoring: Application of the Bootstrap," IEEE International Conference on Acoustics Speech and Signal Processing Proceedings (2006).
Bruzzone et al., "Different Modeling and Simulation Approaches Applied to Industrial Process Plants," Proceedings of the Emergin M&S Applications in Industry & Academia/Modeling and Humanities Symposium (2013).
First Office Action for Chinese Application No. 201410097675.2, dated May 10, 2017.
International Preliminary Report on Patentability for Application No. PCT/US2015/053931, dated Apr. 11, 2017.
Notification of First Office Action for Chinese Application No. 201410097875.8, dated Jul. 7, 2017.
Sailer et al., "Attestation-Based Policy Enforcement for Remote Access," Proceedings of the 11th ACM Conference on Computer and Communications Security (2004).
Search Report for Application No. GB1617020.1, dated Apr. 13, 2017.
Search Report for Application No. GB1617021.9, dated Apr. 5, 2017.
Search Report for Application No. GB1617022.7, dated Apr. 18, 2017.
Search Report for Application No. GB1617023.5, dated Apr. 7, 2017.
Search Report for Application No. GB16702014.0, dated Aug. 3, 2017.
Sunindyo et al., "An Event-Based Empirical Process Analysis Framework," ESEM (2010).
Notice of Reasons for Rejection for Japanese Application No. 2014-041785, dated Dec. 5, 2017.
Notice of Reasons for Rejection for Japanese Application No. 2014-041785, dated Nov. 30, 2017.
Notice of Reasons for Rejection for Japanese Application No. 2014-048410, dated Dec. 29, 2017.
Notice of Reasons for Rejection for Japanese Application No. 2014-048411, dated Dec. 5, 2017.
Notice of Reasons for Rejection for Japanese Application No. 2014-049918, dated Dec. 12, 2017.
Notice of Reasons for Rejection for Japanese Application No. 2014-049919, dated Nov. 29, 2017.
Notice of Reasons for Rejection for Japanese Application No. 2014-051114, dated Dec. 28, 2017.
Notice of Reasons for Rejection for Japanese Application No. 2014-051596, dated Jan. 9, 2018.
Notice of Reasons for Rejection for Japanese Application No. 2014-051597, dated Jan. 9, 2018.
Second Office Action for Chinese Application No. 201410097922.9, dated Jan. 9, 2018.

* cited by examiner

METHOD AND APPARATUS FOR CONTROLLING A PROCESS PLANT WITH LOCATION AWARE MOBILE CONTROL DEVICES

TECHNICAL FIELD

The present disclosure relates generally to process plants and to process control systems, and more particularly, to the use of mobile user-interface devices in process plants and in process control systems.

BACKGROUND

Distributed process control systems, like those used in chemical, petroleum or other process plants, typically include one or more process controllers communicatively coupled to one or more field devices via analog, digital or combined analog/digital buses, or via a wireless communication link or network. The field devices, which may be, for example, valves, valve positioners, switches and transmitters (e.g., temperature, pressure, level and flow rate sensors), are located within the process environment and generally perform physical or process control functions such as opening or closing valves, measuring process parameters, etc. to control one or more process executing within the process plant or system. Smart field devices, such as the field devices conforming to the well-known Fieldbus, protocol may also perform control calculations, alarming functions, and other control functions commonly implemented within the controller. The process controllers, which are also typically located within the plant environment, receive signals indicative of process measurements made by the field devices and/or other information pertaining to the field devices and execute a controller application that runs, for example, different control modules that make process control decisions, generate control signals based on the received information and coordinate with the control modules or blocks being performed in the field devices, such as HART®, WirelessHART®, and FOUNDATION® Fieldbus field devices. The control modules in the controller send the control signals over the communication lines or links to the field devices to thereby control the operation of at least a portion of the process plant or system.

Information from the field devices and the controller is usually made available over a data highway to one or more other hardware devices, such as operator workstations, personal computers or computing devices, data historians, report generators, centralized databases, or other centralized administrative computing devices that are typically placed in control rooms or other locations away from the harsher plant environment. Each of these hardware devices typically is centralized across the process plant or across a portion of the process plant. These hardware devices run applications that may, for example, enable an operator to perform functions with respect to controlling a process and/or operating the process plant, such as changing settings of the process control routine, modifying the operation of the control modules within the controllers or the field devices, viewing the current state of the process, viewing alarms generated by field devices and controllers, simulating the operation of the process for the purpose of training personnel or testing the process control software, keeping and updating a configuration database, etc. The data highway utilized by the hardware devices, controllers and field devices may include a wired communication path, a wireless communication path, or a combination of wired and wireless communication paths.

As an example, the DeltaV™ control system, sold by Emerson Process Management, includes multiple applications stored within and executed by different devices located at diverse places within a process plant. A configuration application, which resides in one or more operator workstations or computing devices, enables users to create or change process control modules and download these process control modules via a data highway to dedicated distributed controllers. Typically, these control modules are made up of communicatively interconnected function blocks, which are objects in an object oriented programming protocol that perform functions within the control scheme based on inputs thereto and that provide outputs to other function blocks within the control scheme. The configuration application may also allow a configuration designer to create or change operator interfaces which are used by a viewing application to display data to an operator and to enable the operator to change settings, such as set points, within the process control routines. Each dedicated controller and, in some cases, one or more field devices, stores and executes a respective controller application that runs the control modules assigned and downloaded thereto to implement actual process control functionality. The viewing applications, which may be executed on one or more operator workstations (or on one or more remote computing devices in communicative connection with the operator workstations and the data highway), receive data from the controller application via the data highway and display this data to process control system designers, operators, or users using the UIs, and may provide any of a number of different views, such as an operator's view, an engineer's view, a technician's view, etc. A data historian application is typically stored in and executed by a data historian device that collects and stores some or all of the data provided across the data highway while a configuration database application may run in a still further computer attached to the data highway to store the current process control routine configuration and data associated therewith. Alternatively, the configuration database may be located in the same workstation as the configuration application.

The architecture of process control plants and process control systems has been strongly influenced by limited controller and device memory, communications bandwidth, and controller and device processor capability. For example, the use of dynamic and static non-volatile memory in the controller is usually minimized or, at the least, carefully managed. As a result, during system configuration (e.g., a priori), a user typically must choose which data in the controller is to be archived or saved, the frequency at which it will be saved, and whether or not compression is used, and the controller is accordingly configured with this limited set of data rules. Consequently, data which could be useful in troubleshooting and process analysis is often not archived, and if it is collected, the useful information may have been lost due to data compression.

Additionally, to minimize controller memory usage in currently known process control systems, data that is to be archived or saved is reported to the workstation or computing device for storage, e.g., at the appropriate historian or data silo. The current techniques used to report the data utilize communication resources poorly and induce excessive controller loading. Additionally, due to the time delays in communication and sampling at the historian or silo, the data collection and time stamping are often out of sync with the actual process.

Similarly, in batch process control systems, to minimize controller memory usage, batch recipes and snapshots of controller configuration typically remain stored at a centralized administrative computing device or location (e.g., at a data silo or historian), and are transferred to a controller only when needed. Such a strategy introduces significant burst loads in the controller and in communication channels between the workstation or centralized administrative computing device and the controller.

Furthermore, the capability and performance limitations of relational databases of process control systems, combined with the high cost of disk storage, play a large part in structuring application data into independent entities or silos to meet the objectives of specific applications. For example, within the DeltaV™ system, process models, continuous historical data, and batch and event data are saved and/or archived in three different application databases or silos of data. Each silo has a different interface to access the data stored therein.

Structuring data in this manner creates a barrier in the way that historized data is accessed and used. For example, the root cause of variations in product quality may be associated with data in one or more of these data files. However, because of the different file structures it is not possible to provide tools that allow this data to be quickly and easily accessed for analysis. Further, audit or synchronizing functions must be performed to ensure that data across different silos is consistent.

The limitations of process plants and process control system discussed above, and other limitations, may undesirably manifest themselves in the operation and optimization of process plants or process control systems, for instance, during plant operations, trouble shooting, and/or predictive modeling. For example, such limitations force cumbersome and lengthy work flows that must be performed in order to obtain data for troubleshooting and generating updated models. Additionally, the obtained data may be inaccurate due to data compression, insufficient bandwidth, or shifted time stamps.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

In an embodiment, a computer-readable medium stores instructions, executable by a processor in a mobile user interface device for controlling a process plant. The instructions cause the processor to transmit to a server a first request for first data from a data storage area and to receive from the server, in response to the first request, first data from the storage area. The instructions also cause the processor to cause the display to display the first data received from the server and to receive an indication that the mobile user interface device is in proximity to an external device. Further, the instructions cause the processor to transmit to the server a second request for second data according to the received indication and to receive from the server, in response to the second request, second data.

DETAILED DESCRIPTION

In an embodiment of the present disclosure, state information is seamlessly transferred from a first user interface ("UI") device to a second UI device, allowing a user to resume a session from the first UI device without any interruption in work flow. The state transfer may also allow a first user of a first UI device to collaborate with a second user of a second UI device, so that the two users may work on tasks or work items in a cooperative manner. In another embodiment, a UI device may provide output according to the context of the UI device's operation. For example, the UI device may account for the UI device location and equipment location, the type of UI device, or other considerations when determining what information to provide or how to provide information at the UI device display. The UI device and mobile control room disclosed herein offers the benefit of "untethering" operators and users of UI devices from physical control rooms. A user of such a UI device may move freely throughout the plant without interruption in workflow and without loss of functionality or capability with regard to monitoring and controlling the process.

Figure 1:
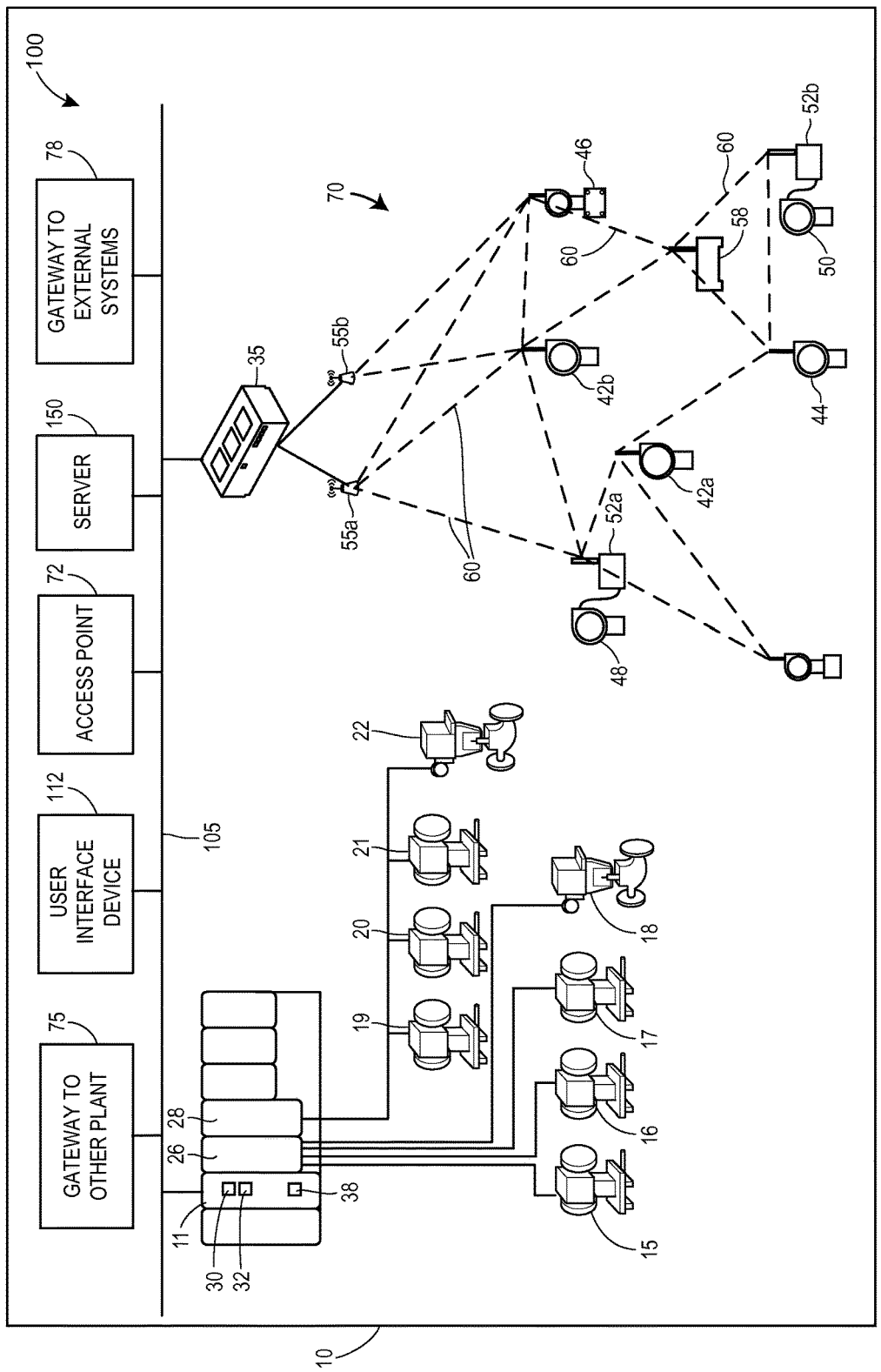
FIG. 1 is a block diagram of an exemplary process control network operating in a process control system or process plant.

FIG. 1 is a block diagram of an exemplary process control network 100 operating in a process control system or process plant 10. The process control network 100 may include a network backbone 105, an access point 72, a gateway 75 to another plant, a gateway 78 to external systems, a UI device 112, a server 150, a controller 11, a wireless gateway 35, input/output (I/O) cards 26 and 28, wired field devices 15-22, a wireless gateway 35, and a communication network 70. The communication network 70 may include wireless devices 40-58, which include wireless field devices 40-46, wireless adapters 52a and 52b, access points 55a and 55b, and router 58. The wireless adapters 52a and 52b may be connected to non-wireless field devices 48 and 50, respectively. The controller 11 may include a processor 30, a memory 32, and one or more control routines 38.

The UI device 112 may be communicatively connected to the controller 11 and the wireless gateway 35 via the network backbone 105. The controller 11 may be communicatively connected to wired field devices 15-22 via input/output (I/O) cards 26 and 28 and may be communicatively connected to wireless field devices 40-46 via the network backbone 105 and a wireless gateway 35. The controller 11 may operate to implement a batch process or a continuous process using at least some of the field devices 15-22 and 40-46. The controller 11, which may be, by way of example, the DeltaV™ controller sold by Emerson Process Management, is communicatively connected to the process control network backbone 105. The controller 11 may be also communicatively connected to the field devices 15-22 and 40-46 using any desired hardware and software associated with, for example, standard 4-20 ma devices, I/O cards 26, 28, and/or any smart communication protocol such as the FOUNDATION® Fieldbus protocol, the HART® protocol, the WirelessHART® protocol, etc. In the embodiment illustrated in FIG. 1, the controller 11, the field devices 15-22 and the I/O cards 26, 28 are wired devices, and the field devices 40-46 are wireless field devices.

In operation of the UI device 112, the UI device 112 may execute a user interface ("UI"), allowing the UI device 112 to accept input via an input interface and provide output at a display. In some embodiments, the UI may be executed, in whole or in part, at the server 150, where the server 150 may transmit display data to the UI device 112. The UI device 112 may receive UI data (which may include display data and process parameter data) via the backbone 105 from other nodes in the process control network 100, such as the controller 11, the wireless gateway 35, or the server 150. Based on the UI data received at the UI device 112, the UI device 112 provides output (i.e., visual representations or graphics) representing aspects of the process associated with the process control network 100, allowing the user to monitor the process. The user may also affect control of the process by providing input at the UI device 112. To illustrate, the UI device 112 may provide graphics representing, for example, a tank filling process. In such a scenario, the user may read a tank level measurement and decide that the tank needs to be filled. The user may interact with an inlet valve graphic displayed at the UI device 112 and input a command causing the inlet valve to open.

Figure 12:
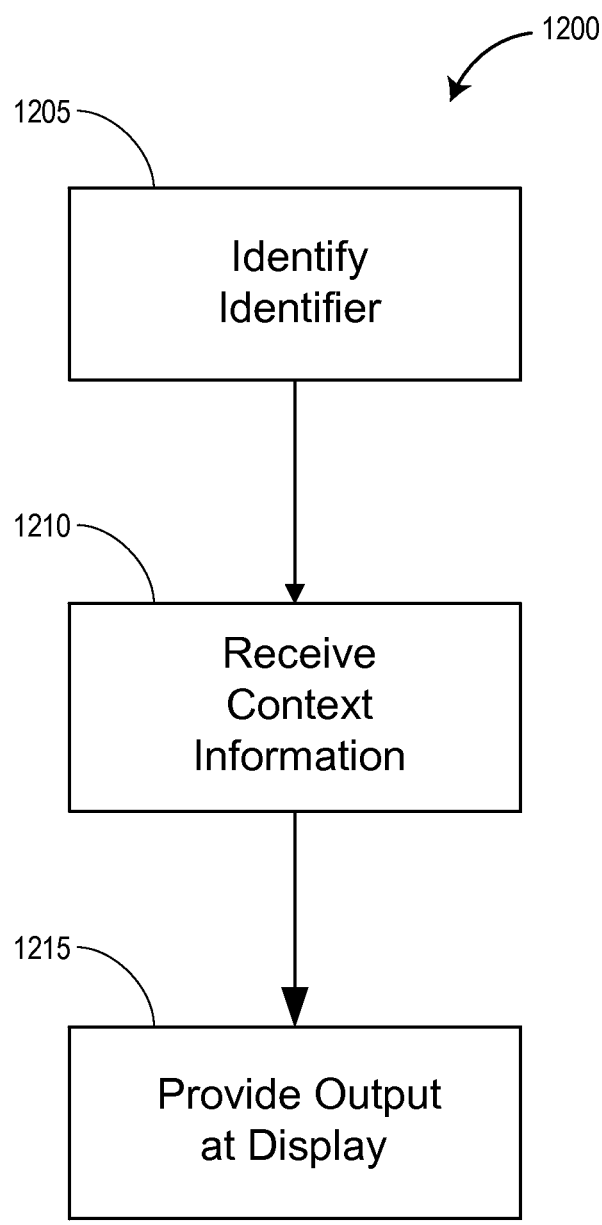
FIG. 12 is a flow chart depicting an exemplary method for generating a graphical user interface.

In further operation, the UI device 112 may execute a number of routines, modules, or services in addition to the UI. In one embodiment the UI device 112 may execute a context awareness routine, which may include, for example, various routines or sub-routines related to location awareness, equipment awareness, or scheduling awareness (as shown in FIG. 12). These context routines may enable the UI device 112 to render a graphical user interface configuration ("GUI configuration") suited to a particular environment or context in which the UI device 112 is operating. In further operation, the UI device 112 may also execute a state determination routine, enabling the UI device 112 to track and save the state of the UI device 112, including the state of the applications being executed at the UI device 112 (such as the UI). By tracking the state of applications on the UI device 112, the UI device 112 may allow a user to, for example, initiate a session on a first UI device 112 and start using a second UI device 112, resuming work flow from his previous session with minimal interruption.

In certain embodiments, the UI device 112 may be any type of client, such as a thin client, web client, or thick client. For example, the UI device 112 may depend on other nodes, computers, or servers for the bulk of the processing necessary for operation of the UI device 112. In such an example, the UI device 112 may communicate with the server 150, where the server 150 may communicate with one or more other nodes on the process control network 100 and may determine the display data and/or process data to transmit to the UI device 112. Furthermore, the UI device 112 may pass any data related to received user input to the server 150 so that the server 150 may process the data related to user input and operate accordingly. In other words, the UI device 112 may do little more than render graphics and act as a portal to one or more nodes or servers that store the data and execute the routines necessary for operation of the UI device 112. A thin client UI device offers the advantage of minimal hardware requirements for the UI device 112.

In other embodiments, the UI device 112 may be a web client. In such an embodiment, a user of the UI device 112 may interact with the process control system via a browser at the UI device 112. The browser enables the user to access data and resources at another node or server 150 (such as the server 150) via the backbone 105. For example, the browser may receive UI data, such as display data or process parameter data, from the server 150, allowing the browser to depict graphics for controlling and/or monitoring some or all of the process. The browser may also receive user input (such as a mouse click on a graphic). The user input may cause the browser to retrieve or access an information resource stored on the server 150. For example, the mouse click may cause the browser to retrieve (from the server 150) and display information pertaining to the clicked graphic.

In yet other embodiments, the bulk of the processing for the UI device 112 may take place at the UI device 112. For example, the UI device 112 may execute the previously discussed UI, state determination routine, and context awareness routine. The UI device 112 may also store, access, and analyze data locally.

In operation, a user may interact with the UI device 112 to monitor or control one or more devices in the process control network 100, such as any of the field devices 15-22 or the devices 40-48. The user may interact with the UI device 112, for example, to modify or change a parameter associated with a control routine stored in the controller 11.

The processor 30 of the controller 11 implements or oversees one or more process control routines (stored in a memory 32), which may include control loops. The processor 30 may communicate with the field devices 15-22 and 40-46 and with other nodes that are communicatively connected to the backbone 105. It should be noted that any control routines or modules (including quality prediction and fault detection modules or function blocks) described herein may have parts thereof implemented or executed by different controllers or other devices if so desired. Likewise, the control routines or modules described herein which are to be implemented within the process control system 10 may take any form, including software, firmware, hardware, etc. Control routines may be implemented in any desired software format, such as using object oriented programming, ladder logic, sequential function charts, function block diagrams, or using any other software programming language or design paradigm. In particular, the control routines may be implemented by a user through the UI device 112. The control routines may be stored in any desired type of memory, such as random access memory (RAM), or read only memory (ROM). Likewise, the control routines may be hard-coded into, for example, one or more EPROMs, EEPROMs, application specific integrated circuits (ASICs), or any other hardware or firmware elements. Thus, the controller 11 may be configured (by a user using a UI device 112 in certain embodiments) to implement a control strategy or control routine in any desired manner.

In some embodiments of the UI device 112, a user may interact with the UI device 112 to implement a control strategy at the controller 11 using what are commonly referred to as function blocks, wherein each function block is an object or other part (e.g., a subroutine) of an overall control routine and operates in conjunction with other function blocks (via communications called links) to implement process control loops within the process control system 10. Control based function blocks typically perform one of an input function, such as that associated with a transmitter, a sensor or other process parameter measurement device; a control function, such as that associated with a control routine that performs PID, fuzzy logic, etc. control; or an output function which controls the operation of some device, such as a valve, to perform some physical function within the process control system. Of course, hybrid and other types of function blocks exist. The function blocks may have graphical representations that are provided at the UI device 112, allowing a user to easily modify the types of function blocks, the connections between the function blocks, and the inputs/outputs associated with each of function blocks implemented in the process control system. Function blocks may be stored in and executed by the controller 11, which is typically the case when these function blocks are used for, or are associated with standard 4-20 ma devices and some types of smart field devices such as HART devices, or may be stored in and implemented by the field devices themselves, which can be the case with Fieldbus devices. The controller 11 may include one or more control routines 38 that may implement one or more control loops. Each control loop is typically referred to as a control module, and may be performed by executing one or more of the function blocks.

In the embodiment shown in FIG. 1, the wireless field devices 40-46 communicate in a wireless network 70 using a wireless protocol, such as the WirelessHART protocol. In certain embodiments, the UI device 112 may be capable of communicating with the wireless field devices 40-46 using the wireless network 70. Such wireless field devices 40-46 may directly communicate with one or more other nodes of the process control network 100 that are also configured to communicate wirelessly (using the wireless protocol, for example). To communicate with one or more other nodes that are not configured to communicate wirelessly, the wireless field devices 40-46 may utilize a wireless gateway 35 connected to the backbone 105. Of course, the field devices 15-22 and 40-46 could conform to any other desired standard(s) or protocols, such as any wired or wireless protocols, including any standards or protocols developed in the future.

The wireless gateway 35 is an example of a provider device 110 that may provide access to various wireless devices 40-58 of a wireless communication network 70. In particular, the wireless gateway 35 provides communicative coupling between the wireless devices 40-58 and other nodes of the process control network 100 (including the controller 11 of FIG. 1). The wireless gateway 35 provides communicative coupling, in some cases, by the routing, buffering, and timing services to lower layers of the wired and wireless protocol stacks (e.g., address conversion, routing, packet segmentation, prioritization, etc.) while tunneling a shared layer or layers of the wired and wireless protocol stacks. In other cases, the wireless gateway 35 may translate commands between wired and wireless protocols that do not share any protocol layers. In addition to protocol and command conversion, the wireless gateway 35 may provide synchronized clocking used by time slots and superframes (sets of communication time slots spaced equally in time) of a scheduling scheme associated with the wireless protocol implemented in the wireless network 30. Furthermore, the wireless gateway 35 may provide network management and administrative functions for the wireless network 70, such as resource management, performance adjustments, network fault mitigation, monitoring traffic, security, and the like.

Similar to the wired field devices 15-22, the wireless field devices 40-46 of the wireless network 70 may perform physical control functions within the process plant 10, e.g., opening or closing valves or take measurements of process parameters. The wireless field devices 40-46, however, are configured to communicate using the wireless protocol of the network 70. As such, the wireless field devices 40-46, the wireless gateway, and other wireless nodes 52-58 of the wireless network 70 are producers and consumers of wireless communication packets.

In some scenarios, the wireless network 70 may include non-wireless devices. For example, a field device 48 of FIG. 1 may be a legacy 4-20 mA device and a field device 50 may be a traditional wired HART device. To communicate within the network 30, the field devices 48 and 50 may be connected to the wireless communication network 70 via a wireless adaptor (WA) 52a or 52b. Additionally, the wireless adaptors 52a, 52b may support other communication protocols such as Foundation® Fieldbus, PROFIBUS, DeviceNet, etc. Furthermore, the wireless network 30 may include one or more network access points 55a, 55b, which may be separate physical devices in wired communication with the wireless gateway 35 or may be provided with the wireless gateway 35 as an integral device. The wireless network 70 may also include one or more routers 58 to forward packets from one wireless device to another wireless device within the wireless communication network 30. The wireless devices 32-46 and 52-58 may communicate with each other and with the wireless gateway 35 over wireless links 60 of the wireless communication network 70.

Accordingly, FIG. 1 includes several examples of provider devices 110 which primarily serve to provide network routing functionality and administration to various networks of the process control system. For example, the wireless gateway 35, the access points 55a, 55b, and the router 58 include functionality to route wireless packets in the wireless communication network 70. The wireless gateway 35 performs traffic management and administrative functions for the wireless network 70, as well as routes traffic to and from wired networks that are in communicative connection with the wireless network 70. The wireless network 70 may utilize a wireless process control protocol that specifically supports process control messages and functions, such as WirelessHART.

In certain embodiments, the process control network 100 may include other nodes connected to the network backbone 105 that communicate using other wireless protocols. For example, the process control network 100 may include one or more wireless access points 72 that utilize other wireless protocols, such as WiFi or other IEEE 802.11 compliant wireless local area network protocols, mobile communication protocols such as WiMAX (Worldwide Interoperability for Microwave Access), LTE (Long Term Evolution) or other ITU-R (International Telecommunication Union Radiocommunication Sector) compatible protocols, short-wavelength radio communications such as near field communications (NFC) and Bluetooth, or other wireless communication protocols. Typically, such wireless access points 72 allow handheld or other portable computing devices to communicate over a respective wireless network that is different from the wireless network 70 and that supports a different wireless protocol than the wireless network 70. In some embodiments, the UI device 112 communicates over the process control network 100 using a wireless access point 72. In some scenarios, in addition to portable computing devices, one or more process control devices (e.g., controller 11, field devices 15-22, or wireless devices 35, 40-58) may also communicate using the wireless network supported by the access points 72.

Additionally or alternatively, the provider nodes 110 may include one or more gateways 75, 78 to systems that are external to the immediate process control system 10. In such embodiments, the UI device 112 may be used to control, monitor, or otherwise communicate with said external systems. Typically, such systems are customers or suppliers of information generated or operated on by the process control system 10. For example, a plant gateway node 75 may communicatively connect the immediate process plant 10 (having its own respective process control data network backbone 105) with another process plant having its own respective network backbone. In an embodiment, a single network backbone 105 may service multiple process plants or process control environments.

In another example, a plant gateway node 75 may communicatively connect the immediate process plant to a legacy or prior art process plant that does not include a process control network 100 or backbone 105. In this example, the plant gateway node 75 may convert or translate messages between a protocol utilized by the process control big data backbone 105 of the plant 10 and a different protocol utilized by the legacy system (e.g., Ethernet, Profibus, Fieldbus, DeviceNet, etc.). In such an example, the UI device 112 may be used to control, monitor, or otherwise communicate with systems or networks in said legacy or prior art process plant.

The provider nodes 110 may include one or more external system gateway nodes 78 to communicatively connect the process control network 100 with the network of an external public or private system, such as a laboratory system (e.g., Laboratory Information Management System or LIMS), an operator rounds database, a materials handling system, a maintenance management system, a product inventory control system, a production scheduling system, a weather data system, a shipping and handling system, a packaging system, the Internet, another provider's process control system, or other external systems.

Although FIG. 1 illustrates a single controller 11 with a finite number of field devices 15-22 and 40-46, this is only an illustrative and a non-limiting embodiment. Any number of controllers 11 may be included in the provider nodes 110 of the process control network 100, and any of the controllers 11 may communicate with any number of wired or wireless field devices 15-22, 40-46 to control a process in the plan 10. Furthermore, the process plant 10 may also include any number of wireless gateways 35, routers 58, access points 55, wireless process control communication networks 70, access points 72, and/or gateways 75, 78.

Figure 2A:
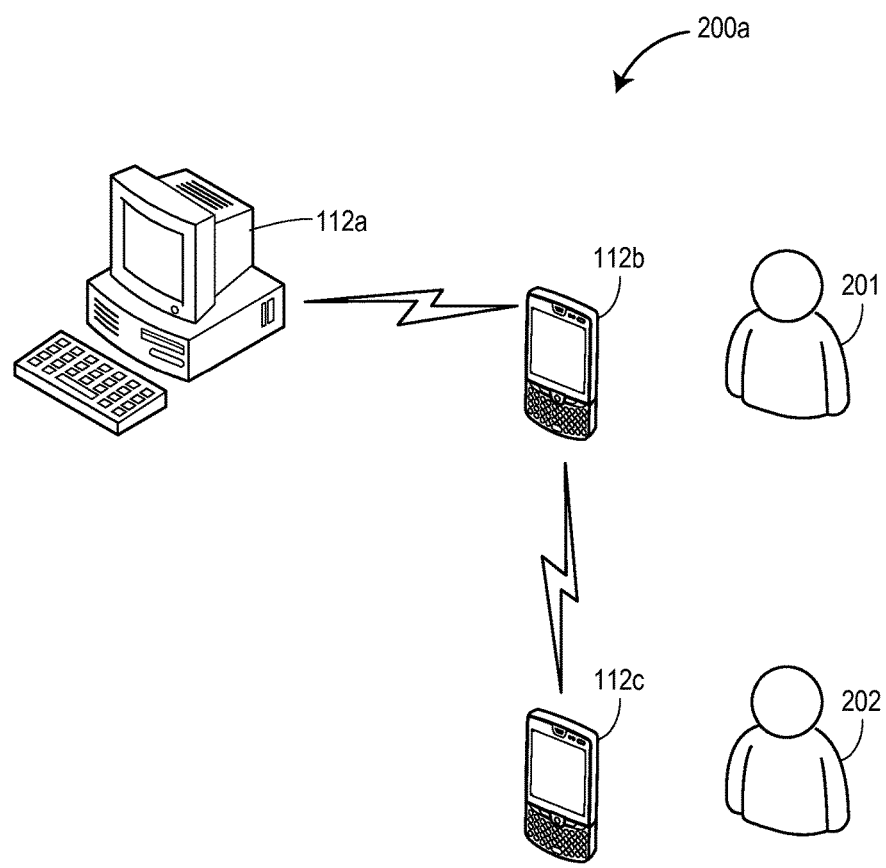
FIG. 2a illustrates an aspect of an exemplary mobile control room.

FIG. 2a illustrates an aspect of an exemplary mobile control room 200a. The mobile control room 200a includes a UI device 112a, a UI device 112b, a UI device 112c, a user 201, and a user 202.

The mobile control room 200a may enable the user 201 to synchronize the UI devices 112a and 112b by transferring the state of the UI device 112a to the UI device 112b. The UI state transfer may cause the UI device 112b to display similar information to the information displayed at the UI device 112a. The state transfer may also cause the UI device 112b to execute similar routines or applications executing at the UI device 112a. Furthermore, the similar routines or applications on the UI device 112b may execute at the same state as the routines or applications executing at the UI device 112a. By transferring the UI state of operation from UI device 112a to UI device 112b, the user 201 may stop using UI device 112a and start using UI device 112b without any loss in workflow.

Similarly, the control room 200a may enable a secure collaboration session to be established between at least two UI devices. In an embodiment, the secure collaboration session may be automatically established when the two devices 112 move into each other's proximity and become mutually aware of one another. Once the session is established, synchronization of data between the UI devices during a collaborative work session may be performed. More particularly, the user 201 may collaborate with the user 202, where the UI device 112b may transfer state information to the UI device 112c. By transferring state information from UI device 112b to UI device 112c, the UI device 112c may identify the state of operation of the UI device 112b. For example, the UI device 112c may depict the same or similar information being displayed at the UI device 112b. The UI devices 112b and 112c may also launch communication routines, allowing the users 201 and 202 to exchange information (such as text, video, and Voice over IP) via the UI devices 112b and 112c. For example, the UI devices 112b and 112c may exchange information pertaining to work items or tasks, allowing the users 201 and 202 to work on an item or task in a coordinated manner. In one example, the users may be able to checkout a device via the UI devices, so that other user knows the device is being addressed.

In some embodiments, the UI devices 112a-112c may transfer state information directly between each other. The UI devices 112a-112c may use short-range wireless technology such as near field communication (ISO/IEC 14443 and 1809 standards) or Bluetooth (IEEE 802.15.1 standards). In other embodiments, the UI devices 112a-112c may transfer state information via a node, such as the server 150 shown in FIG. 1, via the network backbone 105. In certain embodiments, the UI devices 112a-112c may be thin clients, where the UI devices 112a-112c may render graphics but the bulk of the processing for the UI devices 112a-112c occurs at a node (such as the server 150 shown in FIG. 1) on the process control network 100. In such embodiments, transferring states between UI devices 112a-112c may include transferring state information between UIs executing at the node.

Figure 2B:
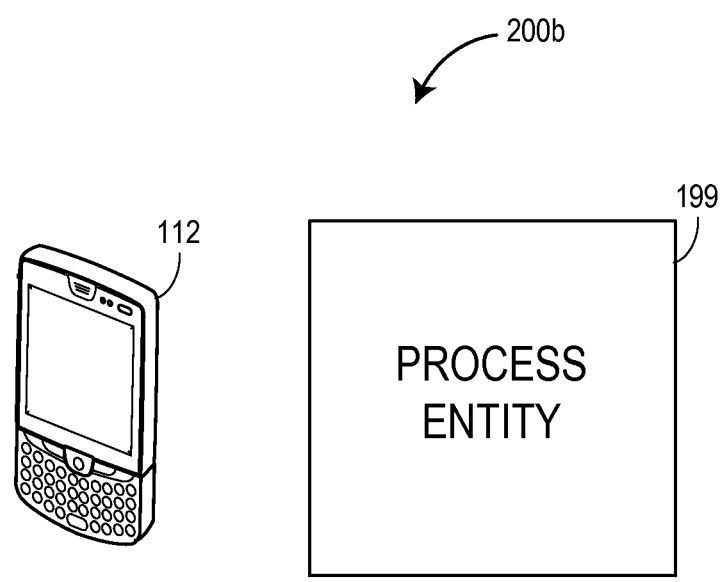
FIG. 2b illustrates a second aspect of an exemplary mobile control room.

FIG. 2b illustrates a second aspect of an exemplary mobile control room 200b with context awareness. The mobile control room 200b includes a UI device 112 and a process entity 199. The process entity 199 may be a process area, device, piece of equipment, or another UI device.

In operation, the mobile control room 200b may enable a UI device, such as the UI device 112, to receive information about the environment and manner of use of the UI device 112. For example, the UI device 112 may identify its location in a process plant by receiving location data from a GPS device or from a node on a network such as the process control network 100 shown in FIG. 1. For example, the UI device 112 may execute a context awareness routine and/or location awareness routine that may track a user's location, schedule, skill set, and/or work item progress. In other embodiments, a server 150, such as the server 150 shown in FIG. 1, may execute the context and/or location awareness routine, where the context and/or location awareness routine communicate with the UI device 112. Based on the tracking, the location and/or context awareness routine may enable plant maps, equipment photos or videos, GPS coordinates and other information corresponding to a worker's location to be automatically determined and displayed on the UI device 112 to aid the mobile worker in navigation and equipment identification. Additionally or alternatively, as a user may have a particular skill set, the context awareness routine or UI may automatically customize the appearance of the GUI configuration based on the skill sets and/or the location of the UI device 112. For example, in another scenario, the context awareness routine may inform the user in real-time of a newly opened work item or alarm that pertains to a piece of equipment in his or her vicinity and that the mobile worker is qualified to address. In yet another scenario, the context awareness routine may cause one or more applications that specifically pertain to the location and/or skill set of the user to be automatically launched at the UI device 112.

The UI device 112 may identify a particular process entity, such as a field device or piece of equipment, in its vicinity. The process entities may automatically self-identify to the UI device 112, e.g., by using a wireless communication protocol such as an IEEE 802.11 compliant wireless local area network protocol, a mobile communication protocol such as WiMAX, LTE or other ITU-R compatible protocol, a short-wavelength radio communication protocol such as near field communications (NFC) or Bluetooth, a process control wireless protocol such as WirelessHART, or some other suitable wireless communication protocol. In some embodiments the UI device 112 may receive schedules or work items relevant to the identified location, equipment or field device. In an embodiment, identifying a process entity may cause the UI device 112 to automatically launch one or more applications that pertain to the identified process entity, such as a work order, a diagnostic, an analysis, or other application.

In operation, the UI device 112 may identify the process entity 199 via an image sensor at the UI device 112. In some instances, a user of the UI device 112 may take a picture of the process entity 199 and the UI device 112 may identify the process entity 199 based on the captured image. In some embodiments, the process entity 199 may include, or be proximate to, a context ID device (such as the context ID device 902 shown in FIG. 9) that provides a unique tag or identifier (e.g., a barcode). The UI device 112 may capture the unique tag, allowing the UI device 112 to identify the process entity 199 or the context ID device. The UI device 112 may provide information (via a display, for example) relevant to the process entity 199 or relevant to the context ID device. In some embodiments, the UI device 112 may determine the location of the UI device 112 by determining the location of the identified process entity 199 or the context ID device. Once the location of the UI device 112 has been determined, the UI device 112 may provide context information (via a display, for example) relevant to the determined location. The context information may, for example, relate to other process entities in the area, schedules, or work items. In some embodiments, the context ID device may transmit the contextual information to the UI device 112. In other embodiments, the UI device 112 may receive the context information from a server 150 in response to transmitting its location to the server 150.

In further operation, the UI device 112 may identify its own location by receiving location data from one or more GPS satellites. After identifying its own location, the UI device 112 may communicate with a database or another device to identify process entities with locations proximate to the location of the UI device 112. The UI device 112 may transmit its location to a server 150 (such as the server 150 shown in FIG. 1). The server 150 may transmit context information to the UI device 112. The context information may relate to one or more process areas, devices, or equipment proximate to the UI device 112. The context information may also relate to schedules or work items relevant to the location of the UI device 112. FIGS. 9-12 elaborate on the operation of the context awareness routine in various embodiments of the present disclosure.

Figure 2C:
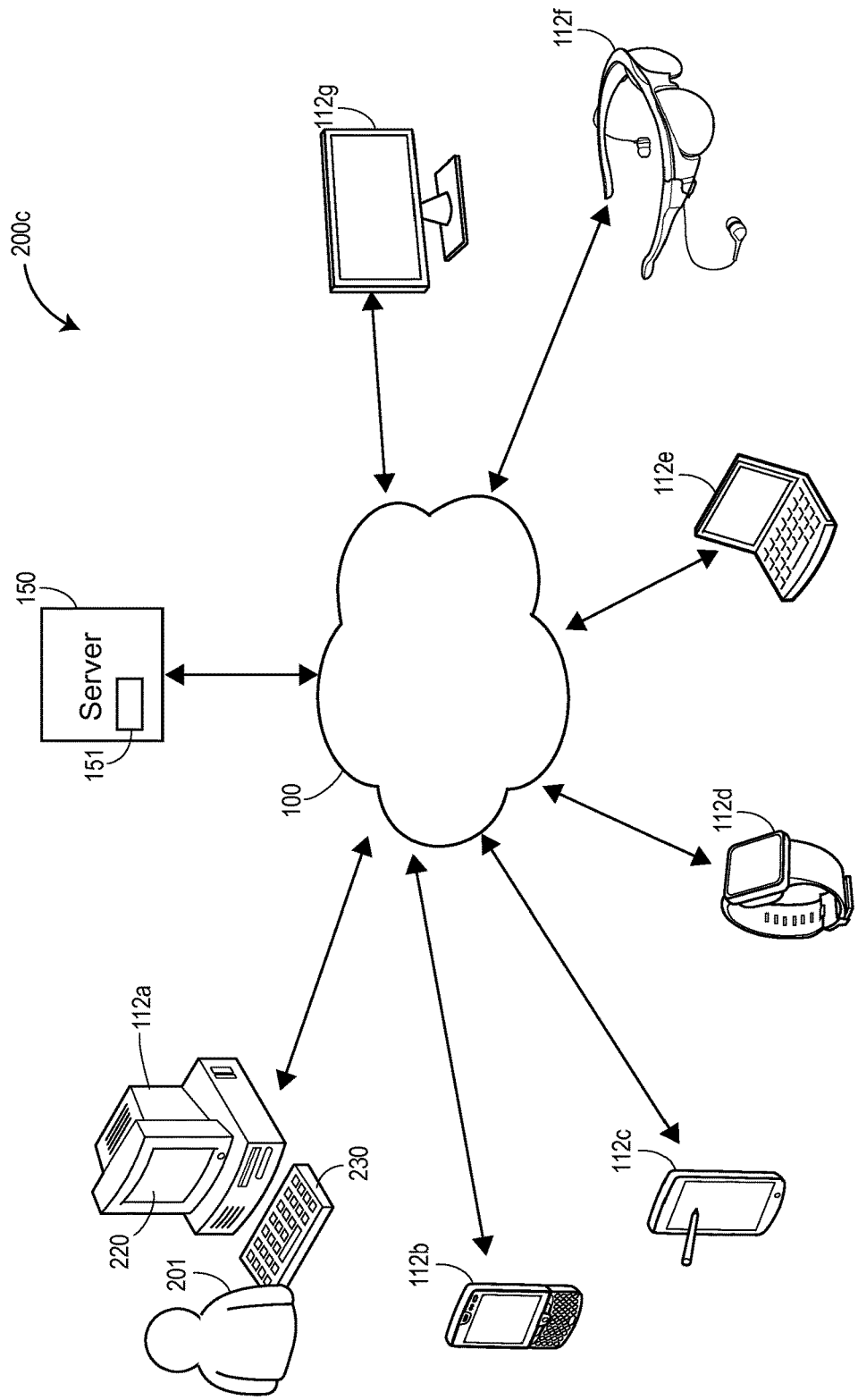
FIG. 2c illustrates devices in an exemplary mobile control room.

FIG. 2c illustrates devices in an exemplary mobile control room 200c. The mobile control room 200c may enable the transferring of a state of operation to or from any of UI devices 112a-112g, enabling UI device synchronization and user collaboration. The mobile control room 200 includes the server 150, the process control network 100, the user 201, and the UI devices 112a-112g. The server 150 may include a database 151, which may include display data, parameter data, historian data, context data, UI state information data, or any other process plant data. The database 151 may be stored at a memory on the server 150. Each of the UI devices 112a-112g may be any type of process control UI device that provides information about, and accepts user input with respect to, a process or elements associated with a process (similar to the UI device 112 shown in FIG. 1). Each of the UI devices 112a-112g may execute a corresponding UI. In alternative embodiments, the UI may execute, in whole or in part, at the server 150 and be provided to UI devices 112a-112g. Likewise, the process control network 100 may be similar to the process control network 100 shown in FIG. 1 and may include similar nodes, devices, and equipment. Each of the UI devices 112a-112g may communicate with the server 150 via the backbone 105 of the process control network 100. In the embodiment shown in FIG. 2c, the user 201 may interact with the UI device 112a through a display 220 and an input interface 230 (though the user 201 may interact with any of the UI devices 112a-112g). In this embodiment, the UI device 112a is a stationary workstation, wherein the input interface 230 is a keyboard and display 220 is a monitor; the UI device 112b is a mobile device (such as a phone or PDA); the UI device 112c is a tablet capable of receiving touch input from a user's hand or a stylus; the UI device 112d is a wearable device (a watch with a touch screen in this instance); the UI device 112e is a laptop computer; the UI device 112f is a wearable device (a headset with a heads-up display in this instance); and the UI device 112g is a television, which may have an associated input interface (not shown) such as a keyboard, a mouse, a touch-screen (such as a capacitive touch screen), a motion sensor, or any other type of device capable of accepting user input. Of course, any combination of the UI devices 112a-112g may be employed in various embodiments. Furthermore, the mobile control room 200c may include additional UI devices similar to any of the UI devices 112a-112g.

In the mobile control room 200c, each of the UI devices 112a-112g may enable the user 201 to monitor and/or control a process or elements associated with a process via the process control network 100. In an embodiment, each of the UI devices 112a-112g may be web clients or thin clients. In such an embodiment, the server 150 may execute the UI and any other routines used for operation of one or more of the UI devices 112a-112g. The UI devices 112a-112g may pass user input data to the server 150, where the server 150 may respond to the user input. The server 150 may transmit display data to the UI devices 112a-112g. Because the server 150 may handle the bulk of the processing for operation of the UI devices 112a-112g in this embodiment, the server 150 may track the state of operation for each UI device 112a-112g by monitoring the execution of routines at the server 150 and monitoring the data being received from and transmitted to each of the UI devices 112a-112g.

The server 150 may save UI state information (e.g., to the database 151) periodically or in response to a triggering event. The UI state information may represent the state of the UI device at the time of capture. The UI state information may include information relating to the user or operator interacting with the UI device; the applications, programs, routines, or modules executing with respect to the UI device; the graphics or sound being presented at the UI device; the portion(s) of the plant about which data displayed pertain; or any other information relating to operation of the UI device. When the server 150 receives a request for a state transfer, the server 150 may access locally saved UI state information at the database 151 and may transmit the UI state information to the appropriate UI executing at the server 150. The UI may transmit corresponding display data to the appropriate UI device. For example, the UI device 112b may request state information from UI device 112a (where the user 201 may wish to switch UI devices from 112a to 112b without disrupting workflow, for example). In some embodiments, the UI device 112a and 112b may each have a UI executing at the server 150. The server 150 may access locally stored UI state information at the database 151 and may pass the UI state information to the UI for the UI device 112b. The UI for the UI device 112b may determine what should be displayed at the UI device 112b based on the saved UI state information, and transfer display data to the UI device 112b.

In some embodiments, each of the UI devices 112a-112g may capture and store UI state information at the database 151 when a user interacts with the respective UI device. The UI device may transmit the UI state information to the server 150 over the network 100. The server 150 may transmit the UI state information to any of the UI devices 112a-112g so that, for example, upon receiving a request from a particular one of the UI devices 112a-112g, the particular UI device may operate in a manner consistent with the received UI state information.

As an example, the user 201 may begin using the UI device 112a (though the following example may be carried out with any of the UI devices 112b-112g as well). As the user 201 interacts with the UI device 112a, the UI device 112a may periodically capture and save UI state information. The UI state information may relate to the user 201, representing a user ID or user title/role, for example. The UI state information may also relate to the user's session, including information about the programs or routines running on the UI device 112a, the time of capture, the session length, the configuration of the graphics displayed at the display 220 of the UI device 112a, the entities (i.e., the process areas, devices, equipment or data) being monitored or controlled at the UI device 112a, and the type of UI device being used (a stationary workstation, in this case). After capturing and saving the UI state information, the UI device 112a may transmit the UI state information to the server 150 over the process control network 100 so that the server 150 may store the UI state information at the database 151.

The user 201 may decide to use a mobile UI device, such as any of the UI devices 112b-112f. In an embodiment, the user 201 may utilize the UI device 112b, where the UI device 112b may recognize the user 201. The UI device 112b may communicate with the server 150 to retrieve the most recent UI state information associated with the user 201 (i.e., the UI state information most recently captured at the UI device 112a in this case). In some embodiments, the communication may trigger in the UI device 112a an additional capture of state information related to the UI device 112a. The UI device 112b may generate a GUI configuration based on the received UI state information so that the display of the UI device 112b corresponds, at least in part, to the display of the UI device 112a at the time of the most recent state information capture. Put another way, the mobile control room 200c operates to cause a state transfer, or state synchronization, between UI device 112a and UI device 112b (for an example of what the displays may look like in a UI synchronization or state transfer, see FIG. 4). As a result of the state transfer, the user 201 experiences minimal interruption in workflow.

In some embodiments, the capture of UI state information may occur automatically. For example, the UI device 112a may capture state information on a predetermined, periodic basis (e.g., capturing state information every 5, 10, or 30 minutes). The UI device 112a may also capture state information in reaction to a triggering event or activity. The triggering event may be related to user input (e.g., capturing state information any time user input is received, or on a schedule correlated to receiving user input) or the information provided at the UI device 112a (e.g., capturing state information any time there is an alarm, or any time a particular measurement or value reaches a specified threshold). Alternatively, or additionally, the UI device 112a may capture UI state information manually, in response to user input representing a command to capture the UI state information. For example, the display 220 may provide a graphic that the user 201 may interact with that causes a capture to occur. The input interface 230 may also have a mechanism (such as a button, key, or trackpad) allowing the user 201 to initiate a capture. In certain instances, a request by another UI device (such as one of the UI devices 112b-g) may also trigger capture at the UI device 112a.

In further embodiments, the UI device 112b may recognize the user 201 automatically. For example, the user 201 may have a unique tag (in a badge or card with an RFID chip, for example) identifying the user 201. In other embodiments the tag may be any tag or device capable of providing identification information, such as a NFC device, a barcode, a Bluetooth device, or any other wireless access point. The UI device 112b may have a tag scanner or reader (such as an RFID scanner) that detects the unique tag. The UI device 112b may access a database to identify the user associated with the unique tag, allowing the UI device 112b to recognize the user 201. The database may be at the UI device 112b, but in other embodiments the database 151 at the server 150 correlate tags to users, and the UI device 112 may communicate with the server 150 to identify the user 201. In other embodiments, each UI device may be assigned to a specific user so that only a single user interacts with the UI device. In such an embodiment, the UI device 112b may be assigned to the user 201 so that the UI device 112b may assume that any user interacting with the UI device 112b is the user 201. Alternatively, the UI device 112b may force the user 201 to enter a user ID and password in order to log on to the UI device 112b, allowing the UI device 112b to recognize the user 201.

In alternative embodiments, the user 201 may use another UI device, such as any of the UI devices 112c-112-g, instead of the UI device 112b, causing a state transfer or state synchronization from the UI device 112a to one of the UI devices 112c-112g. For example, the user 201 may synchronize a tablet such as the UI device 112c to the most recently captured state information at the UI device 112a. In other instances, the user 201 may synchronize a watch such as the UI device 112d, a laptop such as the UI device 112e, a headset such as the UI device 112f, or a television such as the UI device 112g to the most recently captured state information at the UI device 112a.

Furthermore, the UI device 112a state information may be transferred to the UI device 112a, allowing the user 201 to save a session on the UI device 112a and resume the session on the same UI device 112a at some later time. The UI device 112a may return to a previous UI state by accessing the state information saved to the UI device 112a or to the server 150. This contrasts with some prior art systems, where resuming a session at a later time, even on the same device, may be difficult due to multiple users interacting with the same console.

In further alternative embodiments, the user 201 may use any of the UI devices 112b-112g instead of the UI device 112a. The respective UI device being utilized by the user 201 may capture state information about the respective UI device. The captured state information may be passed to the server 150, where the state information may be stored at the database 151 and accessed by the same or another UI device.

In some instances, the server 150 may be a UI device similar to any of the UI devices 112a-112g (i.e., the server 150 may include a display and input interface, and may be used as a UI device). In such a scenario, the state information saved at the server 150 may be accessed to provide UI information at the server 150 so that a user may utilize the server 150 as a UI device. Similarly, in some embodiments any of the UI devices 112a-112g may operate as a server 150 similar to server 150.

In another embodiment, the UI devices 112a-112g may transfer state information to each other through the network 100 or through some other network or communication, such as a personal area network (e.g., a Bluetooth network) or near field communication. In some embodiments, the receiving UI device may initiate the transfer of UI state information, while in other embodiments the transferring UI device initiates said transfer. In yet another embodiment, the state transfer may occur by saving the UI state information to a memory (such as a the memory on a USB thumb drive) and accessing the memory to retrieve the UI state information at a second UI device.

In certain embodiments, state transfers may be automatic and transparent to users of any of the UI devices 112a-112g. For example, a state transfer may initiate automatically when a UI device is brought within proximity of another UI device. The UI devices may include circuitry, such as NFC circuitry, allowing the UI devices to detect one another. Proximity may also be detected by location data, received at a GPS transceiver, for example, that may be included on one or more of the UI devices. The UI devices may transmit location data to the server 150, where the server 150 may use the location data to determine proximity and initiate a state transfer. In some embodiments, one or more of the UI devices may display an indicator graphic that indicates the respective UI device is receiving or transmitting state information. The indicator graphic may also indicate that a UI device is collaborating with another UI device.

Figure 3:
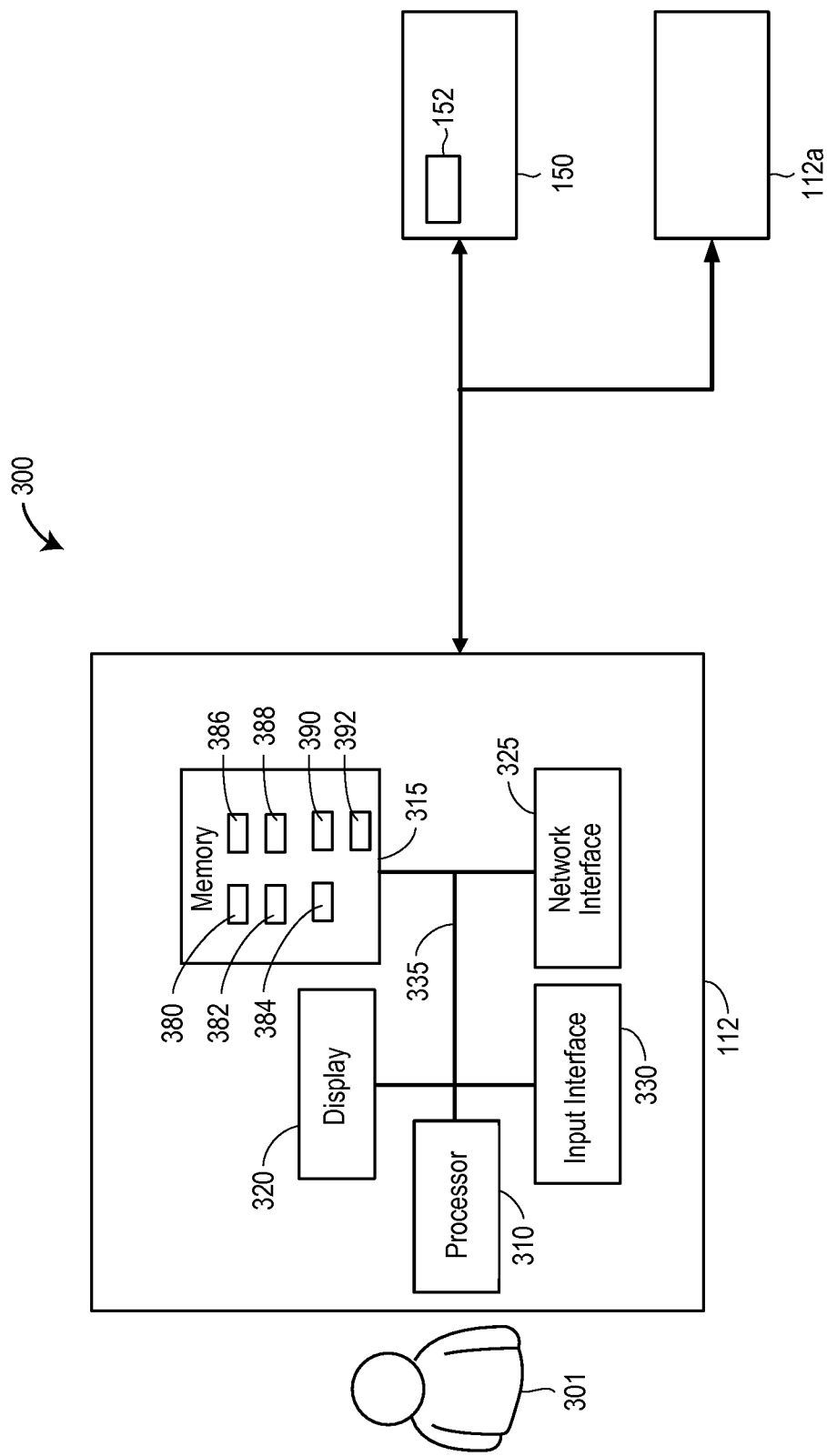
FIG. 3 is a block diagram of a UI device.

FIG. 3 is a block diagram of a UI device in the context of a mobile control room 300. The mobile control room 300 may enable a UI device to transmit a state of operation to another system or device and/or receive a UI state of operation from another system or device. The mobile control room 300 includes the UI device 112, the user 301, the server 150, and the UI device 112a. The server 150 may include a web service or web routine 152, which may be stored at a memory at the server 150 and executed by a processor at the server 150. The UI device 112 may include a processor 310, the memory 315, the display 320, the network interface 325, the input interface 330, the system bus 335, and transceivers 350. The memory 315 may include an operating system 380, a user interface ("UI") routine 382, a context awareness routine 384, a state determination routine 386, a browser routine 388, an image capture routine 390, and a sound capture routine 392. In some embodiments, the operating system 380, UI routine 382, context awareness routine 384, and state determination routine 386 may reside at a memory external to the UI device 112 and may be executed by a processor external to the UI device 112 (e.g., at a device or system such as the server 150).

In certain embodiments of the memory 315 of the UI device 112, the memory 315 may include volatile and/or non-volatile memory and may be removable or non-removable memory. For example, the memory 315 may include computer storage media in the form of random access memory (RAM), read only memory (ROM), EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information. The processor 310 is configured to fetch and execute instructions stored at the memory 315. The memory 315 may store data such as operating system data or program data.

The network interface 325 may include one or more antennas for wireless communication, one or more ports for wired connection, or both. In some embodiments, the network interface may include a GPS receiver, allowing the network interface 325 to receive location or coordinate data. The location or coordinate data may be received from one or more satellites. The network interface 325 may also or alternatively include a Bluetooth transceiver, allowing the network interface 325 to establish a personal area network with an external device or system. Additionally or alternatively, the network interface may include a near field communication ("NFC") transceiver, a radio frequency identification ("RFID") transceiver, and/or a local area network transceiver (enabling the network interface 325 to communicate using the IEEE 802.11 protocol, for example).

The network interface 325 may communicate with the server 150 and/or the UI device 112a via a network such as the process control network 100 shown in FIG. 1. The user 301 may interact with the UI device 112 via the input interface 330. The input interface 330 may accept input via mechanical actuation (e.g., a keyboard or mouse). The input interface 330 may alternatively or additionally accept input via detection of electromagnetic fields, signals, or properties (e.g., a resistive or capacitive touchscreen). Furthermore, the input interface 330 may accept input via detection of sound, light, or motion. The display 320 may provide output in the form of images or video, and may utilize any type of monitor, projector, or display technology including CRT, LCD, plasma, LED, and OLED technology.

The operating system 380 stored at the memory 315 may be one or more instructions, routines, modules, processes, services, programs, and/or applications that support the basic functions and manage the resources of the UI device 112. In particular, the operating system 380 may manage the hardware and software of the UI device 112. The UI routine 382 may be one or more instructions, routines, modules, processes, services, programs, and/or applications that when executed by the processor may cause the display 320 to display information to a user such as the user 301, and may cause the input interface 330 to receive input from the user 301. The context awareness routine 384 may be one or more instructions, routines, modules, processes, services, programs, and/or applications that cause the display 320 to display information in response to context information received at the network interface 325, at the input interface 330, or at one or more sensors (not shown). The context awareness routine 384 may additionally, or alternatively, cause the UI device 112 to identify a context (such as a location, time, or schedule) and/or receive the context from system or device external to the UI device 112.

The state determination routine 386 stored at the memory 315 may be one or more instructions, routines, modules, processes, services, programs, and/or applications that collect information about the operation of the UI device 112. For example, the state determination routine may collect UI state information by monitoring the processes executed by the process 310 and the data associated with the processes. The state determination routine 386 may identify the information depicted at the display 320, and may identify process entities associated with the depicted information. In some embodiments, the state determination routine 386 may transmit the collected UI state routine to an external node, such as the server 150 or the UI device 112a. In embodiments where the UI device is a thin client or a web clients, the state determination routine may be stored at a memory on the server 150, where it may be executed by a processor at the server 150 (e.g., the memory 603 and the processor 601 shown in FIG. 6).

The browser routine 388 stored at the memory 315 may be an application for accessing, presenting, and navigating one or more information resources. An information resource may be a web page, image, video, document, or any other content. The browser routine 388 may interact with information resources located on the UI device 112 or with information resources external to the UI device 112. For example, the UI device 112 may access information resources at other systems or devices (such as the server 150 or the UI device 112a) via the world wide web or via a network such as the process control network 100. In some embodiments, the browser routine 388 may access information associated with and/or generated by a UI routine 382 executed at the server 150. In particular, the browser routine 388 may access the web service 152 at the server 150, where the web service 152 may correspond to the UI routine 382 executed at the server 150. For example, the browser routine 388 may receive an address or identifier, such as a uniform resource identifier or uniform resource locator (from a user via the input interface 330, for example). The address or identifier may direct the browser routine 388 to the web service 152. The browser routine 388 may receive UI data, such as display data or process parameter data, from the UI routine 382 via the web service 152, allowing the browser routine 388 to depict graphics for controlling and/or monitoring some or all of the process. The browser routine 388 may also receive user input (such as a mouse click on a graphic) and transmit data representing the user input to the UI routine 382 via the web service 152. In alternative embodiments, the browser routine 388 may be a plug-in or web client application.

The image capture routine 390 stored at the memory 315 may be one or more instructions, routines, modules, processes, services, programs, and/or applications for capturing an image via an image sensor or camera (not shown). In some embodiments, the image may be transmitted to a node on the network 100 via the network interface 325, where the node may analyze the image to identify process data. For example, in one embodiment the image capture routine 390 may cause the image sensor to capture an image of a flame. The image capture routine 390 may transmit the image of the flame to a node (e.g., the server 150) on the network 100, where the node may analyze the image to identify the color and corresponding temperature of the flame. Similarly, the sound capture routine 392 may be one or more instructions or routines for capturing sound via a microphone (not shown). The captured sound data may be transmitted to a node on the network 100 for analysis.

In some embodiments, the UI device 112 may include a peripheral interface (not shown) for establishing connection with other devices. The peripheral interface may be a serial interface such as a Universal Serial Bus (USB) interface. In other embodiments the peripheral interface may be a wireless interface for establishing wireless connection with another device, similar to some of the embodiments of the network interface. For example, in some embodiments the peripheral interface may be a short range wireless interface compliant with standards such as Bluetooth (operating in the 2400-2480 MHz frequency band) or Near Field Communication (operating in the 13.56 MHz frequency band). The peripheral interface may be used for transferring state information to or receiving state information from an external device (see FIG. 2b). The peripheral interface may also be used in certain embodiments for interacting with external devices that may provide the UI device 112 with context awareness (see FIGS. 9-11). For example the context ID device 902 shown in FIG. 9 may be detected via a peripheral interface. In some embodiments, the user 301 may save state information or process information available at the UI device 112 to an external device via the peripheral interface.

In general operation of the UI device 112, the processor 310 may access the memory 315 to execute the UI routine 382. When the processor executes the UI routine 382, the processor 310 causes output to be provided at the display 320, wherein the output represents information pertaining to entities (e.g., devices, equipment, network nodes, process data, control data, etc) in the process plant 10. The output may be based on data stored in the memory 315 (e.g., graphics data, historian data or any previously received and stored data) or data received via the network interface 325 (e.g., data received from the controller 11 or the database 151). Furthermore, when input is received at the input interface 330, the input interface 330 may generate input data. The input data may be transferred to the processor 310 over the system bus 335, where the processor 310 may execute one or more instructions or routines in accordance with the received input. In many instances the input data may represent a user interaction with the graphical output provided at the display 320. For example, the input data may represent the movement of a mouse, where the processor 310 operates to move a cursor displayed on the display 320 in accordance with the mouse movement. The input data may also represent a selection of a UI element displayed on the display 320, such as a window (e.g., a browser window), a device graphic (e.g., a tank, pump, valve, meter, etc), or an operating system element. Furthermore, the input data may represent the control input. For example, the user 301 may use a keyboard, mouse, or touchscreen to enter a setpoint value with regard to a process device. When the input data represent a control input, the processor 310 may transmit the input data over the system bus 335 to the network interface 325, where the network interface 325 transmits the input data to the process control network 100 where it may be received at another node (such as the controller 11 or the server 150 shown in FIG. 1). The processor 310 may also cause any other type of input data to be transmitted to the process control network 100.

The UI device 112 may capture the UI state information and transmit the state information to the process control network 100. As previously discussed with regard to FIG. 2c, the UI state information may represent the state of the UI device 112 at the time of capture. The processor 310 may operate to capture the UI state information by causing the memory 315 to store data representing the UI state. The processor 310 may retrieve the UI state information from the memory 315 and transmit the UI state information via the network interface 325 to the process control network 100. The UI state information may ultimately be received by a node on the process control network 100, such as the server 150. In alternative embodiments the UI state information may be transmitted via the peripheral interface (such as a USB interface), where the peripheral interface transmits the UI state information to another device.

As discussed with regard to FIG. 1 and, later, with regard to FIG. 6, the UI state information may include information or data such as profile data relating to the user or operator interacting with the UI device 112. All or some of the profile data may be received at the input interface 330 or the network interface 325. The processor 310 may cause the input interface 330 or the network interface 325 to transmit the profile data over the system bus 325 to the memory 315. In certain embodiments the processor 310 may generate the profile data in response to data received from the input interface 330 or the network interface 325, the data relating to a user of the UI device 112 or a similar UI device. In other embodiments, the profile data may already exist on the memory 315, where the processor 310 may access the profile data, or save the profile data under a different data structure (for example, the processor 310 may access profile data collected during operation of the operating system or another application on the UI device 112, and may cause the profile data to be saved to a particular database used for the UI state transfer operation).

In addition to profile data, the UI state information may also include session data, relating to the output (i.e., graphics or sound) provided at the UI device 112 and relating to the applications executing at the UI device 112 and the state of the respective applications. Said another way, in the depicted embodiment the processor 310 may generate the session data based on output provided at the display 325 and based on data generated or used during the operation of other applications executed by the processor 310. In addition to user profile data and session data, the UI state information may include any other data relating to the operation or state of the UI device 112.

In another embodiment of the UI device 112, the UI device 112 may receive UI state information from the process control network 100 and may operate to place the UI device 112 in a state corresponding to the UI state information. In such an embodiment, the UI state information may represent a previously captured state of operation for another UI device ("previous UI device") or for the UI device 112. In operation of such an embodiment of the UI device 112, the UI state information may be received at the network interface 325 via the process control network 100. The network interface 325 may transmit the UI state information to the memory 315 to be stored. The processor 310 may access some or all of the UI state information stored at the memory 350 to put the UI device 112 in a state consistent with some or all of the UI state information. The UI state information may indicate a UI state of operation in which the previous UI device provided information relating to particular entities in the process or process control network 100. The processor 310 may cause the display 320 to display information corresponding to the same particular entities. The display 320 may depict the information in the same or similar GUI configuration used by the previous UI device, but may utilize a different GUI configuration in certain circumstances (e.g., where the UI device 112 is a different type of device than the previous UI device). In some embodiments the processor 310 may identify points of interest (e.g., entities of interest) based on the UI state information and may cause the display 320 to provide information on the identified points of interest.

In addition or alternative to indicating process entities, the UI state information may indicate the state of one or more of the applications that were running on the previous UI device (e.g., any of UI devices 112a-112g). The processor 310 may cause the one or more applications to launch and operate at the indicated state. For example, the UI state information may indicate that a browser window was open and displaying a particular webpage. In such an example the processor 310 may cause a browser application to launch and open the same particular webpage. In another example, the UI state information may indicate that a process historian was running and that particular process values were being accessed or displayed by historian. In such an example the processor 310 may cause a historian application to launch and access or display the same particular process values.

Figure 4:
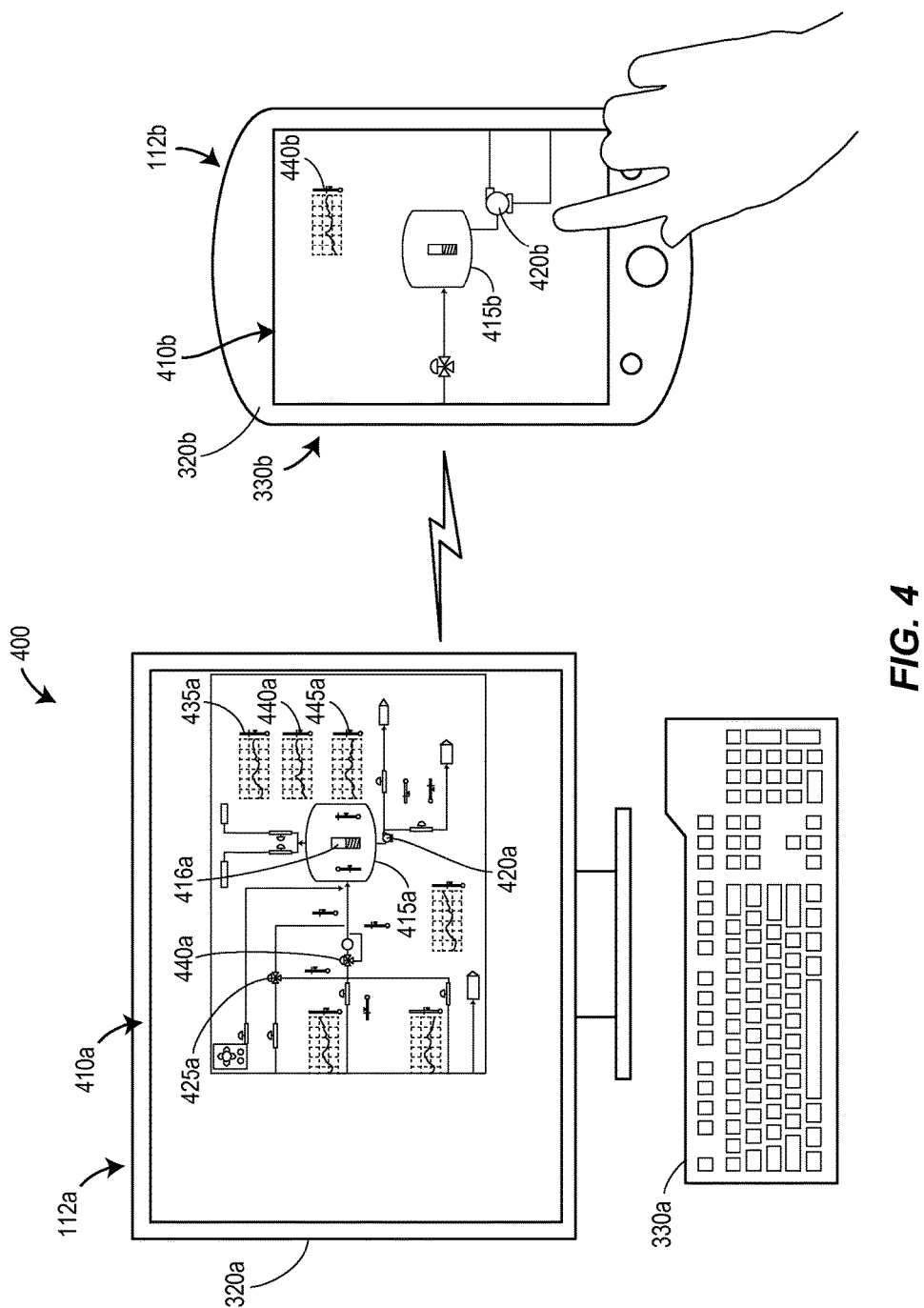
FIG. 4 illustrates example device displays associated with UI synchronization between UI devices.

FIG. 4 illustrates example device displays associated with UI synchronization between UI devices 112a and 112b. In FIG. 4, the UI device 112a may be a stationary workstation and the UI device 112b may be a mobile device (such as a tablet). The UI device 112a includes a display 320a and an input interface 330a. The display 320a may provide a GUI configuration 410a that includes a tank graphic 415a, a level indicator graphic 416a, a pump graphic 420a, valve graphic 425a, a valve graphic 430a, a graph 435a, a graph 440a, and a graph 445a. The UI device 112b includes a display 320b and an input interface 330b. The display 320b provides a GUI configuration 410b that includes a tank graphic 415b, a level indicator graphic 416b, a pump graphic 420b, a valve graphic 430b, and a graph 440b.

The UI device 112a may capture UI state information and transmit the UI state information to the server 150 or another UI device such as UI device 112b. When capturing UI state information, the UI device 112a may determine what entities are related to the output provided at the display 320a. For example, the UI device 112a may identify the entities associated with graphics 416a-445a (a tank, a pump, two valves, and the devices associated with the graphs 435a-445a) and save the entities as state information. In addition to identifying the aforementioned entities, the UI device 112a may also identify coordinate locations associated with the graphics provided at the display 320a. As a result, the UI state information may reflect that the tank graphic is located in the middle of the screen, for example. The UI device 112a may also identify the location of various windows or boxes associated with any executing applications. Moreover, the UI device 112a may identify the programs or routines executing at the UI device 112a and may save information indicating each program state. For example, a browser may be executing (not shown) and the UI device 112a may identify a resource (e.g., a web page, image, video, or some other content) being accessed or used by the browser.

The UI device 112b may receive the UI state information from the UI device 112a (or from the server 150 in other embodiments). The UI device 112b provides output based on the received UI state information. In particular, the UI device 112b may display visual representations or graphics at the UI display 330b based on the received UI state information. Because the UI device 112b may be a different type of device with a different size display than the UI device 112a, the UI device 112b may provides a different GUI configuration than what was provided at the UI device 112a. In particular, the UI device 112b may identify the highest priority entities and programs from the UI state information and may generate the GUI configuration 410b accordingly. In particular, the UI device 112b may identify the entities associated with graphics 415b, 416b, 420b, 430b, and 440b as high priority. Due to limited screen space, the UI device 112b may not generate graphics correlating to the graphics 425a, 435a, or 445a depicted at the display 320a of UI device 112a. The UI device 112b may also generate graphics at locations in the GUI configuration 410b that correlate to the relative locations of the corresponding graphics in the GUI configuration 410a.

In addition, due to having a different type of input interface (i.e., screen-touch based instead of keyboard based), the UI device 112b may generate graphics of a different size and shape than the graphics generated at the UI device 112a. For example, the UI device 112b may generate larger graphics that are easier to interact with via touch.

In some embodiments the GUI configuration 410b of the UI device 112b may be identical to the GUI configuration 410a of the UI device 112a, particularly in embodiments where the UI device 112a and the UI device 112b are the same type of device. In yet other embodiments, the GUI configuration 410b may have very little correlation to the GUI configuration 410a. In some instances, for example, the output provided at the display 330b of the UI device 112b may be partially or entirely text based. Even in such embodiments, the UI device 112b may still use the UI state information to determine the process entities about which the UI device 112b should provide information. For example, even if UI device 112b does not display a graphic corresponding to the tank graphic 415a of the UI device 112a, the UI device 112b may still determine that the tank is a high priority entity and may provide information about the text (a textual tank level value corresponding to the tank level indicator 416a, for example).

Figure 5:
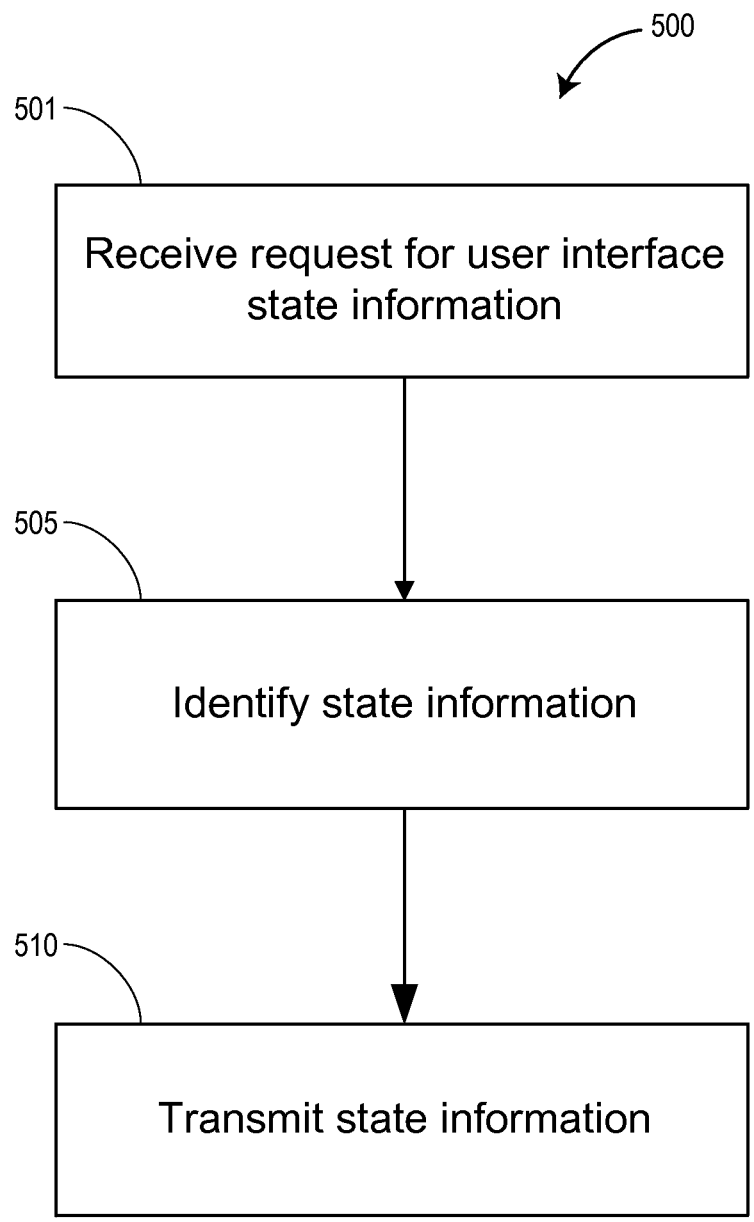
FIG. 5 is a flow chart depicting an example method for synchronizing UI devices.

FIG. 5 illustrates a flow chart depicting an example method 500 for synchronizing UI devices 112. Synchronizing UI devices 112 may enable a user to resume a previous session from the same or another device, and it may enable two or more users to collaborate by exchanging information. The method 500 may be implemented, in whole or in part, by one or more devices and systems such as those shown in FIGS. 1-4. The method 500 may be saved as a set of instructions, routines, programs, or modules on memory such as the memory 315 of the UI device 112 shown in FIG. 3 and may be executed by a processor such as the processor 310 of FIG. 3.

The method 500 begins with a UI device (such as the UI device 112 shown in FIG. 3 or any of the other UI devices shown in FIGS. 1-4) receiving a request for UI state information (block 501). The UI device 112 identifies a UI state of the first UI device 112 (block 505). Identifying a UI state may include identifying the output provided at a display (such as the display 320 shown in FIG. 3) of the first UI device 112. Identifying the output provided at the display may include identifying the visual representations and graphics being provided at the display of the first UI device 112 and identifying entities associated with said visual representations and graphics. Identifying the output provided at the display may also include: identifying the process parameters being provided at the display; identifying the GUI configuration at the display; and identifying the UI type or device type of the UI device 112.

The first UI device 112 may identify process entities associated with the output provided at the display. The process entities may include process parameter data, process plant areas, field devices, executing applications, or application states. For example, a first UI device 112 may identify a tank graphic provided at the display. Based on that identification, the first UI device 112 may identify tank level measurements, the process plant area for the tank (e.g., the boiler area), field devices associated with the tank (e.g., inlet valves to the tank, discharge pumps for the tank, temperature sensors for the tank material, etc.), applications executing on the first UI device 112 (e.g., a browser, historian, an alarm management suite, etc), and/or the state of the executing applications (e.g., the resources being accessed or used by the browser, the parameters being used or display by the historian, or the alarms being displayed by the alarm management suit).

After identifying a UI state of the first UI device 112, the first UI device 112 may transmit data representing the identified UI state to a second UI device 112 (block 510). More particularly, the first UI device 112 may transmit data representing the identified entities to the second UI device 112. In alternative embodiments the first UI device 112 may transmit the entity data to a server 150, where the server 150 may subsequently transmit the entity data to the second UI device 112.

After receiving the UI state information at the second UI device 112, the second UI device 112 may provide output corresponding to the received UI state, and more particularly, to the received entity data. For example, the second UI device 112 may provide the identified process parameter data (i.e., the process parameter data that was provided at the first UI device 112) at a display. The second UI device 112 may also generate a graphical overview of the identified plant area or areas (i.e., the areas associated with the identified output at the first UI device 112) at a display. Additionally or alternatively, the second UI device 112 may generate graphical representations of one or more identified field devices (i.e., the devices associated with the output provided at the first UI device 112) at a display. The second UI device 112 may also launch applications corresponding to the identified applications (i.e., the applications running at the first UI device 112). Finally, the second UI device 112 may cause one or more applications to be put in an identified state (i.e., the one or more application states identified at the first UI device 112).

Figure 6:
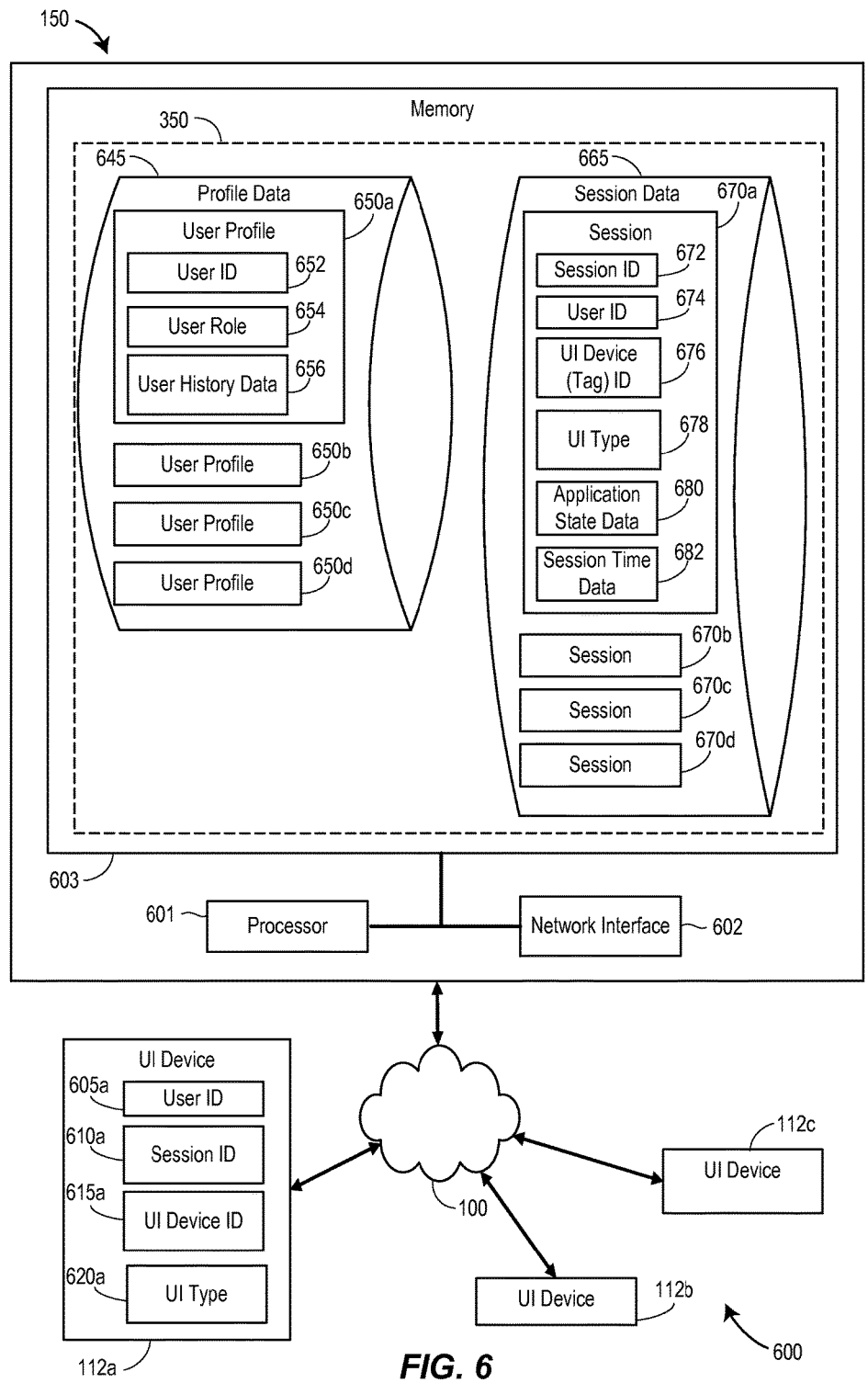
FIG. 6 is a block diagram depicting exemplary data associated with UI devices in a mobile control room.

FIG. 6 is a block diagram depicting exemplary data associated with UI devices in a mobile control room 600. The mobile control room 600 may enable a state transfer to one or more UI devices 112a, 112b, and/or 112c, allowing a user of the respective UI device 112a, 112b, or 112c to resume workflow from a previously saved state or allowing the user of the UI device 112a, 112b, or 112c to collaborate with users of other UI devices. The mobile control room 600 includes the server 150, the process control network 100, and the UI devices 112a-112c. In some embodiments the server 150 may also function as a UI device (such as UI device 112), where the server 150 includes a display (such as the display 320 shown in FIG. 3) for displaying a GUI configuration and providing an operator or user with process information. In such an embodiment the server 150 may also include an input interface (e.g., input interface 330 shown in FIG. 3) for receiving user input.

The server 150 includes a processor 601, a network interface 602, and a memory 603. The memory 603 stores UI state information 350, which may include profile data 645 and/or session data 665. The UI state information 350 may be stored in the database 151 depicted in FIG. 2c. The server 150 may communicate over the process control network 100 using a wired or wireless communication channel. Similarly, each of the UI devices 112a-112c may communicate over the process control network 100 using a wired or wireless communication channel, and each of the UI devices 112a-112c may communicate with the server 150.

The memory 603 of the server 150 may include volatile and/or non-volatile memory and may be removable or non-removable memory. For example, the memory 603 may include computer storage media in the form of random access memory (RAM), read only memory (ROM), EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information. The processor 601 is configured to fetch and execute instructions stored at the memory 603. The memory 603 may store data such as operating system data or program data. The network interface 602 may include one or more antennas for wireless communication, one or more port for wired connection, or both. In some embodiments, the network interface 602 may include one or more GPS receivers, Bluetooth transceivers, NFC transceivers, RFID transceivers, and/or local network transceivers. The network interface 602 may communicate with the UI devices 112a-112c via the process control network 100.

The UI device 112a may include data representing a user ID 605a, a session ID 610a, a client device ID 615a, and UI type 620a. The user ID 605a may correspond to a single user or operator and operates as a unique identifier. Similarly, the session ID 610a may function as a unique identifier of a particular user session at the UI device 112a. A user session is generally considered a period of use by a particular user without any extended breaks. In general, when a user stops using the UI device 112a for an extended period of time, and later resumes using the UI device 112a, the subsequent use represents the start of a new session. The client device ID 615a may operate as a unique identifier of the UI device 112a. Finally, the UI type 620a may represent the type of GUI implemented at the UI device 112a. The UI type often corresponds to the device type of the UI device. In the preferred embodiment, there are two common UI types: a normal UI and a mobile UI. Desktops, laptops, and other UI devices with larger screens typically implement a normal UI. Mobile devices, on the other hand, such as phones, PDAs, and tablets often implement a mobile UI, which provides larger graphics and text (relative to the screen size). In many embodiments, the mobile UI may provide a different GUI configuration and graphics due to the limited size of many mobile device screens. In other embodiments, there may be other UI types, such as a phone UI, a tablet UI, or a headset UI. The UI devices 112b and 112c include data similar to the data in the UI device 112a.

The profile data 645 may include user profiles 650a-650d. Each of the user profiles 650a-650d may correspond to a unique user or operator. The user profile 650a may include data representing a user ID 652, a user role 654, and user history data 656. The user profiles 650b-650d may include similar elements. The user ID 650a may represent a unique identifier for a particular user and may correspond to the user ID 605a at the client device 112a. The user role 654 may represent a particular user's responsibility, title, or role at the process plant. For example, the user role 654 may limit the areas of the plant that the user has permission to control. The user role 654 may also limit the extent of control the user can implement, or the types of programs the user may access. In some embodiments the user role 654 may also limit the user's permissions for accessing and controlling entities in the process plant based on a schedule. For example, the user role 654 may only have permission to implement control during his work schedule (from 8 am-5 pm, for example). Finally, the user history data 656 may represent trends, habits, and preferences of the user associated with the user profile 650a. The user history data 656 may reveal, for example, a particular area in the process plant, particular devices or equipment, or particular process parameters that tend to be focused on by the user.

The session data 665 may include sessions 670a-670d. The session 670a may include data representing a session ID 672, a user ID 674, a client device ID 676, a UI type 678, application state data 680, and session time data 682. Each of the sessions 670b-670d may include data representing similar entities. The session ID 672 serves as a unique identifier for a particular session. The user ID 674 may represent a unique user and may correspond to the user ID 652 of the user profile 650a and the user ID 605a of the UI device 112a. The client device ID 676 may uniquely identify a particular UI device and may correspond to the UI device ID 615a. Similarly, the UI type 678 may correspond to the UI type 620a at the UI device 112a. The application state data 680 may represent programs that were running at a UI device when the UI state information 350 was captured, and may also represent the state of each particular application at the time of capture. The session time data 682 may represent temporal data such as the start time of the session, the end time of the session, and the length of the session, etc.

In operation, the UI device 112a may capture the UI state information 350 (including the profile data 650a and the session data 670a). When a user session has ended, the UI device 112a may transmit the UI state information 350 to the server 150 to be stored. The network interface 602 may receive the UI state information 350 from the process control network 100. The processor 601 may operate to transmit the UI state information 350 to the memory 603 where it is stored. In alternative embodiments, the UI device 112*a* may transmit some or all of the UI state information 350 to the server 150 on a periodic basis, or in reaction to a triggering event. The server 150 may subsequently transmit some or all of the UI state information to a UI device, such as UI device 112*b*.

Figure 7:
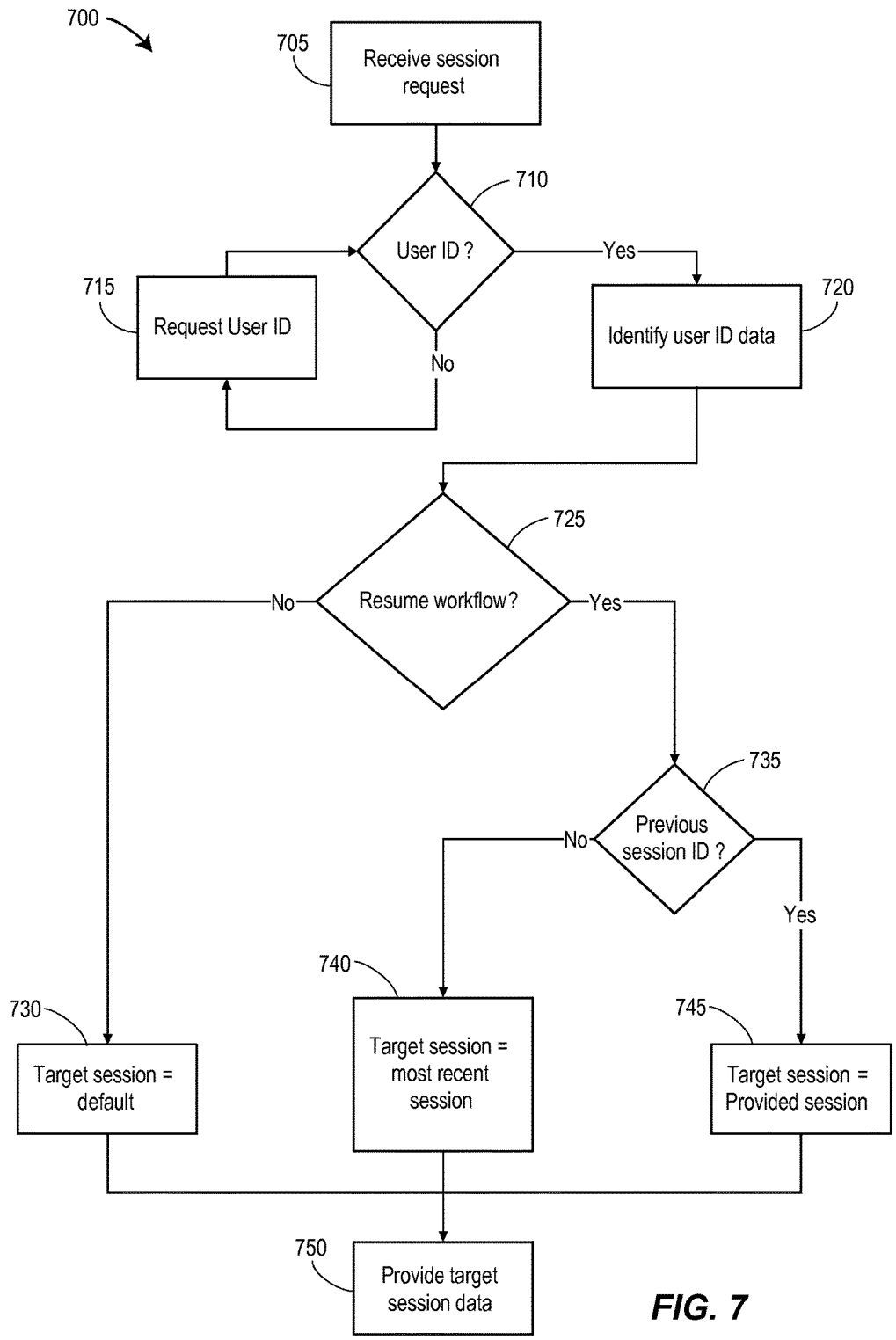
FIG. 7 is a flow chart of an example method for providing session data to a UI device.

FIG. 7 is a flow chart of an example method 700 for providing session data to a UI device 112. Providing session data may facilitate UI state transfer or synchronization, enabling continuous workflow or worker collaboration. The method 700 may be implemented, in whole or in part, at one or more devices or systems such as the server 150 shown in FIGS. 1, 2, and 6. The method may be saved as a set of instructions, routines, programs, or modules on memory such as the memory 603 of FIG. 6, and may be executed by a processor such as processor 601 of FIG. 6.

The method 700 begins when the server 150 receives a session request from a UI device such as the UI device 112*a* shown in FIG. 6 (block 705). The server 150 may determine whether the UI device is providing a user ID (block 710) and may request a user ID when one has not been provided (block 715). Once the user ID has been provided, the server 150 may identify the data associated with the user ID (block 720). For example, there may be one or more user profiles, sessions, or UI devices associated with the user ID (see FIG. 6). In alternative embodiments, the server 150 may receive a UI device ID and identify data associated with the UI device ID (rather than the user ID).

After identifying data associated with the provided user ID, the server 150 may determine whether the UI device is requesting to resume work flow from a previous session (block 725). When no such request exists, the server 150 may identify a default session (i.e., data representing a new session or default session) as the "target session" that will be provided to the UI device (block 730). The default session data may include data such as default GUI configuration data, default process parameter data, or default display data. For example, the default GUI configuration for new sessions that do not resume previous work-flow may include an active window with a plant overview graphic. The server 150 may transmit the default session data to the UI device (block 750).

When the server 150 receives a request to resume previous work flow, the server 150 may determine whether a particular session has been identified by the UI device (block 735). When no particular session has been identified, the server 150 may identify the most recently saved session associated with the user ID (or UI device ID in alternative embodiments) as the "target session" that will be provided to the UI device (block 740). The server 150 may transmit the recent session data to the UI device (block 750). When the server 150 receives a particular session associated with the request to resume workflow, the server 150 may identify the stored session data for that particular session (stored at the memory 603 of the server 150 shown in FIG. 6, for example) as the data for the "target session" that will be provided to the UI device (block 745). The server 150 may transmit the particular session data to the UI device (block 750).

In alternative embodiments, the server 150 may be a second UI device, wherein the second UI device receives the session request from a first UI device and provides session data to the first UI device.

Figure 8:
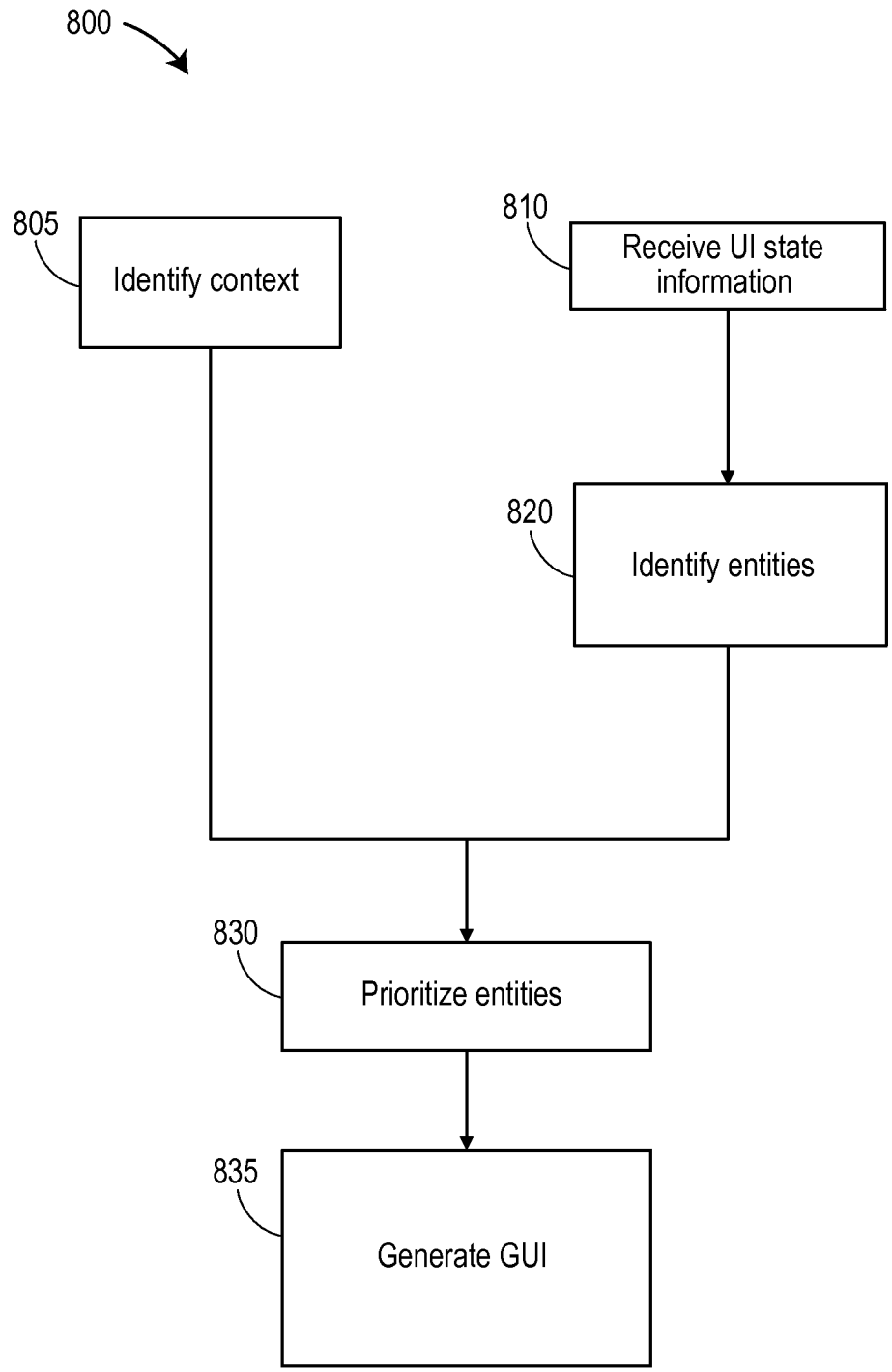
FIG. 8 is a flow chart of an example method for generating a GUI configuration at a UI device.

FIG. 8 is a flow chart of an example method 800 for generating a GUI configuration at a UI device 112. The method 800 may enable a UI device 112 to provide output in accordance with the information received in a UI state transfer and in accordance with the context of the UI device 112's environment and use. The method 800 may be implemented, in whole or in part, at one or more devices or systems such as any of the UI devices 112 or 112*a-g* shown in FIGS. 1-4 and 6. The method 800 may be saved as a set of instructions, routines, programs, or modules on memory such as the memory 315 of FIG. 3, and may be executed by a processor such as processor 310 of FIG. 3.

The method 800 begins when the UI device 112 identifies context data (block 805). The UI device 112 may also identify entities associated with the context data. The context data may be any context information or item. In one embodiment, the context data may represent any of the elements included in the context awareness data 1340 or the work item data 1350 shown in FIG. 13. The associated entities may be any area, equipment, devices, or parameter associated with the context item.

The method 800 may include receiving UI state information, such as the UI state information shown in FIG. 6 (block 810). The UI device 112 may receive the UI state information from a device or system implementing the method 700 shown in FIG. 7. After receiving the UI state information, the UI device 112 may identify entities associated with the received UI state information (block 820). An entity may be any area, device, system, or parameter in the process. In general, the entities associated with the UI state information are also associated with the information that was provided at the previous UI device where the UI state information was captured.

The UI device 112 may prioritize the entities (block 830). An entity may be higher or lower priority depending on factors such as the entity's importance to stable operation of the process, time sensitivity (e.g., a batch may be ruined if an entity is not addressed quickly), location (e.g., the UI device 112 is proximate to a location associated with an entity), status (e.g., an entity is malfunctioning or associated with a malfunction), alarm condition, (e.g., the entity is associated with a parameter value outside the normal operating range), schedule (e.g., an entity may be associated with off-line equipment), or work item relevance (e.g., the entity may be related to a work item associated with the user or UI device 112).

The UI device 112 may generate a GUI configuration based on the prioritized entities (block 835). Prioritizing the entities may be necessary when the UI device 112 cannot display all of the information relevant to the entities identified in the context data and the received session. For example, in some embodiments the previous UI device 112 may be a workstation with a normal UI type, while the UI device 112 receiving the UI state information is a tablet with a mobile UI type. Because mobile UIs are configured for smaller screens, they often provide less information. Thus, even if the UI device 112 avoided identifying entities associated with context data, the UI device 112 would still prioritize entities in order to identify which entities the UI device 112 should provide information with regard to.

In alternative embodiments, the system or device providing the UI state information may identify the UI type or device type of the UI device 112 receiving the UI state information. In such embodiments, the providing system may tailor the UI state information provided to the UI device 112. In other words, the providing system may provide more or less information based on the UI type or device type. The providing system may also provide display data formatted for the UI type or device type.

Figure 9:
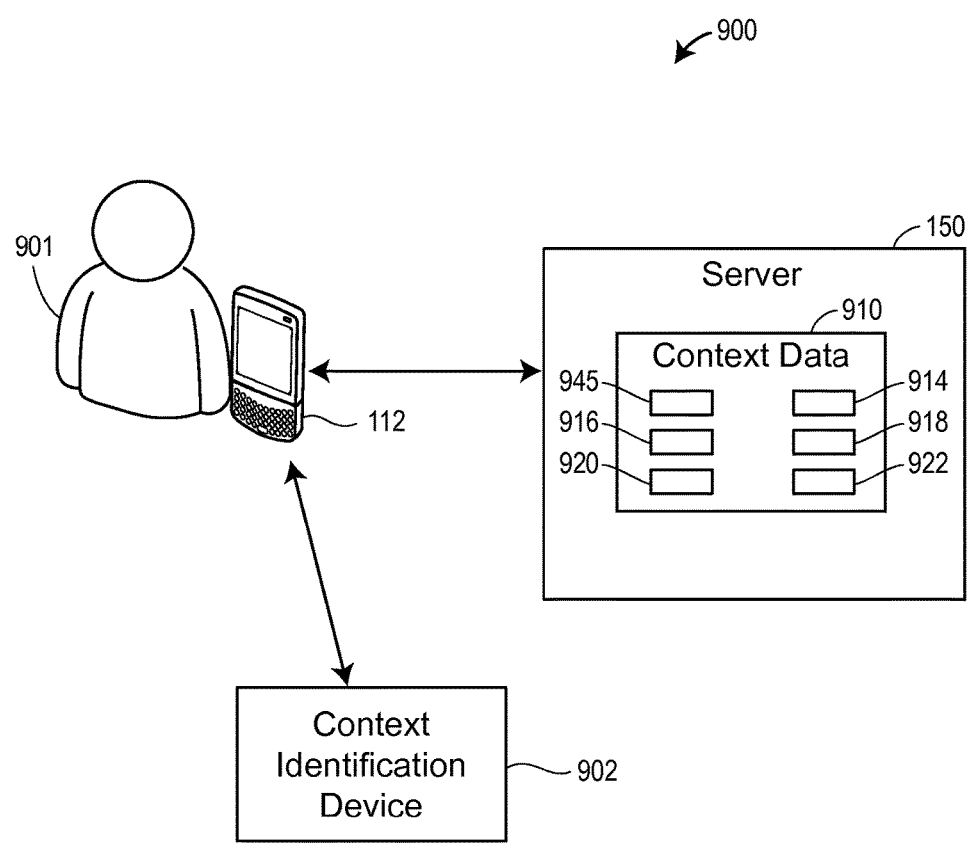
FIG. 9 is a block diagram of an exemplary context-aware UI device.

FIG. 9 is a block diagram of an exemplary context-aware UI device 112 in a mobile control room 900. The context aware mobile control room 900 may enable the UI device 112 to provide output in response to its environment and manner of use. The context aware mobile control room 900 may include the user 901, the context identification ("context ID") device 902, the UI device 112, and the server 150. The UI device 112 may interact with the context ID device 902 to identify context data or context items. In certain embodiments the context ID device 902 may communicate with the UI device 112 over wireless or wired channels. In certain embodiments, the context ID device 902 may transmit process parameter data and/or display data to the UI interface 112. The context ID device 902 may utilize image identification technology (such as a bar code or QR code), audio identification technology (emitting a unique sound signature), or wireless radio frequency technology such as RFID, NFC, Bluetooth, or wifi (IEEE 802.11 standards) technology. The UI device 112 may communicate with the server 150 via a network such as the process control network 100. In other embodiments, the context ID device 902 may be in the UI device 112, and a device (e.g., a plc device) may receive a signal from the context ID device 902 and report the location of the UI device 112 to the server 150.

In any event, the server 150 may store context data 910 at the database 151 at the memory 603. The context data may include user profile data 645 (relating to users/operators at the plant), UI device profile data 914 (relating to the registered UI devices at the plant), field device profile data 916 (relating to the installed devices at the plant), equipment profile data 918 (relating installed equipment at the plant), schedule data 920 (relating to user and equipment/device schedules), and work item data 922 (relating to tasks or jobs at the plant). In some embodiments the field device profile data 916 may be included in the equipment profile data 918. The user profile data 645 may include skill set data, indicating a skill level or level of responsibility associated with a particular user. Work item data 922 may include data such as a task ID (identifying a particular task), a skill threshold (identifying a minimum skill level or role/responsibility necessary to work on the task), target equipment (the equipment associated with the task), and work item progress (identifying how near to completion the task is). Each of the context items 645 and 914-922 may include information such as location or area (associated with a user, device, equipment, schedule, or work item, for example), status, related process entities, unique identifiers/tags, and/or permission information.

In operation of the context ID device 902, the context ID device 902 may include a unique identifier or tag that may be read, scanned, or otherwise received at the UI device 112 when the UI device 112 enters the range of the context ID device 902. The range of the context ID device depends on the particular embodiment of the context ID device 902, but may be as small as a foot or less, as far as a mile or more, or some distance in between. In some embodiments, the context ID device 902 may transmit the unique identifier to the UI device 112. In other instances, the context ID device 902 may display or otherwise provide the unique identifier so that it may be received and/or retrieved by the UI device 112.

In any event, the UI device 112 may receive the unique identifier and identify a context item such as an area (i.e., a location, geographic area, or region), equipment, device, work item, or available schedule in the environment of the UI device 112 by correlating the unique identifier to the context item. For example, the UI device 112 may access a database, table, or data structure that pairs unique identifiers to particular context items. Such a database or table may exist at the UI device 112, at the context ID 902, or at the server 150. When the database or table exists at the server 150, the UI device 112 may transmit the unique identifier to the server 150. The server 150 may access a database, table, or some other data structure to identify the context item associated with the unique identifier. The server 150 may transmit data representing the context item to the UI device 112.

Once the UI device 112 has identified a context item, the UI device 112 may provide output relevant to the identified context item. For example, the context item may indicate particular areas, devices, equipment, or alarms associated with an area. The UI device 112 may generate visual representations, sound, or other output pertaining to the particular devices, equipment, or alarms so that the user 901 may be informed about process conditions in the process area 1005. Likewise, there may be a number of devices or alarms associated with an identified piece of equipment. The UI device 112 may provide information about the devices or alarms associated with a device (from the field device profile data 916). Similarly, the context item may cause the UI device 112 to provide information related to equipment (from the equipment profile data 918), schedules (from the schedule data 920), or work items (from the work item data 922).

In certain embodiments, one or more process control devices in the process plant may be context ID devices 902. In other embodiments, the one or more process control devices may include context ID devices 902 or be associated with nearby context ID devices 902. For example, one or more of the field devices 15-22 and/or 40-58 shown in FIG. 1 may be or include a context ID device 902 (e.g., the context ID device 902 may be attached to each of the field devices, or the field devices may have internal circuitry enabling the field devices to function as context ID devices). Similarly, the controller 11, gateway 35, UI device 112, I/O cards 26 and 28, and router 58 shown in FIG. 1 may be or include context ID devices 902. In such embodiments, the UI device 112 may receive the unique identifier associated with each of the context ID devices 902, allowing the UI device 112 to receive a context item (such as location or equipment ID) associated with each of the process control devices.

In alternative embodiments of the context aware mobile control room 900, the UI device 112 or user 901 may include or provide a unique identifier. For example, the UI device 112 may have a unique scannable image on the device or a chip that transmits unique identification data. In another example, the user 901 may carry a badge, card, or some other accessory including a similar image or chip. In such embodiments, the context ID device 902 may read, scan, or otherwise receive the unique identifier. The context ID device 902 may operate to associate the unique identifier with a particular user (user 901 in this case) or UI device (UI device 112 in this case). The context ID device 902 may associate the unique identifier with a particular user or UI device by accessing a data structure stored at the context ID device 902. Alternatively, the context ID device 902 may transmit the unique identifier to the server 150, where the server 150 associates a particular user or UI device with the unique identifier.

In any event, once the context ID device 902 has identified the UI device 112 or the user 901, the context ID device 902 may transmit relevant context items to the UI device 112. Alternatively, the context ID device 902 may communicate with one or more nodes on a network such as the process control network 100 to notify the one or more nodes that the user 901 or the UI device 112 entered the range of the context ID device 902. The one or more nodes may transmit one or more context items, UI data (e.g., display data, process parameter data), or any other data to the UI device 112. The UI device 112 may operate or provide output based on the received data. For example, in certain embodiments, the UI device 112 may launch a target application in response to receiving the unique identifier, the context item, the UI data, or other data from the context ID device 902 or from the server 150. The target application may be an application, for example, dedicated to providing process graphics and information to the user. The target application may be a mobile application, for example, operable on phone or tablet devices. In other embodiments, the target application may be the browser routine 388. In certain instances, the browser routine 388 may be directed to a particular resource or group of resources pertaining to the received unique identifier, context item, UI data, or other data.

In some embodiments, the context ID devices 902 may be part of a permission system. For example, permissions associated with a process entity may depend on the proximity of a UI device 112 to the process entity. In some embodiments a UI device 112 may receive permission or authorization to modify a parameter associated with a process entity when the user or the UI device 112 are proximate to the process entity. The UI device 112 may also deny permission to engage in a work item or modify a parameter when the user's skill level is below the indicated skill threshold associated with the work item or parameter.

Figure 10:
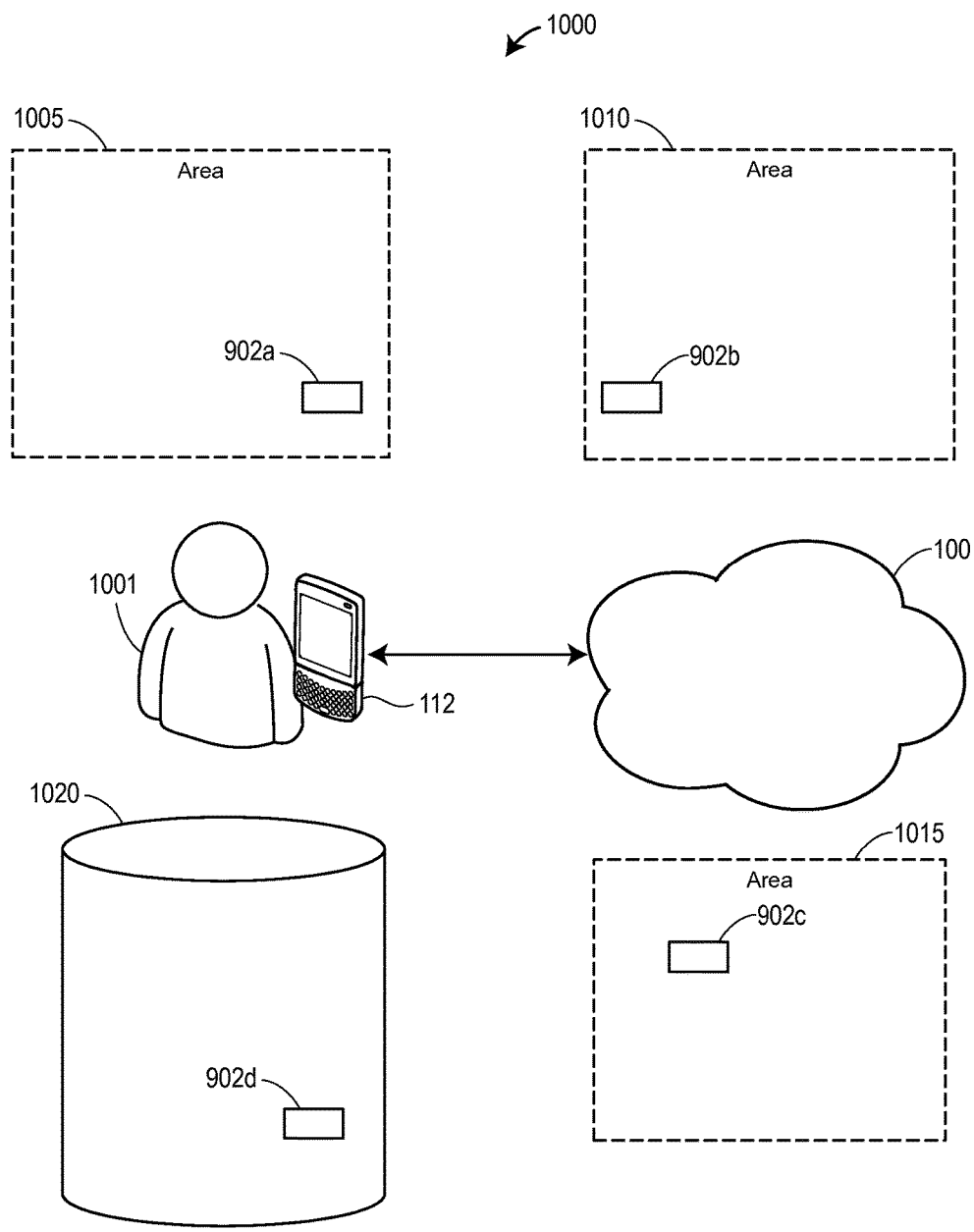
FIG. 10 is a block diagram of another embodiment of a mobile control room in a process plant.

FIG. 10 is a block diagram of another embodiment of a mobile control room 1000 in a process plant 10. The context aware mobile control room 1000 may enable a UI device 112 to provide output in response to its environment and manner of use. The mobile control room 1000 may include a user 1001, the UI device 112, the process control network 100, areas 1005-1015, and a tank 1020. In an embodiment the UI device 112 is a near field communication ("NFC") enabled device. The UI device 112 is connected to the process control network 100. The area 1005 includes a context indication device 902a; the area 1010 includes a context indication device 902b; the process area 1015 includes a context indication device 902c; and the tank 1020 includes a context indication device 902d.

In the preferred embodiment of the context ID device 902a, the context ID device 902a is, or includes, an NFC device. In such an embodiment, the UI device 112 and the context device 902a generally operate at 13.56 MHZ and may operate according to NFC standards such as ISO/IEC 14443, ISO/IEC 1809, NFCIP-1, NFCIP-2, and JIS:X6319-f. NFC technology enables wireless transactions and data exchanges between the UI device 112 and the context device 902a. NFC technology may also be used to automatically bootstrap other communication connections. In such an embodiment, the context ID device 902a may transmit instructions to the UI device 112. The UI device 112 may receive and execute the instructions, causing the UI device to connect to another network. In some embodiments, the other network may be a broader network, such as the process control network 100, that includes other nodes. In certain embodiments, the other network may be connection between the UI device 112 and the context ID device 902a. For example, the other network may be a wireless ad-hoc network or a personal area network (e.g., Bluetooth, IEEE 802.15.1 standards). In any event, in addition to the network connection instructions, the context ID device 902a may transmit authentication information to the UI device 112, allowing the UI device 112 to establish connection to a network without requiring the user 1001 to manually set up the network and enter authentication information.

In further operation of the context ID device 902a, the NFC tag or device at the context ID device 902a may also store other instructions that may be executed at the UI device 112. For example, the instructions may cause one or more applications to launch or execute in a particular manner. In the depicted embodiment, the instructions may cause the NFC device 112 to launch a UI (such as the UI routine 382 shown in FIG. 3) or browser (such as the browser routine 388 shown in FIG. 3), or to put the UI or browser into a certain state. The instructions may cause the UI device 112 to provide a GUI configuration providing information pertaining to the devices and equipment in the area 1005. For example, the GUI configuration may include a window with a graphical overview of the process area 1005.

In further operation of the context device 902a, the UI device 112 may receive a unique identifier from the context ID device 902a via an NFC communication or via a network that the UI device 112 connected to after receiving authentication information via an NFC communication. The unique identifier generally represents the area 1005, but may represent other context items in certain embodiments. The UI device 112 may use the unique identifier to identify the context item (such as the area 1005) and operate or provide output in accordance with the identified context item (e.g., providing a graphical overview of the area 1005). Alternatively, the context ID device 902c may receive a unique identifier from the UI device 902c and identify the user 1001 or UI device 112, allowing the context ID device 902c or another node on the process control network 100 to transmit data such as context data or UI data to the UI device 112. The UI device 112 may operate or provide output based on the received data.

In an embodiment of the context ID device 902b, the context ID device 902b is, or includes, an RFID tag. In such an embodiment, the UI device 112 includes an RFID scanner and uses the RFID scanner to obtain a unique identifier. The unique identifier generally represents the area 1010, but may represent other context items (e.g., specific devices, equipment, locations, etc.) in certain embodiments. The UI device 112 may use the unique identifier to identify the context item in a manner consistent with the methods discussed with regard to FIG. 9. In an alternative embodiment, the context ID device 902b may be an RFID scanner and the UI device 112 may include an RFID tag. In such an embodiment, the context ID device 902b identifies the UI device 112 when the UI device 112 enters the range of the context ID device 902b (e.g., when the user enters the area 1010). After identifying the UI device 112, the context ID device 902b may communicate with the UI device 112 (e.g., using the process control network 100; using another network such as a personal area network; or using a display) and transmit the unique identifier to the UI device 112 or to the server 150 which may use the unique identifier to provide contextual information to the UI device 112. The UI device 112 may identify the area 1010 in a manner consistent with the methods discussed with regard to FIG. 9 and operate or provide output based on the identified area 1010. In another embodiment, the context ID device 902b may transmit the context item (rather than the unique identifier) to the UI device 112 (using, for example, a short range wireless network communication such as Bluetooth). In yet another embodiment, the user 1001 may have an RFID tag instead of or in addition to the UI device 112 having an RFID tag. In any of these embodiments, both the RFID scanner and the RFID tag may be either active or passive. The UI device 112 may operate or provide output based on the received data.

In operation of an embodiment of the context ID device 902*c*, the context ID device 902*c* may be a wifi access point with a range covering the process area 1015. When the UI device 112 enters the process area 1015, the context ID device 902*c* may establish communication with the UI device 112. The context ID device 902*c* may transmit a unique identifier, such as a MAC address or device tag, to the UI device 112. The unique identifier generally represents the area 1015, but may represent other context items in certain embodiments. The UI device 112 may use the unique identifier to identify the context item (such as data representing the area 1015) in a manner consistent with the methods discussed with regard to FIG. 9, and to operate or provide output in accordance with the context item (e.g., providing a visual representation of area 1015). For example, a database pairing MAC addresses or device tags to particular areas may be stored on the UI device 112, accessible by the UI device 112, or stored on a node in communication with the UI device 112. Alternatively, the UI device 112 may transmit a unique identifier, such as a MAC address of the UI device 112, to the context ID device 902*c*. After receiving the unique identifier, the context ID device 902*c* may operate to determine that the UI device 112 is associated with the unique identifier. The UI device 112 may operate or provide output based on the received data.

In an embodiment of the context ID device 902*d*, the context ID device 902*d* may include a barcode. The barcode may be a matrix barcode (such as a QR code) or a linear barcode (such as a U.P.C. barcode). The UI device 112 may include, or is in communication with, an image sensor, which may be a camera or dedicated barcode scanner. In operation, the UI device 112 may use the image sensor to capture the barcode at the context ID device 902*d*. The UI device 112 may decode the data encoded into the barcode ("barcode data"). The barcode data generally includes a unique identifier that represents the tank 1020, though the unique identifier may represent other context items in certain embodiments. The UI device 112 may use the unique identifier to identify the context item (such as data representing the tank 1020) in a manner consistent with the methods discussed with regard to FIG. 9, and to operate or provide output in accordance with the context item (e.g., providing a visual representation of the tank 1020). In alternative embodiments, the barcode may contain data or instructions that cause the UI device 112 to take certain actions, such as launching a browser or UI so that the browser or UI provide particular information. The particular information may relate to any of a number of process entities, such as process parameter data, graphics of certain items (such as the tank 1020), or alarm data for a particular device. In further embodiments, the UI device 112 or user 1001 may alternatively or additionally contain a barcode that is captured by the context ID device 902*d*, allowing the context ID device 902*d* to identify the UI device 112 or user 1001. A barcode at the UI device 112 may also provide instructions that are executed at the context ID device 902*d*. For example, the barcode may cause the context ID device 902*d* to provide relevant information to the user 1001 or the UI device 112.

In some embodiments, the UI device 112 may identify its location by receiving location data. The location data may be received via a network such as the process control network 100. Alternatively, the location data may be received via a GPS transceiver at the network interface of the UI device 112. The UI device 112 may compare its location to the location of other process entities to identify process entities proximate to the UI device 112. The UI device 112 may transmit its location to a node on the process network 100, such as the server 150. In some embodiments, the node may respond by transmitting context information to the UI device 112. In other embodiments, the UI device 112 may transmit the location data to a context ID device, such as the context ID device 902*d*. The context ID device may transmit context data to the UI device 112 in accordance with the received location data.

Figure 11:
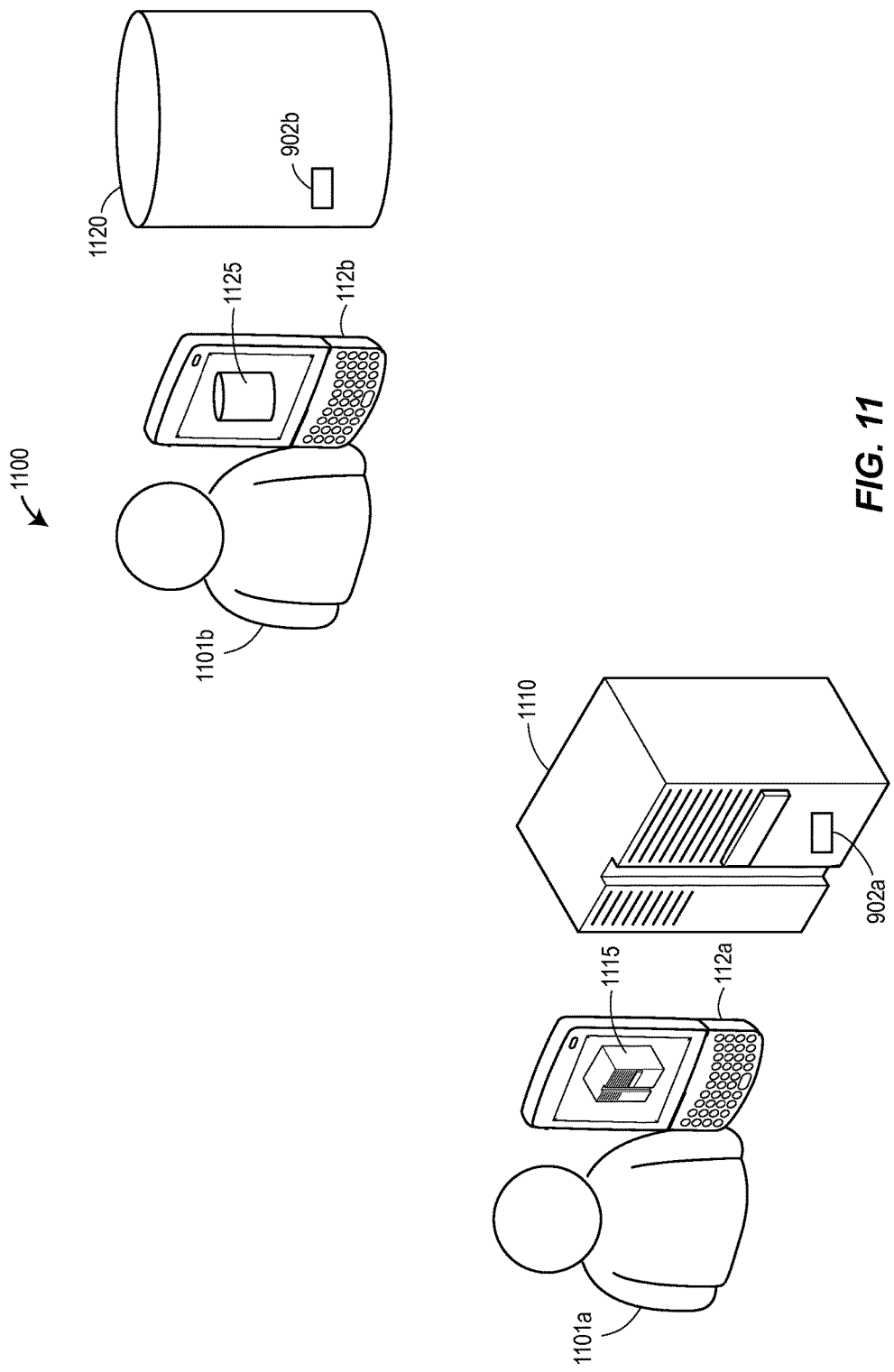
FIG. 11 is a diagram of yet another exemplary mobile control room.

FIG. 11 is a diagram of an exemplary mobile control room 1100. The mobile control room 1100 may include a UI device 112*a*, a UI device 112*b*, a user 1101*a*, a user 1101*b*, equipment 1110, and equipment 1120. The UI device 112*a* may include a display providing a graphic 1115 representing the equipment 1110. The UI device 112*b* may include a display providing a graphic 1125 representing the equipment 1120. The equipment 1110 may include a context ID device 902*a* and the equipment 1120 may include a context ID device 902*b*.

In operation, the user 1101*a* may enter an area within the range of the context ID device 902*a*. The UI device 112*a* may communicate with or scan the context ID device 902*a*, enabling the UI device 112*a* to receive data from the context ID device 902*a*. The UI device 112*a* may operate or provide output in response to the received data. In the depicted embodiment, the UI device 112*a* may provide the graphic 1115 representing the equipment 1110. In some embodiments the UI device 112*a* may provide alternative or additional output, such as other graphics, process parameter values, or alarms. The user 1101 may enter the range of the context ID device 902*b*, causing the UI device 112*b* to provide the graphic 1125 representing the equipment 1120.

FIG. 12 is a flow chart depicting an exemplary method 1200 for generating a graphical user interface. The method 1200 may be implemented, in whole or in part, at one or more devices or systems such as any of the UI devices 112 or 112*a*-*g* shown in FIG. 1-4, 6, or 9-12. The method 1200 may be saved as a set of instructions, routines, programs, or modules on memory such as the memory 315 of Figure and may be executed by a processor such as processor 310 of FIG. 3.

The method 1200 begins with a UI device 112 that may identify an external device or identifier/tag (block 1205). The identifier may be an image, sound, or barcode. The identifier may also be a unique tag associated with a transmission by an NFC system or RFID system. In some embodiments, the identifier may be associated with a process entity, such as a process area, device, piece of equipment, or another UI device 112.

The UI device 112 may receive context information based on the identified external device or identifier (block 1210). The UI device 112 may receive the context information from the identified external device or identifier. In other embodiments, the UI device 112 may receive the context information from the server 150 shown in FIG. 1, in response to transmitting data representing the identifier to the server 150. The context information may represent context items such as location, equipment, schedules, or work items.

The UI device 112 may provide information at the UI device 112 display (block 1215). The information may be provided in accordance with received context information. For example, the UI device 112 may generate information relevant to a received location, received equipment or devices, received schedules, or received work items.

Figure 13:
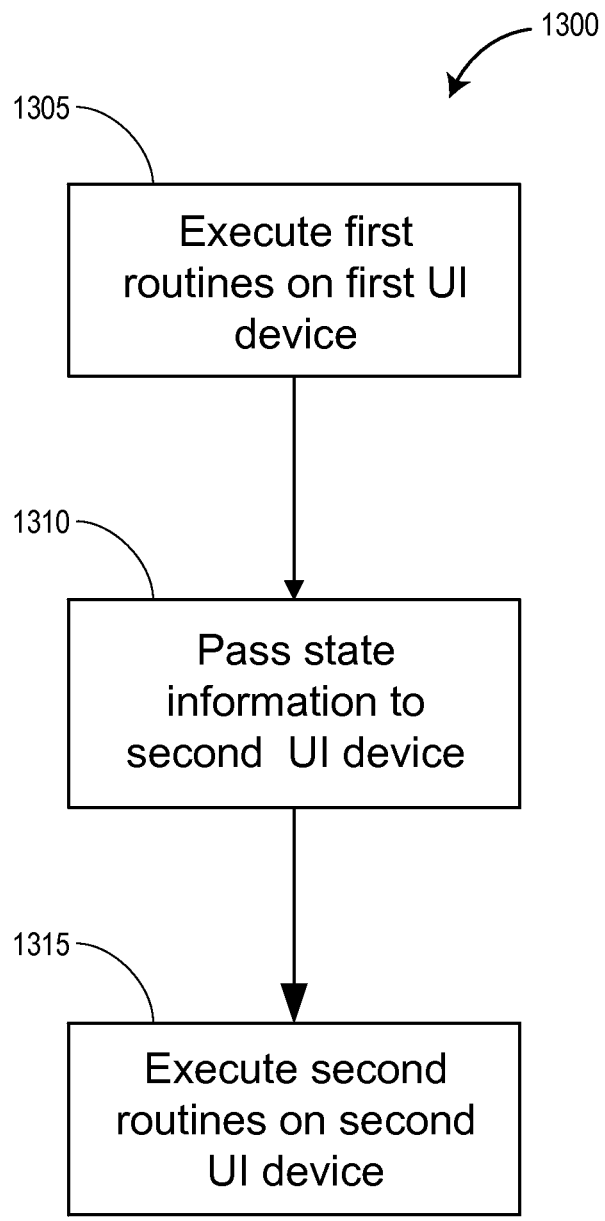
FIG. 13 is a flow chart depicting an exemplary method for direct state information transfer between two UI devices.

FIG. 13 is a flow chart depicting a method 1300 for direct state information transfer between two UI devices in the process control plant 10. The method 1300 may be implemented, in whole or in part, at one or more devices or systems such as any of the UI devices 112 or 112a-g shown in FIG. 1-4, 6, or 9-12. The method 1300 may be saved as a set of instructions, routines, programs, or modules on memory such as the memory 315 of FIG. 3, and may be executed by a processor such as processor 310 of FIG. 3.

The method 1300 beings with a first UI device 112 that may execute one or more first routines for performing a function (block 1305). The function may be a control function, operation function, configuration function, a maintenance function, a data analysis function, a management function, a quality control function, or a security function. The first UI device 112 may be coupled, via a network, to a unitary, logical data storage area, such as the big data system described below. The unitary, logical data storage area may be configured to store, using a common format, process data corresponding to the process plant. The process data may include multiple types of process data, including configuration data, continuation data, and event data.

The first UI device 112 may pass state information to a second UI device 112 (block 1310). The state information may indicate one or more first routines operating on the first UI device 112. In some embodiments, the state information may be passed via an Internet connection. In other embodiments, the state information may be passed via an intermediary network. In still other embodiments, the state information may be passed from the first UI device 112 to the second UI device 112 via point-to-point wireless connection. In some instances, the state information may be passed via wireless communication according to a protocol such as the Bluetooth protocol or the near field communication protocol. In other instances, the state information may be passed from the first UI device 112 to the second UI device 112 via an intermediary device (which may be a server 150 such as the server 150 shown in FIG. 1). In certain instances, the first UI device 112 may pass the state information to the second UI device 112 when the UI device 112s mutually detect one another and the same user is logged onto both devices. In some embodiments, the state information may be passed upon an receiving an instruction, at the first UI device 112, to pass the state information. In certain embodiments, passing the state information may facilitate one or more of: collaboration on the two UI devices 112 between different users; mobility of a single user across the two UI devices 112; device awareness of user location within the process plant; or device awareness of user proximity to particular process plant equipment.

The second UI device 112 may receive the state information and execute one or more second routines (block 1315). The display of the second UI device 112 may be configured according to the stored state and according to the device type of UI type of the second UI device 112. The second routines may correspond to one or more of the first routines operating on the first UI device 112. In some embodiments, the second UI device 112 may receive a signal from a location awareness component and may modify the execution of the one or more second routines according to the received signal. In certain instances, the location awareness component may receive a signal from the second UI device 112. The signal may cause, via the network, the second UI device 112 to modify execution of the one or more routines according to the received signal. Modifying executing of the one or more routines may include one or more of: highlighting an area of the process plant in which the second UI device 112 is located; displaying information about a particular device within a predetermined distance of the second UI device 112; displaying an alarm relevant to a device in the area of the process plant in which the second UI device 112 is located; or displaying a work item pertaining to a device in the area of the process plant in which the second UI device 112 is located.

In some embodiments, the second UI device 112 may receive a signal from an equipment awareness component and modify execution of the one or more second routines in accordance with the received signal. In certain embodiments, the equipment awareness component may include a transmitter to transmit a wireless signal to the second UI device 112. The wireless signal may identify the equipment with which the transmitter is associated.

In some embodiments, either or both the first UI device 112 and the second UI device 112 may be mobile devices. In other embodiments, either or both the first and second UI devices 112 may be workstations. In some embodiments, one UI device 112 may be a mobile device and the other may be a workstation. In an embodiment, the second UI device 112 may configure a display according to the state information received from the first UI device 112 and according to a device type or UI type associated with the second UI device 112.

Figure 14:
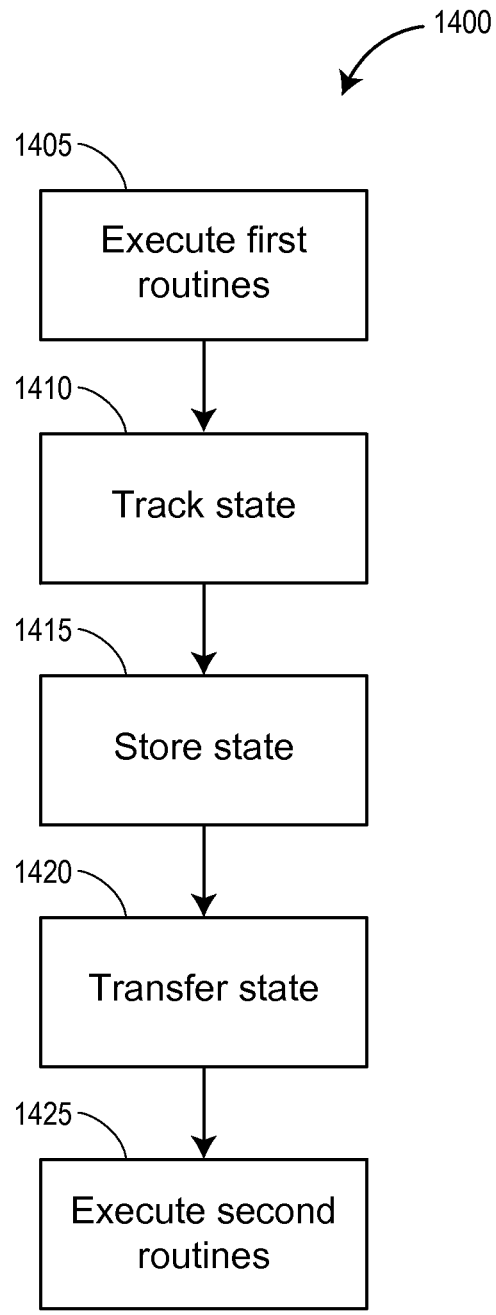
FIG. 14 is a flow chart depicting an example method for transferring state information between two UI devices coupled to a server.

FIG. 14 is a flow chart depicting an example method 1400 for transferring state information between two UI devices coupled to the server 150 in the process plant 10. The method 1400 may be implemented, in whole or in part, at one or more networks or systems such as the process control network 100 shown in FIGS. 1, 2b and 6. In particular, the method 1400 may be implemented, in whole or in part, at one or more devices or systems such as the server 150 shown in FIG. 1, 2b, 6, 9 or 10 or at one or more devices or systems such as any of the UI devices 112 or 112a-g shown in FIG. 1-4, 6, or 9-12. The method 1400 may be saved as a set of instructions, routines, programs, or modules on memory such as the memory 315 of FIG. 3 or the memory 603 of FIG. 6, and may be executed by a processor such as processor 310 of FIG. 3 or the processor 601 of FIG. 6.

The method 1400 begins with a first UI device 112 that may execute one or more first routines for performing a function in a process plant (block 1405). The first UI device 112 may track the state of the one or more first routines executing at the first UI device 112 (block 1410). In some embodiments, the server 150 shown in FIG. 1 may track the state of the one or more first routines executing at a first UI device 112. The first UI device 112, or the server 150, may store the tracked state of the one or more first routines (block 1415)

The first UI device 112, or the server 150, may transfer the stored state of the one or more first routines to a second UI device 112 (block 1420). In some embodiments, the state information may be passed via an Internet connection. In other embodiments, the state information may be passed from the first UI device 112 or server 150 to the second UI device 112 via point-to-point wireless connection. The state information may also be transferred from the first UI device 112 to the second UI device 112 via an intermediary device or server 150. In some instances, the state information may be passed via wireless communication according to a protocol such as the Bluetooth protocol or the near field communication protocol. In certain embodiments, the state may be transferred to the second UI device 112 upon detection of the first UI device 112 by the second UI device 112, or upon detection of the second UI device 112 by the first UI device 112. Transferring the stored state to the second UI device 112 may include transferring the stored state upon an instruction received at the first UI device 112, where the instruction instructs the first UI device 112 to pass the stored state to the second UI device 112.

The second UI device 112 may execute one or more second routines, where the second routines correspond to the one or more first routines executed at the first UI device 112 (block 1425). In some embodiments, the second UI device 112 may receive a signal. The signal may indicate the proximity of the second UI device 112 to a device or location. After receiving the signal, the second UI device 112 may modify the execution of the one or more second routines according to the received signal. In some embodiments the second UI device 112 may transmit, to a location awareness component, a signal indicating the proximity of the second UI device 112 to the device or location. In such an embodiment the second UI device 112 may receive, from a server 150, information specific to the device or location.

In some embodiments, the second UI device 112 may take one or more of the following actions when in proximity to the device or location: highlighting an area of the process plant in which the second UI device 112 is located; displaying information about a particular device within a predetermined distance of the second UI device 112; displaying an alarm relevant to a device in the area of the process plant in which the second UI device 112 is located; displaying a work item pertaining to a device in the area of the process plant in which the second UI device 112 is located; highlighting on a display process plant equipment associated with the received signal; displaying on the second UI device 112 information about a particular device associated with the received signal; displaying an alarm relevant to the device associated with the received signal; or displaying a work item pertaining to the device associated with the received signal.

In some embodiments, either or both the first UI device 112 and the second UI device 112 may be mobile devices. In other embodiments, either or both the first and second UI device 112 may be workstations. In some embodiments, one UI device 112 may be a mobile device and the other may be a workstation. In an embodiment, the second UI device 112 may configure a display according to the state information received from the first UI device 112 and according to a device type or UI type associated with the second UI device 112.

Figure 15:
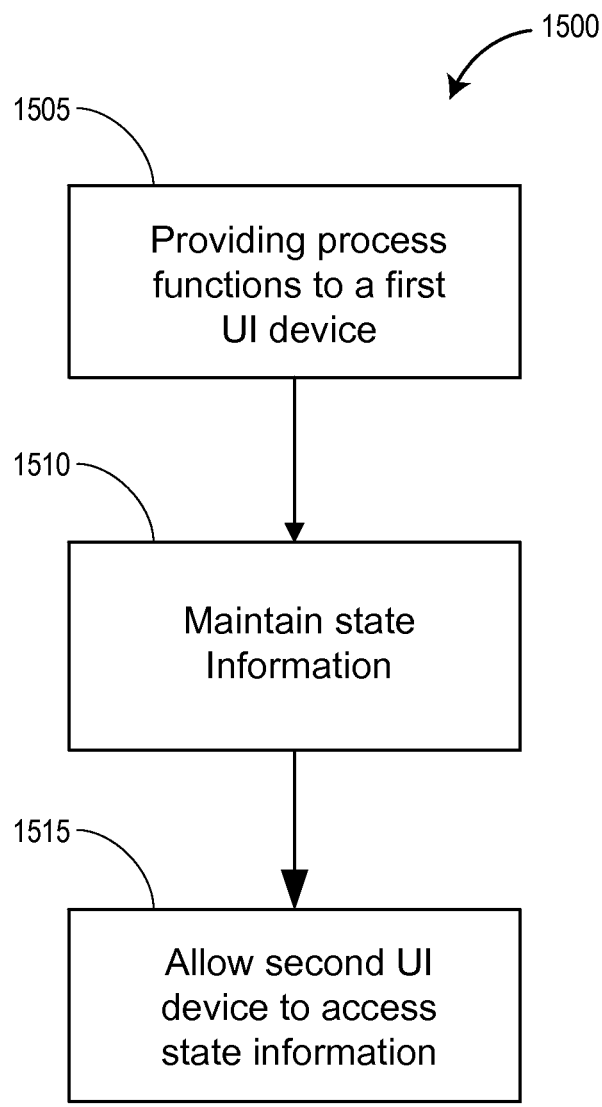
FIG. 15 is a flow chart depicting an additional method for transferring state information between two UI devices.

FIG. 15 is a flow chart depicting an additional method 1500 for transferring state information between two UI devices in the process control plant 10. The method 1500 may be implemented, in whole or in part, at one or more devices or systems such as the server 150 shown in FIG. 1, 2b, 6, 9 or 10 or at one or more devices or systems such as any of the UI devices 112 or 112a-g shown in FIG. 1-4, 6, or 9-12. The method 1500 may be saved as a set of instructions, routines, programs, or modules on memory such as the memory 315 of FIG. 3 or the memory 603 of FIG. 6, and may be executed by a processor such as processor 310 of FIG. 3 or the processor 601 of FIG. 6.

The method 1500 begins with the server 150 that may provide one or more functions related to process data (block 1505). In some embodiments, the process data may be stored at a unitary, logical, data storage area and may be stored using a common format. The process data may include multiple types of process data, including configuration data, continuation data, and event data.

The server 150 may allow a first UI device 112 to access, via the server 150, the process data. The server 150 may also allow the first UI device 112 to maintain state information on the server 150 (block 1510). The state information may be indicative of the state of the UI executing on the first UI device 112.

The server 150 may allow a second UI device 112 to access, via the server 150, the process data and state information (block 1510). The second UI device 112 may execute a UI in accordance with the state information.

In some embodiments, either or both the first UI device 112 and the second UI device 112 may be mobile devices. In other embodiments, either or both the first and second UI devices 112 may be workstations. In some embodiments, one UI device 112 may be a mobile device and the other may be a workstation.

Figure 16:
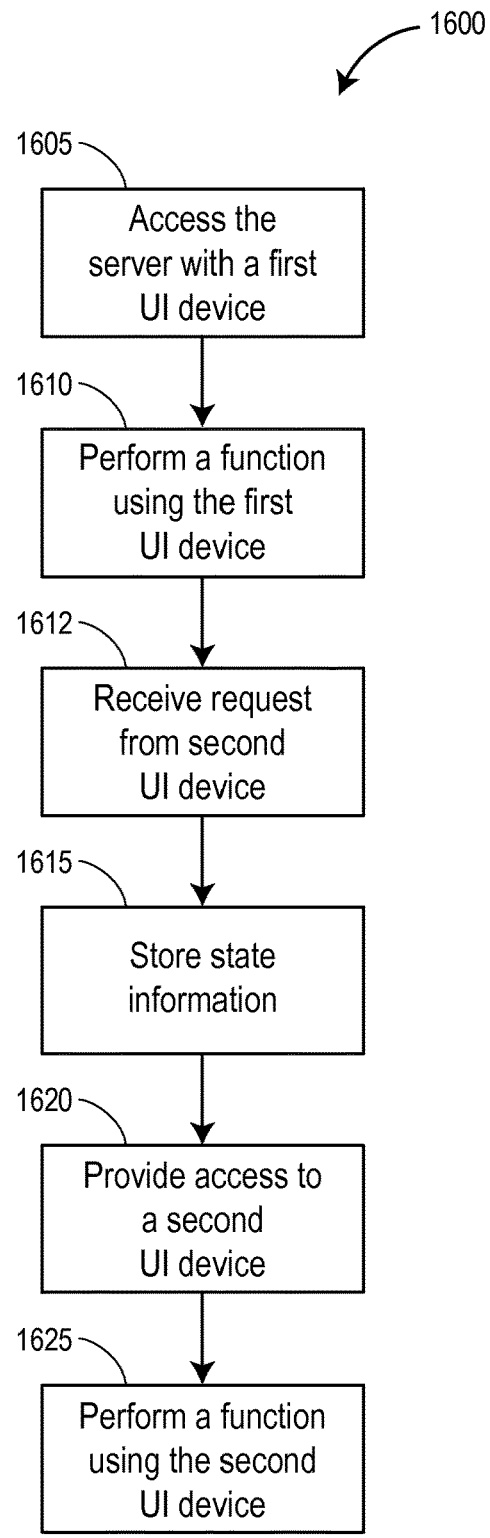
FIG. 16 is a flow chart depicting still another exemplary method for controlling a process plant using UI devices associated with a mobile control room.

FIG. 16 is a flow chart of an exemplary method 1600 for operating the process control plant 10 using UI devices associated with the mobile control room. The method 1600 may be implemented, in whole or in part, at one or more devices or systems such as the server 150 shown in FIG. 1, 2b, 6, 9 or 10 or at one or more devices or systems such as any of the UI devices 112 or 112a-g shown in FIG. 1-4, 6, or 9-12. The method 1600 may be saved as a set of instructions, routines, programs, or modules on memory such as the memory 315 of FIG. 3 or the memory 603 of FIG. 6, and may be executed by a processor such as processor 310 of FIG. 3 or the processor 601 of FIG. 6.

The method 1600 begins with a first UI device 112 that may access the server 150 (block 1605). The server 150 may be communicatively coupled to a database storing process data. The first UI device 112 may be associated with a first user profile. The first UI device 112 may perform a function in the process plant (block 1610).

A second UI device 112 may request access to the server 150 (block 1612). The second UI device 112 may be associated with the first user profile. The server 150 may store state information, where the state information is associated with the state of the first UI device 112 (block 1615).

The server 150 may provide access to the second UI device 112, where the access may be in accordance with the stored state information (block 1620). The second UI device 112 may perform a function in the process plant (block 1625).

In some embodiments, either or both the first UI device 112 and the second UI device 112 may be mobile devices. In other embodiments, either or both the first and second UI devices 112 may be workstations. In some embodiments, one UI device 112 may be a mobile device and the other may be a workstation.

Figure 17:
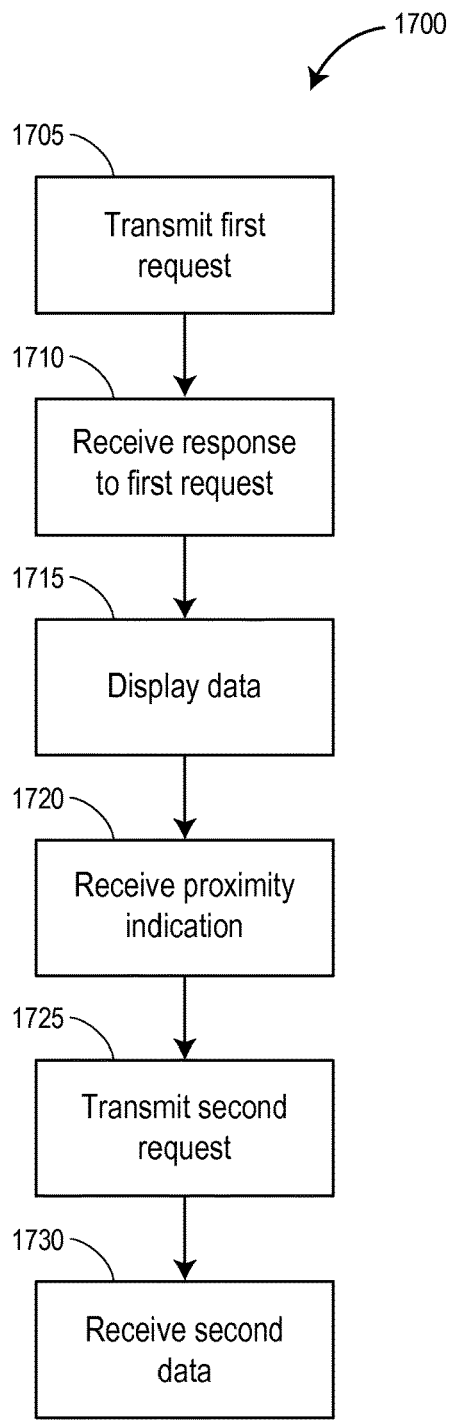
FIG. 17 is a flow chart depicting an exemplary method executed by a UI device.

Turning to FIG. 17, a flow chart depicts an exemplary method 1700, executing on a UI device, for controlling the process plant 10 with the mobile UI device 112. The method 1700 may be implemented, in whole or in part, at one or more networks or systems such as the process control network 100 shown in FIGS. 1, 2b and 6. In particular, the method 1700 may be implemented, in whole or in part, at one or more devices or systems such as the server 150 shown in FIG. 1, 2b, 6, 9 or 10 or at one or more devices or systems such as any of the UI devices 112 or 112a-g shown in FIG. 1-4, 6, or 9-12. The method may be saved as a set of instructions, routines, programs, or modules on memory such as the memory 315 of FIG. 3 or the memory 603 of FIG. 6, and may be executed by a processor such as processor 310 of FIG. 3 or the processor 601 of FIG. 6.

The method begins with a mobile UI device 112 that may transmit, to the server 150 via a network, a first request for first data from a data storage area (block 1705). The data storage area may be a unitary, logical data storage area including one or more devices configured to store, using a common format, process data corresponding to the process plant. The process data may include multiple types of process data such as configuration data, continuation data, and event data.

The mobile UI device 112 may receive, from the server 150 and in response to the first request, the first data from the storage area (block 1710). The mobile UI device 112 may display the first data received from the server 150 (block 1715).

The mobile UI device 112 may receive an indication that the mobile UI device 112 is in proximity to an external device (block 1720). The UI device 112 may include a communication circuit that operates to detect the proximity of external devices. The communication circuit may include a near field communication (NFC) circuit, a radio frequency identification (RFID circuit, a Bluetooth circuit, a circuit operating according to the IEEE 802.11 protocol, or a circuit operating according to the Wireless HART protocol. In some instances, the mobile UI device 112 may receive an indication that the mobile UI device 112 is in proximity to an additional UI device 112

The mobile UI device 112 may transmit, to the server 150, a second request for second data according to the received indications (block 1725). In some embodiments, transmitting the second request includes transmitting, to the server 150, a request for state information of the additional UI device 112.

The mobile UI device 112 may receive, from the server 150 and in response to the second request, second data (block 1730). In some embodiments, the second data may represent requested state information of the additional UI device 112. In such embodiments, the mobile UI device 112 may also display process control data from the storage area according to the received state information. Displaying the process control data may include duplicating, on the display of the mobile UI device 112, the display of the additional UI device 112. Displaying the process control data may include arranging, on the display of the mobile UI device 112, the data displayed on the additional UI device 112.

In other embodiments, receiving the proximity indication (block 1720) may comprise receiving an indication that the mobile UI device 112 is in proximity to a process control device. Transmitting the second request (block 1725) may include transmitting, to the server 150, an indication that the mobile UI device 112 is in proximity to the process control device. In such embodiments, receiving second data may include receiving process control data related to the process control device (block 1730). Receiving process control data related to the process control device may comprise receiving and displaying data of one or more of: an alarm associated with the process control device; a maintenance task associated with the process control device; a diagrammatic depiction of the area of the process plant associated with the process control device; or a status of an area of the process plant associated with the process control device.

In some embodiments, receiving the proximity indication (block 1720) may comprise receiving an indication that the mobile device is in a particular area of the process plant. In such embodiments, transmitting a second request (block 1725) may include transmitting, to the server 150, an indication that the mobile UI device 112 is in the particular area of the plant. Furthermore, receiving the second data (block 1730) may include receiving second process control data related to the particular area of the process plant. Receiving process control data related to the particular area may comprise receiving and displaying data of one or more of: an alarm associated with the particular area of the process plant; a maintenance task associated with the particular area of the process plant; a diagrammatic depiction of the particular area of the process plant; or a status of one or more process control devices associated with the particular area.

Figure 18:
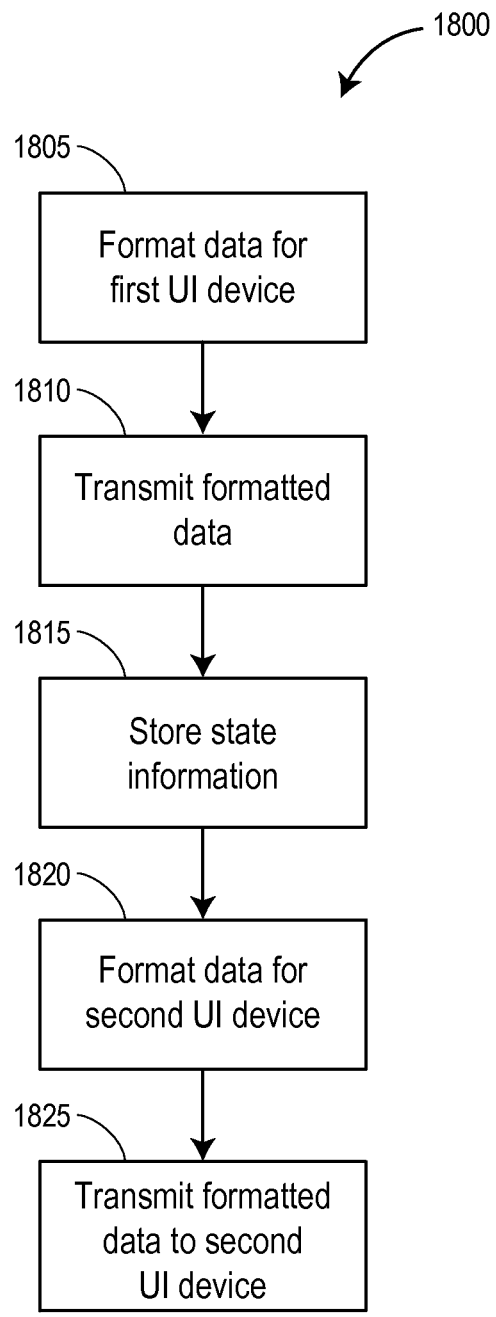
FIG. 18 is a flow chart depicting a method executed on a server for facilitating mobile control of a process plant using UI devices.

FIG. 18 is a flow chart depicting an exemplary method 1800, executed on a server, for facilitating mobile control of the process plant 10. The method 1800 may be implemented, in whole or in part, at one or more networks or systems such as the process control network 100 shown in FIGS. 1, 2b and 6. In particular, the method 1800 may be implemented, in whole or in part, at one or more devices or systems such as the server 150 shown in FIG. 1, 2b, 6, 9 or 10 or at one or more devices or systems such as any of the UI devices 112 or 112a-g shown in FIG. 1-4, 6, or 9-12. The method may be saved as a set of instructions, routines, programs, or modules on memory such as the memory 315 of FIG. 3 or the memory 603 of FIG. 6, and may be executed by a processor such as processor 310 of FIG. 3 or the processor 601 of FIG. 6.

The method 1800 begins with the server 150 that may format process data for display on a first UI device 112 (block 1805). In some instances, the formatted process data may be viewable in a web browser executing on the first UI device 112. The server 150 may format the process data according to a device type or a UI type of the first UI device 112.

The server 150 may transmit, to the first UI device 112, the formatted process data (block 1810). In particular, the server 150 may transmit, to the first UI device 112, process data viewable in a multi-purpose process control application executing on the first UI device 112.

The server 150 may store state information associated with the display of the process data on the first UI device 112 (block 1815). Storing the state information may include storing one or more of: a display configuration of the first UI device 112; a portion of the process plant displayed by the first UI device 112; data of a process control device displayed by the first UI device 112; a function being performed on the first UI device 112, the function including one or more of a control function, an operation function, a configuration function, a maintenance function, a data analysis function, a quality control function, or a security function; and a user profile active on the first UI device 112.

The server 150 may format the process data for display on a second UI device 112 according to the stored state information (block 1820). The server 150 may transmit, to the second UI device 112, the process data (block 1825). In particular, the server 150 may format the process data according to a device type or UI type of the second UI device 112. In some instances, the device type of the second UI device 112 may be different than the device type of the first UI device 112. For example, the first UI device 112 may be a workstation and the second UI device 112 may be a mobile device. Alternatively, the first UI device 112 may be a mobile device and the second UI device 112 may be a workstation. In some embodiments, the server 150 may format the process data for display on the second UI device 112 such that an operation state of the first UI device 112 is duplication on the second UI device 112.

In some embodiments, the server 150 may receive a request from the second UI device 112 to provide to the second UI device 112 a user interface according to the stored state information. The server 150 may establish, with the second UI device 112 and in response to the request to provide a user interface, a secure communication channel between the server 150 and the second UI device 112.

Figure 19:
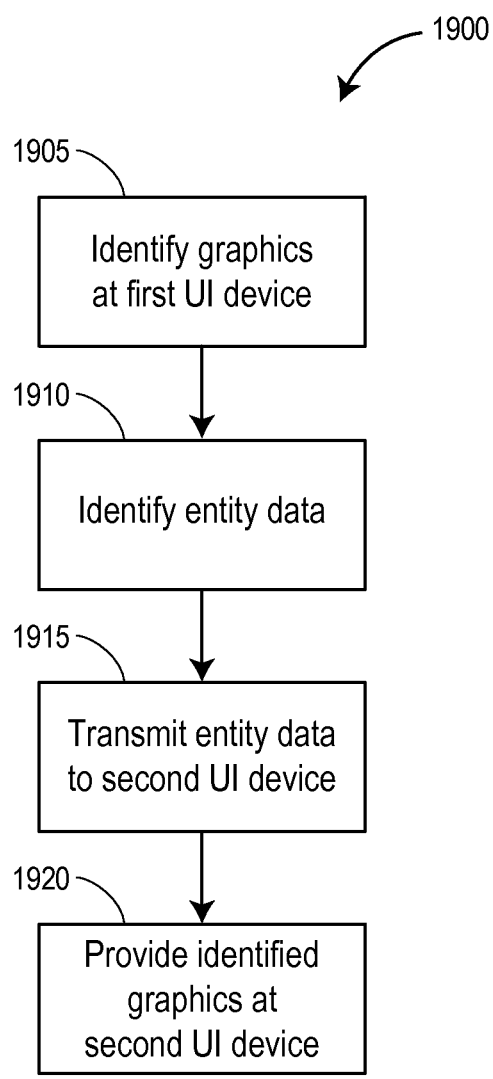
FIG. 19 is a flow chart depicting a method for transferring a state of a first UI device to a second UI device.

FIG. 19 is a flow chart of an exemplary method 1900 for transferring a state of the first UI device 112 to the second UI device 112. The method 1900 may be implemented, in whole or in part, at one or more networks or systems such as the process control network 100 shown in FIGS. 1, 2*b* and 6. In particular, the method 1900 may be implemented, in whole or in part, at one or more devices or systems such as the server 150 shown in FIG. 1, 2*b*, 6, 9 or 10 or at one or more devices or systems such as any of the UI devices 112 or 112*a-g* shown in FIG. 1-4, 6, or 9-12. The method may be saved as a set of instructions, routines, programs, or modules on memory such as the memory 315 of FIG. 3 or the memory 603 of FIG. 6, and may be executed by a processor such as processor 310 of FIG. 3 or the processor 601 of FIG. 6.

The method 1900 begins with a first UI device 112 or the server 150 that may identify the graphics depicted at a display of the first UI device 112 (block 1905).

The first UI device 112 or the server 150 may identify process entity data associated with the graphics provided at the display of the first UI device 112 (block 1910). Identifying the process entity data may include identifying one or more of: process parameter data associated with the graphics provided at the display of the first UI device 112; a process plant area associated with the graphics provided at the display of the first UI device 112; a field device associated with the graphics provided at the display of the first UI device 112; an application executing on the first UI device 112; or a state of an application executing on the first UI device 112.

The first UI device 112 or the server 150 may transmit the identified process entity data to a second UI device 112 (block 1920). The first UI device 112 or the server 150 may provide the identified graphics to the second UI device 112 (block 1920).

Figure 20:
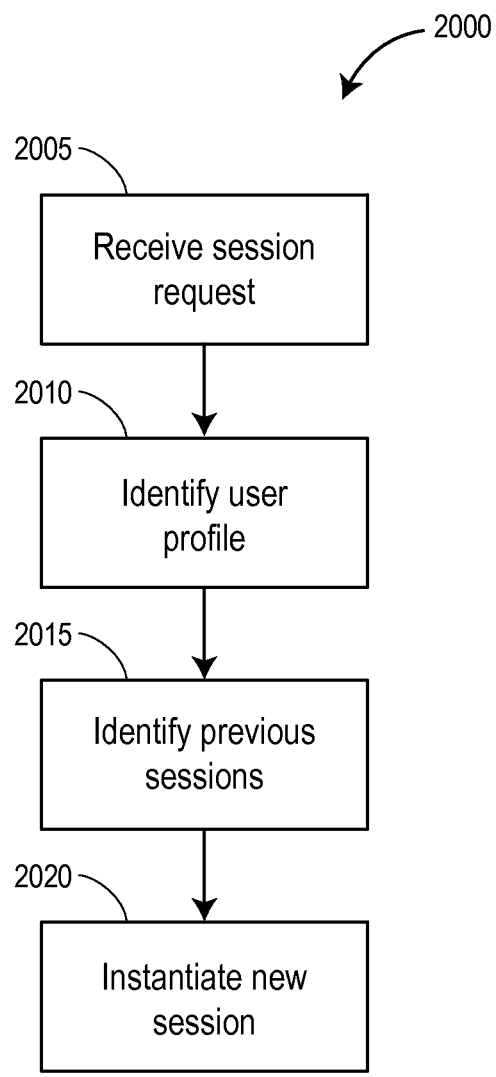
FIG. 20 is a flow chart depicting a method for initiating a UI session on a first UI device.

FIG. 20 is a flow chart depicting a method 2000 for initiating a UI session on the first UI device 112. The method 2000 may be implemented, in whole or in part, at one or more networks or systems such as the process control network 100 shown in FIGS. 1, 2*b* and 6. In particular, the method 2000 may be implemented, in whole or in part, at one or more devices or systems such as the server 150 shown in FIG. 1, 2*b*, 6, 9 or 10 or at one or more devices or systems such as any of the UI devices 112 or 112*a-g* shown in FIG. 1-4, 6, or 9-12. The method may be saved as a set of instructions, routines, programs, or modules on memory such as the memory 315 of FIG. 3 or the memory 603 of FIG. 6, and may be executed by a processor such as processor 310 of FIG. 3 or the processor 601 of FIG. 6.

The method 2000 begins with the server 150 that may receive, from a first UI device 112, a session request (block 2005).

The server 150 may identify a user profile associated with the session request (block 2010). Identifying a user profile associated with the session request may include receiving, from the first UI device 112, a user identifier associated with the user profile. The user identifier may be currently logged into the first UI device 112. Identifying a user profile may also include receiving, from the first UI device 112, a user identifier associated with the user profile, where the user identifier may be currently logged into a second UI device 112.

The server 150 may determine whether a previous session exists (block 2015). The making the determination may include requesting, from the first UI device 112, a session identifier associated with the previous session. In some embodiments, making the determination may include receiving, from the first UI device 112 and in response to the session identifier request, a session identifier. In some embodiments, making the determination may include identifying the session identifier received with the session request.

The server 150 may instantiate a new session according to the previous session when a previous session exists (block 2015). Alternatively, the server 150 may instantiate a new session if no previous session exists, where the new session may be instantiated using a default session configuration. Instantiating a new session according to a previous session may include determining whether a session identifier was received with the session request. When a session identifier was received with the session request, the server 150 may instantiate a session associated with the session identifier. When a session identifier was no received with the session request, the server 150 may instantiate a session associated with a recent session, such as the most recent session of a user identifier associated with the first UI device 112.

In some embodiments, the method 2000 may further include the server 150 transmitting, to the second UI device 112, a request to instantiate on the first UI device 112 a session according to the session operating on the second UI device 112. The method 2000 may also include the server 150 receiving, from the second client device, a confirmation.

Figure 21:
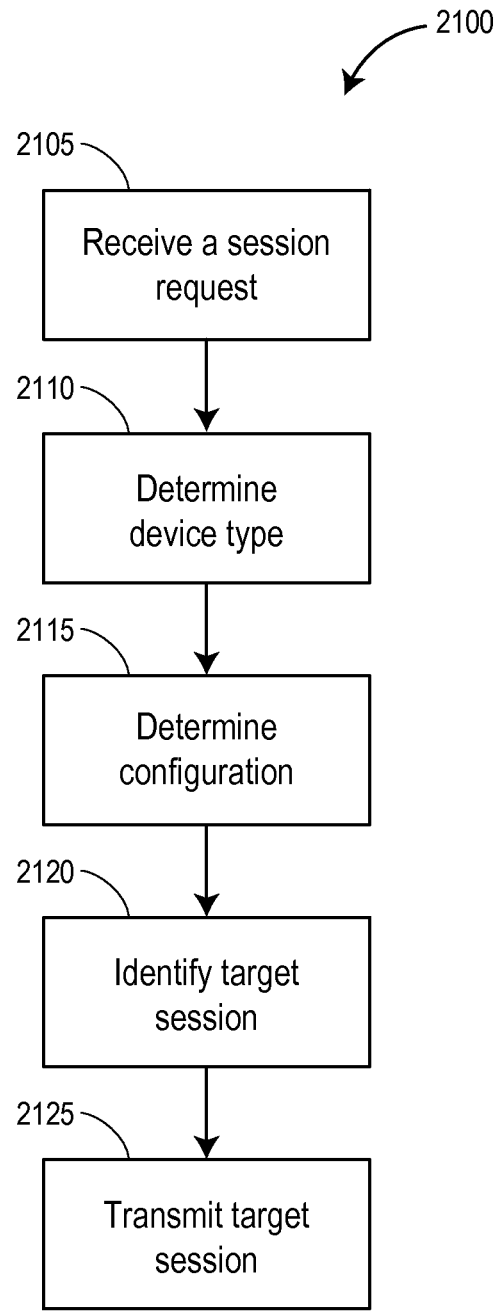
FIG. 21 is a flow chart depicting a second method for instantiating a UI session on a first UI device.

FIG. 21 is a flow chart of a second method 2100 for instantiating a UI session on the first UI device 112. The method 2100 may be implemented, in whole or in part, at one or more networks or systems such as the process control network 100 shown in FIGS. 1, 2*b* and 6. In particular, the method 2100 may be implemented, in whole or in part, at one or more devices or systems such as the server 150 shown in FIG. 1, 2*b*, 6, 9 or 10 or at one or more devices or systems such as any of the UI devices 112 or 112*a-g* shown in FIG. 1-4, 6, or 9-12. The method may be saved as a set of instructions, routines, programs, or modules on memory such as the memory 315 of FIG. 3 or the memory 603 of FIG. 6, and may be executed by a processor such as processor 310 of FIG. 3 or the processor 601 of FIG. 6.

The method 2100 begins with the server 150 that may receive, from a first UI device 112, a session request (block 2105). Receiving the session request may include receiving a target session identifier and a device type.

The server 150 may determine a device type associated with the session request (block 2110). The server 150 may identify a graphical user interface configuration according to the device type (block 2115). The server 150 may identify a target session associated with the session request (block 2120).

The server 150 may configure a new session for the first UI device 112 according to the identified graphical user interface configuration and the identified target session. The server 150 may transmit, to the first UI device 112, data associated with the new session (block 2125). Configuring the new session may include identifying, as session data, one or more of a process area, an equipment resource, or a set of process data monitored or controlled in the target session. Configuring the new session may also include configuring the new session according to constraints associated with the identified graphical user interface configuration. Configuring the new session may further include identifying context data associated with the session request.

Identifying context data may include: identifying a location of the first UI device 112 in the process plant, identifying a user type or a user identifier associated with the session request; identifying a user type or a user identifier associated with the first UI device 112; identifying one or more process control devices within a predetermined distance from the first UI device 112; identifying a function being performed on a second UI device 112 associated with the target session; or identifying a user identifier associated with a second US device associated with the target session.

In certain embodiments, the disclosed UI devices, servers, and routines may be implemented in a process control network supporting a big data infrastructure (i.e., a big data network). A big data network may support large scale data mining and data analytics of process data. A big data network or system may also include a plurality of nodes to collect and store all (or almost all) data that is generated, received, and/or observed by devices included in and associated with the process control system or plant. A big data network may include a big data apparatus, which may include a unitary, logical data storage area configured to store, using a common format, multiple types of data that are generated by or related to the process control system, the process plant, and to one or more processes being controlled by the process plant. For example, the unitary, logical data storage area may store configuration data, continuous data, event data, plant data, data indicative of a user action, network management data, and data provided by or to systems external to the process control system or plant.

A process control big data system may automatically collect all data that is generated at, received by or obtained by the nodes at the rate at which the data is generated, received or obtained, and may cause the collected data to be delivered in high fidelity (e.g., without using lossy data compression or any other techniques that may cause loss of original information) to the process control system big data apparatus to be stored (and, optionally, delivered to other nodes of the network). The process control system big data system also may be able to provide sophisticated data and trending analyses for any portion of the stored data. For example, the process control big data system may be able to provide automatic data analysis across process data (that, in prior art process control systems, is contained in different database silos) without requiring any a priori configuration and without requiring any translation or conversion. Based on the analyses, the process control system big data system may be able to automatically provide in-depth knowledge discovery, and may suggest changes to or additional entities for the process control system. Additionally or alternatively, the process control system big data system may perform actions (e.g., prescriptive, predictive, or both) based on the knowledge discovery. The process control system big data system may also enable and assist users in performing manual knowledge discovery, and in planning, configuring, operating, maintaining, and optimizing the process plant and resources associated therewith.

Example implementations of the methods and system described above

EXAMPLE 1

A first user assigned to a particular area of the plant may monitor the assigned plant area via a stationary workstation (a first UI device 112 as described above) in a control room. The first user monitors and controls the process via a browser executing on the UI device 112, which browser communicates with the UI routine 382 executing at the server 150. The first user, may decide to go to the floor of the process plant 10 and inspect the plant. As the user leaves this control room, the user may pick up a touch-sensitive tablet device (a second UI device 112 as described above) and walk out of the control room toward the plant. The tablet, like the workstation, enables the first user to access the UI routine 382 at the server 150 via a browser executing on the tablet device. The first user may be already authenticated on the tablet, or the tablet may be associated with the first user. The tablet communicates with the server 150 to establish a session unique to the first user. The server 150 may store state information associated with the first user at the workstation and provide the first user, via a browser routine operating on the tablet, a user interface on the tablet according to the stored state information. Thus, the first user is able to resume workflow from the workstation.

As the first user moves around the plant, a context awareness routine 384 executing at the tablet receives data from various sensors and receivers in the tablet device (e.g., an NFC transceiver at the network interface 325). The sensors and receivers detect devices, equipment, and/or tags proximate to the tablet. In other embodiments, the tablet may have a GPS transceiver for receiving location data and may upload the location data to the server 150 so that the UI routine 382 may execute with an awareness of the user's location. In any event, The UI routine 382 may identify the tablet's location or proximity to certain devices and cause the tablet to display for the first user a process plant overview map/graphic, zoomed into the general location of the first user and tablet. As the first user moves through the plant 10, the plant map display may dynamically change to focus on the area of the map corresponding to the tablet's location.

The tablet may also display various process data or alarms as the first user walks through the plant 10. For example, the first user may pass a pump, causing the tablet to display operational data, graphics, and alarms pertaining to the pump, especially if the pump requires attention. The tablet may, for instance, receive a unique identifier from an NFC or RFID tag on or near the pump. The tablet may transmit the unique identifier to the UI routine 382 via the web server 152 executing at the server 150. The UI routine 382 may receive the unique identifier and access a database that correlates the unique identifier to entities in the process plant 10. For example, the unique identifier may correlate to pump data, such as display data, parameter data, and alarm data pertaining to the pump. After identifying the pump data, the UI routine 382 may transmit the pump data to the browser executing at the tablet, resulting in the tablet rendering graphics and providing graphics, parameters, and/or alarms pertaining to the pump.

In a further example, the first user may realize that the pump is malfunctioning. The first user may interact with a pump graphic or menu depicted at the tablet display, and may touch the tablet display at the graphic location, the graphic representing a shut-off command. The tablet may detect the first user input (e.g., capacitive touch input) and generate corresponding input data. The tablet may then transmit the input data to the web service 152 executing at the server 150. The web service 152 receives the input data and passes the input data to the UI routine 382. The UI routine 382 then causes the server 150 to transmit a shutdown signal to the controller that controls the pump. The controller receives the signal and turns the pump off. The first user may create a task or work item associated with the pump. For example, the work item may be a request for maintenance personnel to inspect and/or fix the pump.

EXAMPLE 2

In another example, the first user, still carrying the tablet, may begin walking from the process plant toward a control room of the process plant. The first user may walk by a boiler. As the first user comes into proximity with the boiler, the tablet establishes NFC communication with a boiler context ID device 902 (e.g., a corresponding NFC communication device associated with the boiler). The tablet may receive a unique identifier from the context ID device 902 and transmit the unique identifier to the server 150. The server 150 may identify the boiler based on the unique identifier. The server 150 may access context data 910 to determine that the boiler has an associated work item, and compare a skill threshold associated with the work item to a skill level associated with the first user's profile. Determining that the first user is unqualified to work on the work item associated with the boiler, the server 150 may forego altering the display of tablet instead of updating the display with information about the work item.

The user may continue walking through the plant, still carrying the tablet, and may walk by a valve. As described above, the tablet may establish NFC communication with a valve context ID device 902. The tablet may then receive from the device 902 a unique identifier and transmit the unique identifier to the server 150. The server 150 may identify the valve based on the unique identifier. The server 150 may then access context data 901 to determine that the valve has an associated schedule indicating that the valve is currently scheduled to be out of commission for maintenance. The server transmits UI data to the tablet, causing the tablet to generate provide information to the first user, where the information indicates to the first user that the valve is currently scheduled for maintenance.

EXAMPLE 3

The first user continues walking through the plant, still with the tablet in hand. A second user, in the control room and now logged into the workstation formerly occupied by the first user (or a different workstation), may notice that a critical O2 gas measurement associated with a furnace stack is dropping. The second user may creates a work item requesting assistance with the furnace stack. As the first user passes the furnace stack on his way back to the control room, the tablet may automatically establish NFC communication with a furnace stack context ID device 902, resulting in the tablet receiving a unique identifier associated with the furnace stack. The tablet may transmit the unique identifier to the server 150, which may return information associated with the unique identifier (e.g., information about the furnace stack), including a notification graphic that the furnace stack requires attention. The first user may see and select the notification graphic, resulting in display of information pertaining to the created work item. The first user may select a graphic to indicate acceptance of the work item.

The work item may request that the first user take one or more pictures of the flame at the furnace (e.g., because flame color may indicate inadequate air flow). The picture of the flame may be transmitted to the server. An analysis routine operating on the server or on a big data appliance may compare the photo of the flame to other images, captured at other times and/or under other conditions, stored on the big data system or appliance. The analysis routine may analyze the images (by comparing the images to the collection of previous flame images and corresponding operational data, for example). The big data analysis routine may indicate that air flow at the furnace is low. Based on the big data analysis, the first user may increase the air flow to the furnace. In some embodiments, the first user may use the tablet to retrieve and display operating procedures for increasing air to the furnace. If desired, the first user may capture an additional image of the flame, after the adjustment, and transmit the image to the analysis routine to confirm that the furnace stack is operating properly.

While the first user increases air flow at the furnace, the second user may run a query on the furnace to see if previous users have also been increasing air flow over the past several shifts. The query confirms that they have. The second user may pull up a graph showing air flow through the furnace with event information for each time air flow was increased, who made the changes, etc. The second user may share this information with the first user, for example by requesting a shared UI session. The first user may receive, via the server 150, the request for the UI session. If the first user accepts the request, the server 150 may capture state information associated with the UI displayed to the second user, and may cause the display of the tablet the first user is using to display data according to the state information from the second user. Together, the first and second users may review the data regarding the furnace and may determine that the furnace frequently experiences similar problems. The second user may then query the big data system about low O2 gas measurement events at the furnace. The big data system may provide a number of events, devices, users, times, and other factors that correlate to low O2 gas measurement events at the furnace. For example, the big data analysis may reveal that low O2 gas measurements are strongly correlated to events at related process units, where the correlated events frequently precede the low O2 gas measurements. In another example, the big data analysis may reveal that a particular user is strongly correlated to the low O2 gas measurement events. In other words, the big data analysis may reveal that the particular user is controlling the furnace in a manner that is causing the low O2 gas measurements. While this example illustrates a user utilizing a UI device to request a big data analysis and display the results of a big data analysis, it should be noted that the big data system may also use data from and collected by the UI device (tablet in this scenario) to use for other analysis that may or may not be related to the UI device. In any event, the second user may flag the work item for further review and create a maintenance ticket to have someone check the furnace at some point in the near future.

The following additional considerations apply to the foregoing discussion. Throughout this specification, actions described as performed by the server 150, the UI device 112, or any other device or routine generally refer to actions or processes of a processor manipulating or transforming data according to machine-readable instructions. The machine-readable instructions may be stored on and retrieved from a memory device communicatively coupled to the processor. Additionally, throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Unless specifically stated otherwise, discussions herein using words such as "processing," "computing," "calculating," "determining," "identifying," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

When implemented in software, any of the applications, services, and engines described herein may be stored in any tangible, non-transitory computer readable memory such as on a magnetic disk, a laser disk, solid state memory device, molecular memory storage device, or other storage medium, in a RAM or ROM of a computer or processor, etc. Although the example systems disclosed herein are disclosed as including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, persons of ordinary skill in the art will readily appreciate that the examples provided are not the only way to implement such systems.

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

We claim:

1. A non-transitory computer-readable medium storing instructions, executable by a processor in a mobile user interface device for controlling a process at a process plant, the instructions operable to cause the processor to:
    transmit to a server a first request for first process data from a data storage area;
    receive from the server, in response to the first request, first process data from the storage area;
    cause a display of the mobile user interface device to display the first process data received from the server within a user interface for controlling the process at the process plant;
    receive a signal that (a) represents an indication that the mobile user interface device is in proximity to an external device and (b) causes the mobile user interface device to:
        (i) transmit to the server a second request for second process data according to the indication of proximity to the external device represented by the signal;
        (ii) receive from the server, in response to the second request, second process data; and
        (iii) cause the display of the mobile user interface device to display the second process data received from the server within the user interface for controlling the process at the process plant so that a user can monitor the second process data.

2. A non-transitory computer-readable medium according to claim 1, wherein the instructions for causing the processor to receive the signal representing the indication that the mobile user interface device is in proximity to the external device comprise instructions for causing the processor to receive an indication that the mobile user interface device is in proximity to an additional user interface device.

3. A non-transitory computer-readable medium according to claim 2, further including instructions for causing the processor to transmit, in response to receiving the signal, a request for state information of the additional user interface device, wherein the second process data is process data associated with the requested state information of the additional user interface device.

4. A non-transitory computer-readable medium according to claim 3, wherein the instructions to cause the display of the mobile user interface device to display the second process data received from the server within the user interface for controlling the process so that a user can monitor the second process data comprise instructions to: duplicate on the display of the mobile user interface device the display of the additional user interface device.

5. A non-transitory computer-readable medium according to claim 3, wherein the instructions to cause the display of the mobile user interface device to display the second process data received from the server within the user interface for controlling the process so that a user can monitor the second process data comprise instructions to: arrange on the display of the mobile user interface device the data displayed on the additional user interface device.

6. A non-transitory computer-readable medium according to claim 1, wherein the instructions for causing the processor to receive the signal representing the indication that the mobile user interface device is in proximity to the external device comprise instructions for causing the processor to receive an indication that the mobile user interface device is in proximity to a process control device.

7. A non-transitory computer-readable medium according to claim 1, wherein the instructions for causing the processor to transmit to the server a second request for second process data according to the received signal comprise instructions for causing the processor to transmit to the server an indication that the mobile user interface device is in proximity to the process control device, and wherein the instructions for causing the processor to receive second process data comprise instructions for causing the processor to receive process data related to the process control device.

8. A non-transitory computer-readable medium according to claim 7, wherein the instructions for causing the processor to receive process data related to the process control device comprise instructions for causing the processor to receive and display data of one or more of:
    (a) an alarm associated with the process control device;
    (b) a maintenance task associated with the process control device;
    (c) an diagrammatic depiction of the area of the process plant associated with the process control device; or
    (d) a status of an area of the process plant associated with the process control device.

9. A non-transitory computer-readable medium according to claim 1, wherein the instructions for causing the processor to receive the signal representing the indication that the mobile user interface device is in proximity to the external device comprise instructions for causing the processor to receive an indication that the mobile user interface device is in a particular area of the process plant.

10. A non-transitory computer-readable medium according to claim 1, wherein the instructions for causing the processor to transmit to the server a second request for second process data according to the received signal comprise instructions for causing the processor to transmit to the server an indication that the mobile user interface control device is in the particular area of the process plant, and wherein instructions for causing the processor to receive second process data comprise instructions for causing the processor to receive process data related to the particular area of the process plant.

11. A non-transitory computer-readable medium according to claim 10, wherein the instructions for causing the processor to receive process data related to the process control device comprise instructions for causing the processor to receive and display data of one or more of:
 (a) an alarm associated with the particular area of the process plant;
 (b) a maintenance task associated with the particular area of the process plant;
 (c) a diagrammatic depiction of the particular area of the process plant; or
 (d) a status of an area of the process plant associated with the process control device.

12. A system for controlling a process at a process plant, the system comprising:
 (A) a server;
 (B) a mobile user interface device configured to:
  (i) receive from the server first process data,
  (ii) display the first process data within a user interface for controlling the process at the process plant; and
 (C) an external device separate from the mobile user interface device;
 wherein the mobile user interface device is further configured to receive a signal that (a) represents an indication that the mobile user interface device is in proximity to the external device and (b) causes the mobile user interface device to do the following in response to receiving the signal representing the indication:
  (i) transmit to the server a request for second process data according to the received indication of proximity to the external device represented by the signal;
  (ii) receive from the server, in response to the request, second process data; and
  (iii) display the second process data received from the server within the user interface for controlling the process at the process plant so that a user can monitor the second process data.

13. The system according to claim 12, wherein the external device is a process control device and wherein the second process control data is:
 (a) an alarm associated with the particular area of the process plant;
 (b) a maintenance task associated with the particular area of the process plant;
 (c) a diagrammatic depiction of the particular area of the process plant; or
 (d) a status of an area of the process plant associated with the process control device.

14. The system according to claim 12, wherein the server is further configured to transmit the signal received by the mobile user interface device.

15. The system according to claim 12, wherein the external device is configured to wirelessly transmit the signal received by the mobile user interface device.

16. The system according to claim 12, wherein the mobile user interface device is further configured to receive the signal by capturing an image of the external device.

17. The system according to claim 12, wherein the external device is a process control device.

18. A method for controlling a process at a process plant, the method comprising:
 receiving, at a mobile user interface device and from a server, first process data;
 displaying at the mobile user interface device the first process data within a user interface for controlling the process at the process plant;
 receiving at the mobile user interface device a signal that (a) represents an indication that the mobile user interface device is in proximity to an external device and (b) causes the mobile user interface device to perform the following:
  (i) transmitting from the mobile user interface device to the server a request for second process data according to the received indication of proximity to the external device represented by the signal;
  (ii) receiving, at the mobile user interface device in response to the request, second process data; and
  (iii) displaying at the mobile user interface device the second process data within the user interface for controlling the process at the process plant so that a user can monitor the second process data.

19. The method according to claim 18, wherein the external device is an additional user interface device, and wherein the method further comprises:
 transmitting, in response to the mobile user interface device receiving the signal, a request for state information of the additional user interface device; and
 receiving the requested state information of the additional user interface device;
 wherein the second process data is process data associated with the requested state information of the additional user interface device.

20. The method according to claim 18, wherein the external device is a process control device.

* * * * *